(12) United States Patent
Goetz et al.

(10) Patent No.: US 8,592,007 B2
(45) Date of Patent: Nov. 26, 2013

(54) LIQUID-CRYSTAL DISPLAY

(75) Inventors: Achim Goetz, Alsbach-Haehnlein (DE); Erdal Durmaz, Darmstadt (DE); Malgorzata Rillich, Darmstadt (DE); Andreas Taugerbeck, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 98 days.

(21) Appl. No.: 13/126,596

(22) PCT Filed: Sep. 29, 2009

(86) PCT No.: PCT/EP2009/006993
§ 371 (c)(1),
(2), (4) Date: Apr. 28, 2011

(87) PCT Pub. No.: WO2010/049044
PCT Pub. Date: May 6, 2010

(65) Prior Publication Data
US 2011/0205482 A1    Aug. 25, 2011

(30) Foreign Application Priority Data

Oct. 29, 2008 (DE) .......................... 10 2008 053 636

(51) Int. Cl.
*C09K 19/34* (2006.01)
*C09K 19/32* (2006.01)
*C09K 19/30* (2006.01)
*C09K 19/20* (2006.01)
*C07D 311/06* (2006.01)
*C07D 311/12* (2006.01)

(52) U.S. Cl.
USPC .................. 428/1.1; 252/299.61; 252/299.62; 252/299.63; 252/299.67; 549/283; 549/289; 549/416

(58) Field of Classification Search
USPC ........................ 428/1.1; 549/283, 289, 416; 252/299.61, 299.62, 299.63, 299.67
See application file for complete search history.

(56) References Cited

U.S. PATENT DOCUMENTS

| | | |
|---|---|---|
| 5,587,444 A | 12/1996 | Uchida et al. |
| 6,201,087 B1 | 3/2001 | Herr et al. |
| 2003/0021913 A1 | 1/2003 | O'Neill et al. |
| 2003/0099785 A1 | 5/2003 | O'Neill et al. |
| 2005/0233094 A1 | 10/2005 | Sawatari et al. |
| 2005/0244718 A1 | 11/2005 | Poetsch et al. |
| 2007/0179266 A1 | 8/2007 | Studer |

FOREIGN PATENT DOCUMENTS

| | | |
|---|---|---|
| EP | 0661366 A1 | 7/1995 |
| WO | 9610049 A1 | 4/1996 |
| WO | 2004003103 A1 | 1/2004 |
| WO | 2005060471 A2 | 7/2005 |

OTHER PUBLICATIONS

CAPLUS 1999: 79481.*
Dave, J.S., et al., "Synthesis and mesomorphic characterization of azoesters with a coumarin ring," Liquid Crystals, vol. 29, No. 4, Apr. 1, 2002, pp. 543-549, Taylor and Francis, Abingdon, GB.
Chudgar, N.K., et al., "New fluorescent mesogens with benzopyran-4[H] one heterocyclic moiety," Liquid Crystals, vol. 19, No. 6, Dec. 1, 1995, pp. 807-810, Taylor and Francis, Abingdon, GB.
International Search Report, dated Nov. 27, 2009, issued in corresponding PCT/EP2009/006993.

\* cited by examiner

*Primary Examiner* — Shean C Wu
(74) *Attorney, Agent, or Firm* — Millen, White, Zelano & Branigan, P.C.

(57) ABSTRACT

The present invention relates to polymerizable compounds, to processes and intermediates for the preparation thereof, and to the use thereof for optical, electro-optical and electronic purposes, in particular in liquid-crystal (LC) media and LC displays, especially in LC displays of the PS (polymer stabilized) or PSA (polymer sustained alignment) type.

35 Claims, No Drawings

LIQUID-CRYSTAL DISPLAY

The present invention relates to polymerisable compounds, to processes and intermediates for the preparation thereof, and to the use thereof for optical, electro-optical and electronic purposes, in particular in liquid-crystal (LC) media and LC displays, especially in LC displays of the PS (polymer-stabilised) or PSA (polymer-sustained alignment) type.

The liquid-crystal displays (LC displays) used at present are usually those of the TN (twisted nematic) type. However, these have the disadvantage of a strong viewing-angle dependence of the contrast. In addition, so-called VA (vertical alignment) displays are known which have a broader viewing angle. The LC cell of a VA display contains a layer of an LC medium between two transparent electrodes, where the LC medium usually has a negative value of the dielectric (DC) anisotropy. In the switched-off state, the molecules of the LC layer are aligned perpendicular to the electrode surfaces (homeotropically) or have a tilted homeotropic alignment. On application of an electrical voltage to the electrodes, a realignment of the LC molecules parallel to the electrode surfaces takes place. Furthermore, OCB (optically compensated bend) displays are known which are based on a birefringence effect and have an LC layer with a so-called "bend" alignment and usually positive (DC) anisotropy. On application of an electrical voltage, a realignment of the LC molecules perpendicular to the electrode surfaces takes place. In addition, OCB displays normally contain one or more birefringent optical retardation films in order to prevent undesired transparency to light of the bend cell in the dark state. OCB displays have a broader viewing angle and shorter response times compared with TN displays. Also known are IPS (in-plane switching) displays, which contain an LC layer between two substrates, only one of which has an electrode layer, usually with a comb-shaped structure. On application of a voltage, an electric field which has a significant component parallel to the LC layer is thereby generated. This causes realignment of the LC molecules in the layer plane. Furthermore, so-called FFS (fringe-field switching) displays have been proposed (see, inter alia, S. H. Jung et al., Jpn. J. Appl. Phys., Volume 43, No. 3, 2004, 1028), which likewise contain two electrodes on the same substrate, but, in contrast to IPS displays, only one of these is in the form of a structured (comb-shaped) electrode, and the other electrode is unstructured. A strong, so-called "fringe field" is thereby generated, i.e. a strong electric field close to the edge of the electrodes, and, throughout the cell, an electric field which has both a strong vertical component and also a strong horizontal component. Both IPS displays and also FFS displays have a low viewing-angle dependence of the contrast.

In VA displays of the more recent type, uniform alignment of the LC molecules is restricted to a plurality of relatively small domains within the LC cell. Disclinations may exist between these domains, also known as tilt domains. VA displays having tilt domains have, compared with conventional VA displays, a greater viewing-angle independence of the contrast and the grey shades. In addition, displays of this type are simpler to produce since additional treatment of the electrode surface for uniform alignment of the molecules in the switched-on state, such as, for example, by rubbing, is no longer necessary. Instead, the preferential direction of the tilt or pretilt angle is controlled by a special design of the electrodes. In so-called MVA (multidomain vertical alignment) displays, this is usually achieved by the electrodes having protrusions which cause a local pretilt. As a consequence, the LC molecules are aligned parallel to the electrode surfaces in different directions in different, defined regions of the cell on application of a voltage. "Controlled" switching is thereby achieved, and the formation of interfering disclination lines is prevented. Although this arrangement improves the viewing angle of the display, it results, however, in a reduction in its transparency to light. A further development of MVA uses protrusions on only one electrode side, while the opposite electrode has slits, which improves the transparency to light. The slotted electrodes generate an inhomogeneous electric field in the LC cell on application of a voltage, meaning that controlled switching is still achieved. For further improvement of the transparency to light, the separations between the slits and protrusions can be increased, but this in turn results in a lengthening of the response times. In the so-called PVA (patterned VA), protrusions are rendered completely superfluous in that both electrodes are structured by means of slits on the opposite sides, which results in increased contrast and improved transparency to light, but is technologically difficult and makes the display more sensitive to mechanical influences (tapping, etc.). For many applications, such as, for example, monitors and especially TV screens, however, a shortening of the response times and an improvement in the contrast and luminance (transmission) of the display are demanded.

A further development are the so-called PS or PSA (polymer sustained [alignment]) displays, which are also known under the term "polymer stabilised". In these, a small amount (for example 0.3% by weight, typically <1% by weight) of a polymerisable compound is added to the LC medium and, after introduction into the LC cell, is polymerised or cross-linked in situ, usually by UV photopolymerisation, with or without an electrical voltage applied between the electrodes. The addition of polymerisable mesogenic or liquid-crystalline compounds, also known as "reactive mesogens" (RMs), to the LC mixture has proven particularly suitable. In the meantime, the PSA principle is being used in diverse classical LC displays. Thus, for example, PSA-VA, PSA-OCB, PS-IPS/FFS and PS-TN displays are known. The in-situ polymerisation of the polymerisable compound(s) usually takes place, for example, with an applied electrical voltage in the case of PSA-VA displays, but without an applied electrical voltage in the case of PSA-IPS displays. As can be demonstrated in test cells, the PSA method results in a pretilt in the cell. In the case of PSA-OCB displays, it is therefore possible for the bend structure to be stabilised so that an offset voltage is unnecessary or can be reduced. In the case of PSA-VA displays, this pretilt has a positive effect on response times. For PSA-VA displays, a standard MVA or PVA pixel and electrode layout can be used. In addition, however, it is possible, for example, to manage with only one structured electrode side and no protrusions, which significantly simplifies production and at the same time results in very good contrast at the same time as very good transparency to light.

PSA-VA displays are described, for example, in JP 10-036847 A, EP 1 170 626 A2, EP 1 378 557 A1, EP 1 498 468 A1, US 2004/0191428 A1, US 2006/0066793 A1 and US 2006/0103804 A1. PSA-OCB displays are described, for example, in T.-J- Chen et al., Jpn. J. Appl. Phys. 45, 2006, 2702-2704 and S. H. Kim, L.-C- Chien, Jpn. J. Appl. Phys. 43, 2004, 7643-7647. PS-IPS displays are described, for example, in U.S. Pat. No. 6,177,972 and Appl. Phys. Lett. 1999, 75(21), 3264. PS-TN displays are described, for example, in Optics Express 2004, 12(7), 1221.

In particular for monitor and especially TV applications, optimisation of the response times, but also of the contrast and luminance (thus also transmission) of the LC display continues to be demanded. The PSA method can provide crucial advantages here. In particular in the case of PSA-VA, a shortening of the response times, which correlate with a measurable pretilt in test cells, can be achieved without significant adverse effects on other parameters.

However, it has been found that the LC mixtures and RMs known from the prior art still have some disadvantages on use in PSA displays. Thus, not every desired soluble RM by far is suitable for use in PSA displays, and it is often difficult to find more suitable selection criteria than the direct PSA experiment with pretilt measurement. The choice becomes even smaller if polymerisation by means of UV light without the addition of photoinitiators is desired, which may be advantageous for certain applications. In addition, the LC mixture (also referred to as "LC host mixture" below)+polymerisable component "material system" selected should have the lowest possible rotational viscosity and the best possible electrical properties, with the emphasis here being on the so-called "voltage holding ratio" (VHR or HR). In connection with PSA displays, a high VHR after irradiation with UV light is, in particular, of central importance since UV exposure is a necessary part of the display production process, but naturally also occurs as "normal" exposure in the finished display.

Thus, the problem arises that not all LC mixture+polymerisable component combinations by far are suitable for PSA displays since, for example, no tilt or an inadequate tilt arises or since, for example, the VHR is inadequate for TFT display applications.

In particular, it would be desirable to have available novel materials for PSA displays which generate a particularly small pretilt angle. Materials which generate a lower pretilt angle during polymerisation for the same exposure time than the materials known to date, and/or through the use of which the (higher) pretilt angle that can be achieved using the known materials can already be achieved after a shorter exposure time would be particularly desirable. The production time (tact time) of the display could thus be shortened and the costs of the production process reduced.

A further problem is the occurrence of so-called "image sticking" or "image burn", i.e. the image generated in the LC display by temporary addressing of individual pixels still remains visible even after the electric field in these pixels has been switched off or after other pixels have been addressed.

A further problem in the production of PSA displays is the presence or removal of unpolymerised RMs, in particular after the polymerisation step for the generation of the pretilt angle in the display. For example, unreacted RMs of this type may adversely affect the properties of the display or polymerise in an uncontrolled manner while a voltage is being applied in the display. Controlled reaction of these residual amounts would be simpler if the RM polymerised more quickly and effectively than the materials known to date.

There is thus still a great demand for PSA displays, in particular of the VA and OCB type, and for LC media and polymerisable compounds for use in such displays, which do not have the disadvantages described above or only do so to a small extent and have improved properties. In particular, there is a great demand for PSA displays, and for materials for use in PSA displays, which facilitate a high specific resistance at the same time as a large working-temperature range, short response times, even at low temperatures, and a low threshold voltage, a low pretilt angle, a multiplicity of grey shades, high contrast and a broad viewing angle, and have high values of the voltage holding ratio (VHR) after UV exposure.

The invention has the object of providing novel suitable materials, in particular RMs and LC media comprising these, for use in PSA displays which do not have the disadvantages indicated above or only do so to a reduced extent, polymerise as quickly and completely as possible, enable a low pretilt angle to be established as quickly as possible, reduce or prevent the occurrence of image sticking in the display, and preferably at the same time facilitate very high specific resistance values, low threshold voltages and short response times.

A further object of the invention is the provision of novel RMs, in particular for optical, electro-optical and electronic applications, and of suitable processes and intermediates for the preparation thereof.

This object has been achieved in accordance with the invention by materials and processes as described in the present application. In particular, it has been found, surprisingly, that the use of polymerisable compounds according to the invention based on coumarine or flavone derivatives in PSA displays facilitates particularly low pretilt angles and fast establishment of the desired tilt angles. This has been demonstrated in connection with an LC medium by means of pretilt measurements. In particular, a pretilt has been achieved without the addition of photoinitiator. In addition, the compounds according to the invention exhibit significantly faster generation of the pretilt angle compared with the materials known from the prior art, as has been demonstrated by exposure time-dependent measurements of the pretilt angle. In addition, the polymerisable compounds according to the invention exhibit a significantly higher polymerisation rate, causing smaller unreacted residual amounts to remain in the cell. The electro-optical properties of the cell are thus improved, and in addition controlled reaction of these residual amounts becomes simpler.

Polymerisable coumarine derivatives have already been described in the prior art for other purposes. Thus, US 2003-021913 A1 and WO 96/10049 A1 disclose side-chain polymers containing coumarine groups for use in alignment layers which are obtained by photo-orientation on irradiation of the polymers with linear-polarised light. The coumarine group here is dimerised photochemically. US 2007/0179266 A1 discloses a composition for the production of alignment layers by photo-orientation, comprising a monomer containing a covalently bonded photoisomerisable group and a monomer containing a covalently bonded sensitiser, where the sensitiser can be a coumarine or ketocoumarine. WO 2005/060471 A2 describes a luminescent polymerisable compound containing a fluorene group and two coumarine groups for use in light-emitting layers. EP 0 661 366 A1 and WO 2004/003103 A1 describe luminescent polymerisable compounds, which may also contain, inter alia, a coumarine group, for use in organic light-emitting diodes. In all these documents, either the luminescence or the photoisomerisation or -dimerisation of the coumarine group is utilised. The use of polymerisable coumarine derivatives in low-molecular-weight LC media for rapid establishment of a tilt angle by in-situ polymerisation in an electric field has, however, neither been described nor proposed to date in the prior art.

The invention thus relates to the use of compounds of the formula I

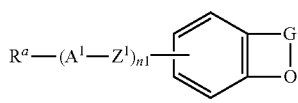

I in which the individual radicals have the following meanings:
G denotes —CM=CR$^c$—CO— or —CO—CM=CR$^c$—,
M denotes —(Z$^2$-A$^2$)$_{n2}$-R$^b$,
A$^1$ and A$^2$ each, independently of one another, denote an aromatic, heteroaromatic, alicyclic or heterocyclic group, preferably having 4 to 25 C atoms, which may also contain fused rings, and which is optionally mono- or polysubstituted by L, $Z^1$ denotes on each occurrence, identically or differently, —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n3}$—, —CF$_2$CH$_2$—, —CH$_2$CF$_2$—, —(CF$_2$)$_{n3}$—, —CH=CH—, —CF=CF—, —CH=CF—, —CF=CH—, —C≡C—, —CH=CH—COO—, —OCO—CH=CH—, —CH$_2$—CH$_2$—COO—, —OCO—CH$_2$—CH$_2$—, —CR$^0$R$^{00}$— or a single bond, $R^{a-c}$ denote P, P-Sp-, H, F, Cl, Br, I, —CN, —NO$_2$, —NCO, —NCS, —OCN, —SCN, SF$_5$ or straight-chain or branched alkyl having 1 to 25 C atoms, in which, in addition, one or more non-adjacent CH$_2$ groups may each be replaced, independently of one another, by —C(R$^{00}$)=C(R$^{000}$)—, —C≡C—, —N(R$^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN or P-Sp-, where at least one of the radicals $R^a$ and $R^b$ denotes or contains a group P or P-Sp-, P denotes on each occurrence, identically or differently, a polymerisable group, Sp denotes on each occurrence, identically or differently, a spacer group or a single bond, $R^{00}$ and $R^{000}$ each, independently of one another, denote H or alkyl having 1 to 12 C atoms, L denotes on each occurrence, identically or differently, P-Sp-, H, OH, CH$_2$OH, halogen, SF$_5$, NO$_2$, a carbon group or hydrocarbon group, n1 and n2 each, independently of one another, denote 0, 1, 2 or 3, n3 denotes 1, 2, 3 or 4, in liquid-crystal (LC) media and LC displays, in particular in LC displays of the PS (polymer stabilised) or PSA (polymer sustained alignment) type.

The invention furthermore relates to an LC medium comprising one or more polymerisable compounds of the formula I and one or more additional compounds, which may also be mesogenic, liquid-crystalline and/or polymerisable.

The invention furthermore relates to an LC medium comprising a polymer obtainable by polymerisation of one or more compounds of the formula I and one or more additional compounds, which may also be mesogenic, liquid-crystalline and/or polymerisable.

The invention furthermore relates to an LC medium comprising a polymerisable component A) comprising one or more polymerisable compounds of the formula I, and a liquid-crystalline component B), also referred to below as "LC host mixture", comprising one or more, preferably two or more, low-molecular-weight (monomeric and unpolymerisable) compounds as described above and below.

The invention furthermore relates to the use of compounds of the formula I and LC media according to the invention in PS and PSA displays, in particular the use in PS and PSA displays containing an LC medium, for the generation of a tilt angle in the LC medium by in-situ polymerisation of the compound(s) of the formula I in the PSA display, preferably with application of an electric or magnetic field.

The invention furthermore relates to an LC display containing one or more compounds of the formula I or an LC medium according to the invention, in particular a PS or PSA display, particularly preferably a PSA-VA, PSA-OCB, PS-IPS, PS-FFS or PS-TN display.

The invention furthermore relates to an LC display of the PS or PSA type comprising an LC cell having two substrates and two electrodes, where at least one substrate is transparent to light and at least one substrate has one or two electrodes, and a layer of an LC medium comprising a polymerised component and a low-molecular-weight component located between the substrates, where the polymerised component is obtainable by polymerisation of one or more polymerisable compounds between the substrates of the LC cell in the LC medium, preferably with application of an electrical voltage to the electrodes, where at least one of the polymerisable compounds is selected from formula I.

The invention furthermore relates to a process for the preparation of an LC medium as described above and below by mixing one or more low-molecular-weight liquid-crystalline compounds, or an LC host mixture as described above and below, with one or more polymerisable compounds of the formula I or sub-formulae thereof, and optionally with further liquid-crystalline compounds and/or additives.

The invention furthermore relates to a process for the production of an LC display as described above and below by mixing one or more low-molecular-weight liquid-crystalline compounds, or an LC host mixture as described above and below, with one or more polymerisable compounds of the formula I or sub-formulae thereof, and optionally with further liquid-crystalline compounds and/or additives, introducing the mixture into an LC cell having two substrates and two electrodes as described above and below, and polymerising the polymerisable compounds, preferably with application of an electrical voltage to the electrodes.

The PS and PSA displays according to the invention have two electrodes, preferably in the form of transparent layers, which are applied to one or both of the substrates which form the LC cell. Either one electrode is applied to each of the two substrates, as, for example, in PSA-VA, PSA-OCB or PSA-TN displays according to the invention, or the two electrodes are applied to only one of the two substrates, while the other substrate has no electrode, as, for example, in PSA-IPS or PSA-FFS displays according to the invention.

The invention furthermore relates to novel processes for the preparation of compounds of the formula I and to novel intermediates used in these processes or obtained therefrom.

The invention furthermore relates to novel compounds of the formula I.

The following meanings apply above and below:

The term "PSA" is, unless indicated otherwise, used to represent PS displays and PSA displays.

The terms "tilt" and "tilt angle" relate to a tilted alignment of the LC molecules of an LC medium relative to the surfaces of the cell in an LC display (here preferably a PS or PSA display). The tilt angle here denotes the average angle (<90°) between the longitudinal molecular axes of the LC molecules (LC director) and the surface of the plane-parallel outer plates which form the LC cell. A low value of the tilt angle (i.e. a large deviation from the 90° angle) corresponds to a large tilt. A suitable method for measurement of the tilt angle is given in the examples. Unless indicated otherwise, tilt angle values disclosed above and below relate to this measurement method.

The term "mesogenic group" is known to the person skilled in the art and is described in the literature, and denotes a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in Pure Appl. Chem. 73(5), 888 (2001) and C. Tschierske, G. Pelzl, S. Diele, Angew. Chem. 2004, 116, 6340-6368.

The term "spacer group", also referred to as "Sp" above and below, is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. Unless indicated otherwise, the term "spacer group" or "spacer" above and below denotes a flexible group which connects the mesogenic group and the polymerisable group(s) to one another in a polymerisable mesogenic compound.

The term "reactive mesogen" or "RM" denotes a compound containing a mesogenic group and one or more functional groups which are suitable for polymerisation (also referred to as polymerisable group or group P).

The terms "low-molecular-weight compound" and "unpolymerisable compound" denote compounds, usually monomeric, which contain no functional group which is suitable for polymerisation under the usual conditions known to the person skilled in the art, in particular under the conditions used for the polymerisation of RMs.

The term "organic group" denotes a carbon or hydrocarbon group.

The term "carbon group" denotes a mono- or polyvalent organic group containing at least one carbon atom which either contains no further atoms (such as, for example, —C≡C—) or optionally contains one or more further atoms, such as, for example, N, O, S, P, Si, Se, As, Te or Ge (for example carbonyl, etc.). The term "hydrocarbon group" denotes a carbon group which additionally contains one or more H atoms and optionally one or more heteroatoms, such as, for example, N, O, S, P, Si, Se, As, Te or Ge.

"Halogen" denotes F, Cl, Br or I.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also have spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" in accordance with the above definition containing one or more heteroatoms.

Preferred carbon and hydrocarbon groups are optionally substituted alkyl, alkenyl, alkynyl, alkoxy, alkylcarbonyl, alkoxycarbonyl, alkylcarbonyloxy and alkoxycarbonyloxy having 1 to 40, preferably 1 to 25, particularly preferably 1 to 18, C atoms, optionally substituted aryl or aryloxy having 6 to 40, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25, C atoms.

Further preferred carbon and hydrocarbon groups are $C_1$-$C_{40}$ alkyl, $C_2$-$C_{40}$ alkenyl, $C_2$-$C_{40}$ alkynyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkynyl, $C_3$-$C_{22}$ allyl, $C_4$-$C_{22}$ alkyldienyl, $C_6$-$C_{12}$ aryl, $C_6$-$C_{20}$ arylalkyl and $C_2$-$C_{20}$ heteroaryl.

Further preferred carbon and hydrocarbon groups are straight-chain, branched or cyclic alkyl radicals having 1 to 40, preferably 1 to 25, C atoms, which are unsubstituted or mono- or polysubstituted by F, Cl, Br, I or ON, and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

$R^x$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O—, and in which one or more H atoms may be replaced by fluorine, an optionally substituted aryl or aryloxy group having 6 to 40 C atoms, or an optionally substituted heteroaryl or heteroaryloxy group having 2 to 40 C atoms.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptyloxy, n-octyloxy, n-nonyloxy, n-decyloxy, n-undecyloxy, n-dodecyloxy, etc.

Preferred amino groups are, for example, dimethylamino, methylamino, methylphenylamino, phenylamino, etc.

Aryl and heteroaryl groups can be monocyclic or polycyclic, i.e. they can have one ring (such as, for example, phenyl) or two or more rings, which may also be fused (such as, for example, naphthyl) or covalently linked (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic aryl groups having 2 to 25 C atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, pyrene, dihydropyrene, chrysene, perylene, tetracene, pentacene, benzo-pyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those which contain exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 3 to 25 C atoms, which optionally contain fused rings and are optionally substituted. Preference is furthermore given to 5-, 6-, 7- or 8-membered carbocyclic groups in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" above and below, are, for example, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, in which $R^x$ has the meaning indicated above, and $Y^1$ denotes halogen, optionally substituted silyl or aryl having 6 to 40, preferably 6 to 20 C atoms, and straight-chain or branched alkyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means substituted by halogen, —CN, $R^0$, —$OR^0$, —CO—$R^0$, —CO—O—$R^0$, —O—CO—$R^0$ or —O—CO—O—$R^0$, in which $R^0$ has the meaning indicated above.

Particularly preferred substituents L are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

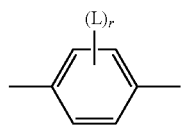

is preferably

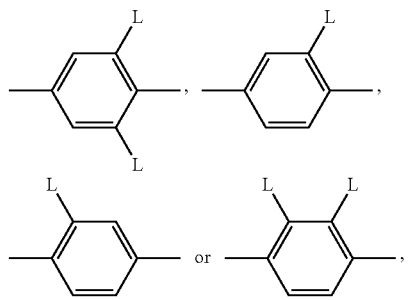

in which L has one of the meanings indicated above.

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or C≡C triple bond, and groups which are suitable for polymerisation with ring opening, such as, for example, oxetane or epoxide groups.

Preferred groups P are selected from $CH_2$=$CW^1$—COO—, $CH_2$=$CW^1$—CO—,

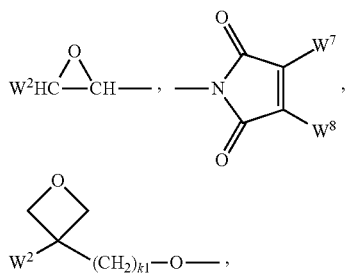

$CH_2$=$CW^2$—(O)$_{k3}$—, $CW^1$=CH—CO—(O)$_{k3}$—, $CW^1$=CH—CO—NH—, $CH_2$=$CW^1$—CO—NH—, $CH_3$—CH=CH—O—, ($CH_2$=CH)$_2$CH—OCO—, ($CH_2$=CH—$CH_2$)$_2$CH—OCO—, ($CH_2$=CH)$_2$CH—O—, ($CH_2$=CH—$CH_2$)$_2$N—, ($CH_2$=CH—$CH_2$)$_2$N—CO—,

HO—CW²W³—, HS—CW²W³—, HW²N—, HO—CW²W³—NH—, CH₂=CW¹—CO—NH—, CH₂=CH—(COO)$_{k1}$-Phe-(O)$_{k2}$—, CH₂=CH—(CO)$_{k1}$-Phe-(O)$_{k2}$—, Phe-CH=CH—, HOOC—, OCN— and W⁴W⁵W⁶Si—, in which W¹ denotes H, F, Cl, CN, CF₃, phenyl or alkyl having 1 to 5 C atoms, in particular H, F, Cl or CH₃, W² and W³ each, independently of one another, denote H or alkyl having 1 to 5 C atoms, in particular H, methyl, ethyl or n-propyl, W⁴, W⁵ and W⁶ each, independently of one another, denote Cl, oxaalkyl or oxacarbonylalkyl having 1 to 5 C atoms, W⁷ and W⁸ each, independently of one another, denote H, Cl or alkyl having 1 to 5 C atoms, Phe denotes 1,4-phenylene, which is optionally substituted by one or more radicals L as defined above which are different from P-Sp-, and k₁, k₂ and k₃ each, independently of one another, denote 0 or 1, k₃ preferably denotes 1.

Particularly preferred groups P are CH₂=CW¹—COO—, in particular CH₂=CH—COO—, CH₂=C(CH₃)—COO— and CH₂=CF—COO—, furthermore CH₂=CH—O—, (CH₂=CH)₂CH—OCO—, (CH₂=CH)₂CH—O—,

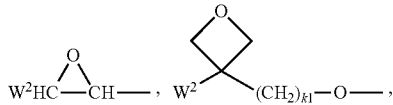

Very particularly preferred groups P are vinyloxy, acrylate, methacrylate, fluoroacrylate, chloroacrylate, oxetane and epoxide, in particular acrylate and methacrylate.

Preferred spacer groups Sp are selected from the formula Sp'-X', so that the radical P-Sp- conforms to the formula P-Sp'-X'—, where Sp' denotes alkylene having 1 to 20, preferably 1 to 12, C atoms, which is optionally mono- or polysubstituted by F, Cl, Br, I or CN, and in which, in addition, one or more non-adjacent CH₂ groups may each be replaced, independently of one another, by —O—, —S—, —NH—, —NR⁰—, —SiR⁰⁰R⁰⁰⁰—, —CO—, —COO—, —OCO—, —OCO—O—, —S—CO—, —CO—S—, —NR⁰⁰—CO—O—, —O—OC—NR⁰⁰—, —NR⁰⁰—CO—NR⁰⁰—, —CH=CH— or —C≡C— in such a way that O and/or S atoms are not linked directly to one another, X' denotes —O—, —S—, —CO—, —COO—, —OCO—, —O—COO—, —CO—NR⁰⁰—, —NR⁰⁰—CO—, —NR⁰⁰—CO—NR⁰⁰—, —OCH₂—, —CH₂O—, —SCH₂—, —CH₂S—, —CF₂O—, —OCF₂—, —CF₂S—, —SCF₂—, —CF₂CH₂—, —CH₂CF₂—, —CF₂CF₂—, —CH=N—, —N=CH—, —N=N—, —CH=CR⁰—, —CY²=CY³—, —C≡C—, —CH=CH—COO—, —OCO—CH=CH— or a single bond, R⁰⁰ and R⁰⁰⁰ each, independently of one another, denote H or alkyl having 1 to 12 C atoms, and Y² and Y³ each, independently of one another, denote H, F, Cl or CN.

X' is preferably —O—, —S—, —CO—, —COO—, —OCO—, —O—COO—, —CO—NR⁰—, —NR⁰—CO—, —NR⁰—CO—NR⁰— or a single bond.

Typical spacer groups Sp' are, for example, —(CH₂)$_{p1}$—, —(CH₂CH₂O)$_{q1}$—CH₂CH₂—, —CH₂CH₂—S—CH₂CH₂—, —CH₂CH₂—NH—CH₂CH₂— or —(SiR⁰⁰R⁰⁰⁰—O)$_{p1}$—, in which p1 is an integer from 1 to 12, q1 is an integer from 1 to 3, and R⁰⁰ and R⁰⁰⁰ have the meanings indicated above.

Particularly preferred groups -Sp'-X'— are —(CH₂)$_{p1}$—, —(CH₂)$_{p1}$—O—, —(CH₂)$_{p1}$—OCO—, —(CH₂)$_{p1}$—OCOO—, in which p1 and q1 the meaning indicated above.

Particularly preferred groups Sp' are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethyl-ene-N-methyliminoethylene, 1-methylalkylene, ethenylene, propenylene and butenylene.

In a further preferred embodiment of the invention, R$^a$ and/or R$^b$ in formula I denote a radical containing two or more polymerisable groups (multifunctional polymerisable radicals). Suitable radicals of this type, and polymerisable compounds containing them and the preparation thereof, are described, for example, in U.S. Pat. No. 7,060,200 B1 or US 2006/0172090 A1. Particular preference is given to multifunctional polymerisable radicals selected from the following formulae:

| | |
|---|---|
| —X-alkyl-CHP¹—CH₂—CH₂P² | I*a |
| —X-alkyl-C(CH₂P¹)(CH₂P²)—CH₂P³ | I*b |
| —X-alkyl-CHP¹CHP²—CH₂P³ | I*c |
| —X-alkyl-C(CH₂P¹)(CH₂P²)—C$_{aa}$H$_{2aa+1}$ | I*d |
| —X-alkyl-CHP¹—CH₂P² | I*e |
| —X-alkyl-CHP¹P² | I*f |
| —X-alkyl-CP¹P²—C$_{aa}$H$_{2aa+1}$ | I*g |
| —X-alkyl-C(CH₂P¹)(CH₂P²)—CH₂OCH₂—C(CH₂P³)(CH₂P⁴)CH₂P⁵ | I*h |
| —X-alkyl-CH((CH₂)$_{aa}$P¹)((CH₂)$_{bb}$P²) | I*i |
| —X-alkyl-CHP¹CHP²—C$_{aa}$H$_{2aa+1}$ | I*k |
| —X'-alkyl-C(CH₃)(CH₂P¹)(CH₂P²) | I*m | in which alkyl denotes a single bond or straight-chain or branched alkylene having 1 to 12 C atoms, in which one or more non-adjacent CH₂ groups may each be replaced, independently of one another, by) —C(R⁰⁰)=C(R⁰⁰⁰)—, —C≡C—, —N(R⁰⁰)—, —O—, —S—, —CO—, —CO—O—, —O—CO—, —O—CO—O— in such a way that O and/or S atoms are not linked directly to one another, and in which, in addition, one or more H atoms may be replaced by F, Cl or CN, where R⁰⁰ and R⁰⁰⁰ have the meaning indicated above, aa and bb each, independently of one another, denote 0, 1, 2, 3, 4, 5 or 6, X has one of the meanings indicated for X', and P$^{1-5}$ each, independently of one another, have one of the meanings indicated for P.

Particularly preferred compounds of the formula I and sub-formulae thereof indicated above and below are those in which A¹ and A² each, independently of one another, denote 1,4-phenylene, naphthalene-1,4-diyl or naphthalene-2,6-diyl, where one or more CH groups in these groups may also be replaced by N, cyclohexane-1,4-diyl, in which, in addition, one or more non-adjacent CH₂ groups may be replaced by O and/or S, 1,4-cyclohexenylene, bicyclo[1.1.1]pentane-1,3-diyl, bicyclo-[2.2.2]octane-1,4-diyl, spiro[3.3]heptane-2,6-diyl, piperidine-1,4-diyl, decahydronaphthalene-2,6- diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L, L denotes P, P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, straight-chain or branched alkyl or alkoxy having 1 to 25 C atoms, or straight-chain or branched alkenyl, alkynyl, alkylcarbonyl, alkoxycarbonyl, alkylcarbonyloxy or alkoxycarbonyloxy having 2 to 25 C atoms, in which, in addition, one or more H atoms in all these groups may be replaced by F, Cl, P or P-Sp-, Y$^1$ denotes halogen, and R$^x$ denotes P, P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl or P-Sp-.

Further preferred compounds of the formula I and sub-formulae thereof indicated above and below are those in which R$^a$ and R$^b$ denote identical or different radicals P-Sp-, R$^a$ and R$^b$ denote identical or different radicals P-Sp- in which one or both radicals Sp denote a single bond, one of the radicals R$^a$ and R$^b$ denotes or contains a group P-Sp- and the other denotes an unpolymerisable group, preferably selected from straight-chain or branched alkyl having 1 to 25 C atoms, in which, in addition, one or more non-adjacent CH$_2$ groups may each be replaced, independently of one another, by —C(R$^{00}$)=C(R$^{000}$)—, —C≡C—, —N(R$^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I or CN, R$^a$ denotes P-Sp-, R$^b$ denotes P-Sp-, R$^c$ denotes H, C$_{1-8}$-alkyl or C$_{1-8}$-alkoxy, Sp denotes a single bond, Sp denotes —(CH$_2$)$_{p1}$—, —(CH$_2$)$_{p1}$—O—, —(CH$_2$)$_{p1}$—OCO— or —(CH$_2$)$_{p1}$—OCOO—, in which p1 denotes an integer from 1 to 12 and r1 denotes an integer from 1 to 8, L does not denote or contain a polymerisable group, A$^1$ and A$^2$ are selected from the group consisting of 1,4-phenylene and naphthalene-2,6-diyl, where, in addition, one or two CH groups in these rings may be replaced by N, where these rings may be mono- or polysubstituted by L, as described above and below, Z$^1$ and Z$^2$ are selected from the group consisting of —O—, —CO—O—, —OCO—, —OCH$_2$—, —CH$_2$O—, —CF$_2$O—, —OCF$_2$—, —CH$_2$CH$_2$—, —CH=CH—, —CF=CF—, —CH=CF—, —CF=CH—, —C≡C—, single bond, n1 denotes 0 or 1, preferably 0, n2 denotes 0, n2 is other than 0 and preferably denotes 1 or 2, particularly preferably 1, —(Z$^2$-A$^2$)$_{n2}$- does not denote —CO—C$_6$H$_4$— (where C$_6$H$_4$ stands for 1,4-phenylene), —(Z$^2$-A$^2$)$_{n2}$-R$^b$ does not denote —CO—C$_6$H$_5$, L is an unpolymerisable group, preferably selected from F, Cl, —CN and straight-chain or branched alkyl having 1 to 25, particularly preferably 1 to 10, C atoms, in which, in addition, one or more non-adjacent CH$_2$ groups may each be replaced, independently of one another, by —C(R$^{00}$)=C(R$^{000}$)—, —C≡C—, —N(R$^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I or CN.

Particularly preferred compounds of the formula I are selected from the group consisting of the following sub-formulae:

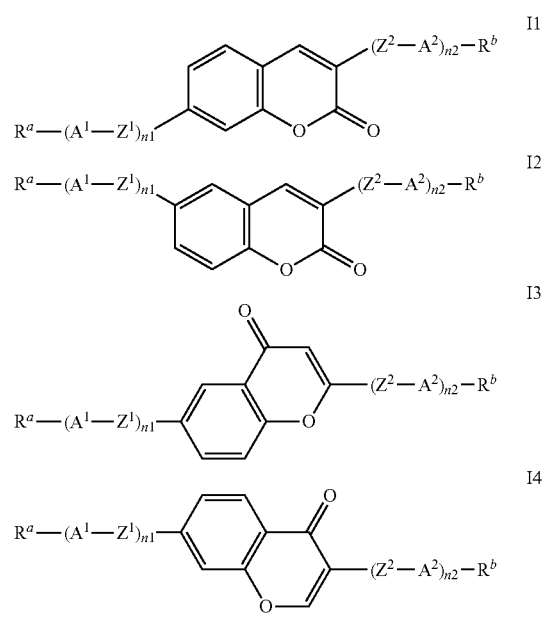

in which R$^{a,b}$, A$^{1,2}$, Z$^{1,2}$, n1 and n2 each, independently of one another, have one of the meanings indicated in formula I or above and below.

The groups -(A$^1$-Z$^1$)$_{n1}$— and —(Z$^2$-A$^2$)$_{n2}$- in the compounds of the formulae I, I1, I2, I3 and I4 preferably denote 1,4-phenylene or naphthalene-2,6-diyl, where, in addition, one or two CH groups in these rings may be replaced by N, and where, in addition, these rings may be mono- or polysubstituted by L, as described above and below.

Particular preference is given to compounds of the formulae I1 to I4 in which n1 and n2 denote 0, and those in which one of the indices n1 and n2, preferably n1, denotes 0 and the other denotes 1.

Particular preference is furthermore given to compounds of the formulae I1 to I4 in which the radicals R$^a$ and R$^b$ denote P-Sp-, and those in which one of the radicals R$^a$ and R$^b$, preferably R$^a$, denotes P-Sp- and the other denotes an unpolymerisable group, preferably selected from straight-chain or branched alkyl having 1 to 25 C atoms, in which, in addition, one or more non-adjacent CH$_2$ groups may each be replaced, independently of one another, by —C(R$^{00}$)=C(R$^{000}$)—, —C≡C—, —N(R$^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I or CN.

Particular preference is furthermore given to compounds of the formulae I1 to I4 in which both radicals R$^a$ and R$^b$ denote P-Sp-, where one group Sp denotes a single bond and the other group Sp is not a single bond.

Very particularly preferred compounds of the formulae I1 to I4 are selected from the group consisting of the following sub-formulae:

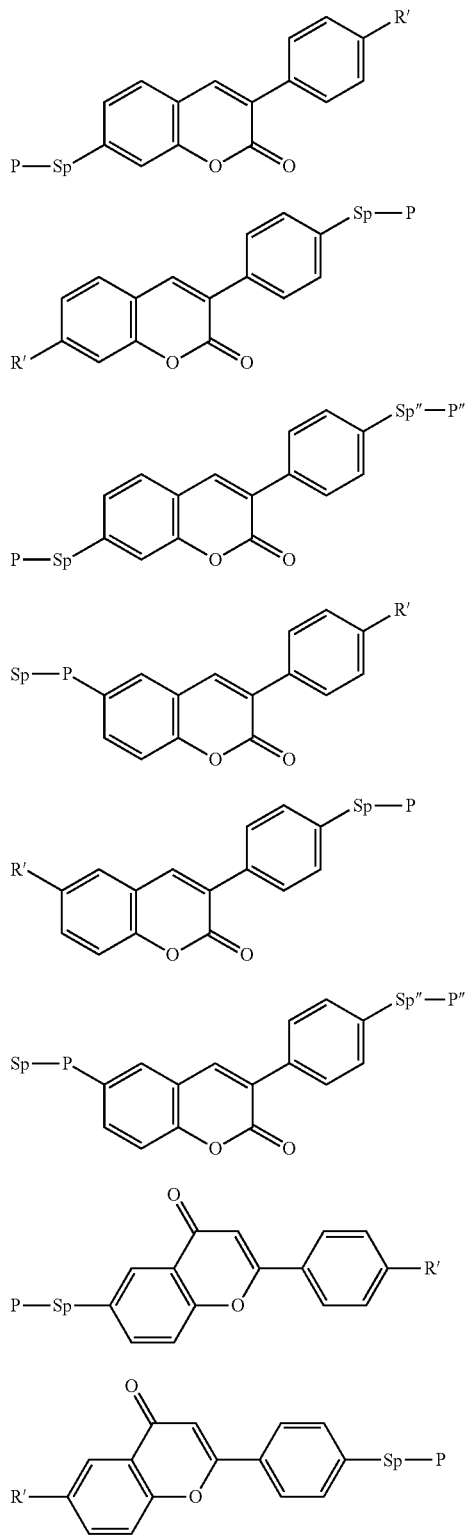

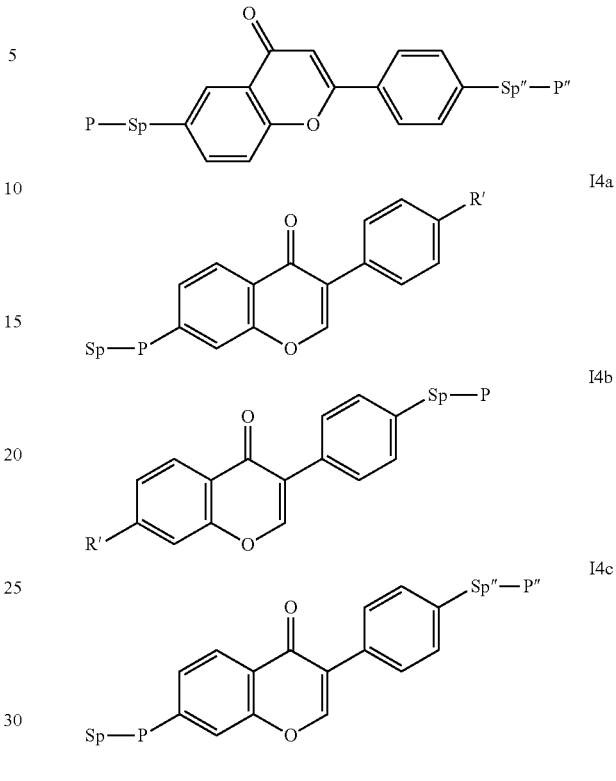

in which P and Sp have one of the meanings indicated in formula I or above and below, P'' has one of the meanings indicated for P in formula I or above and below, Sp'' has one of the meanings indicated for Sp in formula I or above and below, and R has one of the meanings indicated for $R^a$ in formula I or above and below, where R' is other than H and does not denote or contain a group P-Sp-.

P and P'' in the compounds of the formulae I, I1 to I4 and sub-formulae thereof preferably denote an acrylate, fluoroacrylate or methacrylate group.

Sp and Sp'' in the compounds of the formulae I, I1 to I4 and sub-formulae thereof preferably denote —$(CH_2)_{p1}$—, —O—$(CH_2)_{p1}$—, —$(CH_2)_{p1}$—O—, —OCO—$(CH_2)_{p1}$—, —$(CH_2)_{p1}$—OCO—, —OCOO—$(CH_2)_{p1}$— or —$(CH_2)_{p1}$—OCOO—, in which p1 denotes an integer from 1 to 12, preferably from 1 to 6, and r1 denotes an integer from 1 to 8, preferably 1, 2 or 3, where these groups are linked to P or P'' in such a way that O atoms are not linked directly to one another.

Preference is furthermore given to compounds of the sub-formulae I1a-I4c in which one of the radicals Sp and Sp'' denotes a single bond and the other is not a single bond.

The invention furthermore relates to novel compounds of the formula I and sub-formulae I1 to I4 thereof in which the individual radicals have the meaning indicated in formula I or above and below, with the proviso that a) the two radicals $R^a$ and $R^b$ each, independently of one another, denote P-Sp-,
and/or
b) n1 and n2 are other than 0,
and/or
c) n2 is other than 0.

Particular preference is given to novel compounds of the formula I and sub-formulae I1 to I4 thereof in which n2 is other than 0 and preferably denotes 1 or 2. —$(Z^2-A^2)_{n2}$- preferably does not denote —CO—$C_6H_4$— (where $C_6H_4$ stands for 1,4-phenylene), and —$(Z^2-A^2)_{n2}$-$R^b$ preferably does not denote —CO—$C_6H_5$.

Preference is furthermore given to compounds having one or more of the provisos a)-d), selected from the sub-formulae I1a to I4c as defined above.

The invention furthermore relates to novel intermediates for the preparation of compounds of the formula I, selected from the following formula:

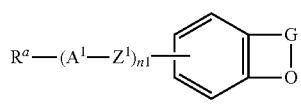

in which G, $A^1$, $Z^1$ and n1 have the meaning indicated in formula I or above and below, and the radicals $R^a$ and $R^b$ each, independently of one another, denote -Sp-O—Sg, where Sp has the meaning indicated in formula I or above and below, and Sg denotes an H atom or a protecting group.

For the compounds of the formula I*, provisos a) and/or b) and/or c) and/or d) as indicated above preferably apply, where, if n2 is other than 0, —$(Z^2-A^2)_{n2}$- preferably does not denote —CO—$C_6H_4$— (where $C_6H_4$ stands for 1,4-phenylene) and —$(Z^2-A^2)_{n2}$-$R^b$ preferably does not denote —CO—$C_6H_5$.

Suitable protecting groups Sg are known to the person skilled in the art. Preferred protecting groups are alkyl, acyl and alkyl- or arylsilyl groups, 2-tetrahydropyranyl or methoxymethyl.

Particularly preferred intermediates are selected from the sub-formulae I1 to I4 as indicated above, where $R^a$ and $R^b$ are as defined in formula I*.

Very particularly preferred intermediates are selected from the group consisting Of the following sub-formulae:

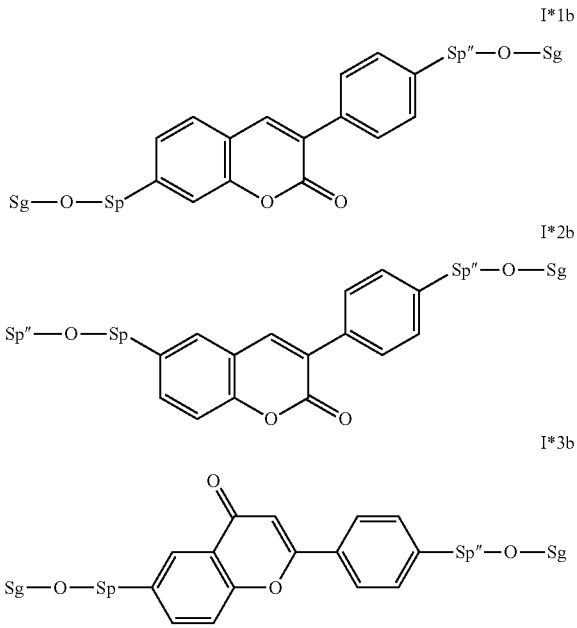

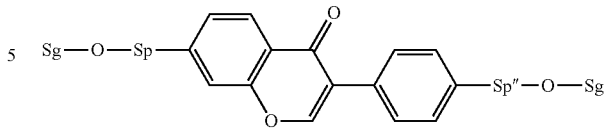

in which Sp, Sp" and Sg have the meanings indicated above, and Sg particularly preferably denotes H. Particular preference is given to compounds of the formulae shown above in which one of the radicals Sp and Sp" denotes —$(CH_2)_{p1}$— or a single bond and the other denotes a single bond, where p1 is as defined above.

The compounds and intermediates of the formulae I and I* and sub-formulae thereof can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart. For example, compounds of the formula I are synthesised by esterification or etherification of the intermediates of the formula I using corresponding acids, acid derivatives, or halogenated compounds containing a group P, such as, for example, (meth)acryloyl chloride or methacrylic anhydride in the presence of a base, or (meth)acrylic acid in the presence of a dehydrating reagent, such as, for example, DCC (dicyclohexylcarbodiimide).

Particularly suitable and preferred processes for the preparation of compounds and intermediates of the formulae I and I* are depicted by way of example in the following schemes and preferably comprise one or more of the steps described below.

General access to coumarines is provided, for example, by condensation of salicylaldehydes with phenylacetic acid derivatives in the sense of a Perkin reaction in accordance with Scheme 1, as described, for example, for hydroxyphenylcoumarines in S. Kirkiacharian et al., Annales Pharmaceutiques Françaises (2003), 61(1), 51-56.

Scheme 1

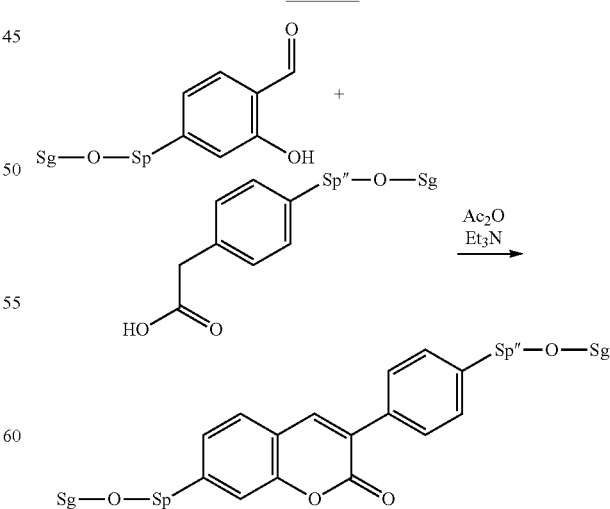

Isoflavones are accessible by the method of R. J. Bass, Chem. Comm. 1976, 78, by treatment of benzyl aryl ketones with boron trifluoride etherate in the presence of mesyl chloride in dimethylformamide. The ketones themselves can be prepared in a simple manner by carbonylating Suzuki reaction by the method of A. Suzuki et al., J. Org. Chem. 1998, 63, 4762, as shown by way of example in Scheme 2:

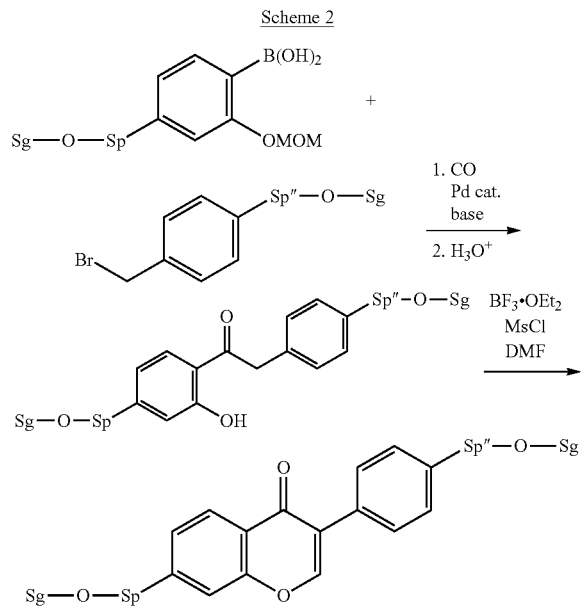

Alternatively, isoflavones can also be obtained by the method of K. M. Dawood, Tetrahedron 2007, 63, 9642, from chromanones via the corresponding bromoisoflavones by Suzuki reaction, as shown by way of example in Scheme 3:

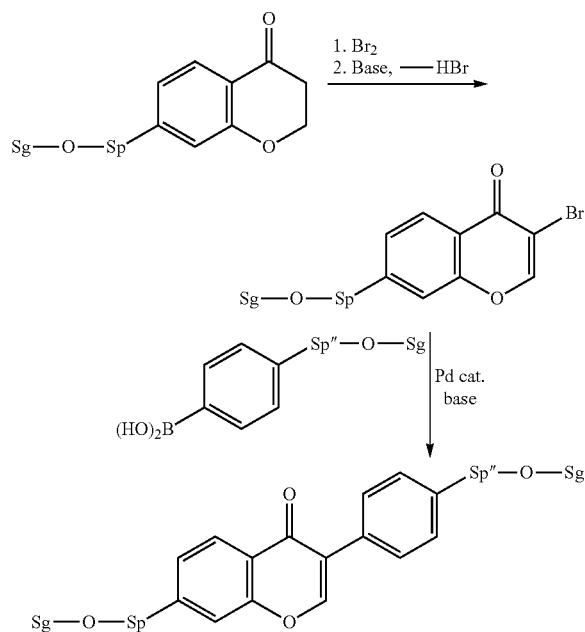

The flavones according to the invention are prepared, for example, by Baker-Venkataraman rearrangement (W. Baker, Nature 1952, 169, 706) or they can be prepared by the method of E. U. Mughal et al., Bioorg. Med. Chem. 2006, 14, 4704, from o-acylphenols by aldol condensation with aromatic aldehydes and subsequent oxidative cyclisation, as shown by way of example in Scheme 4:

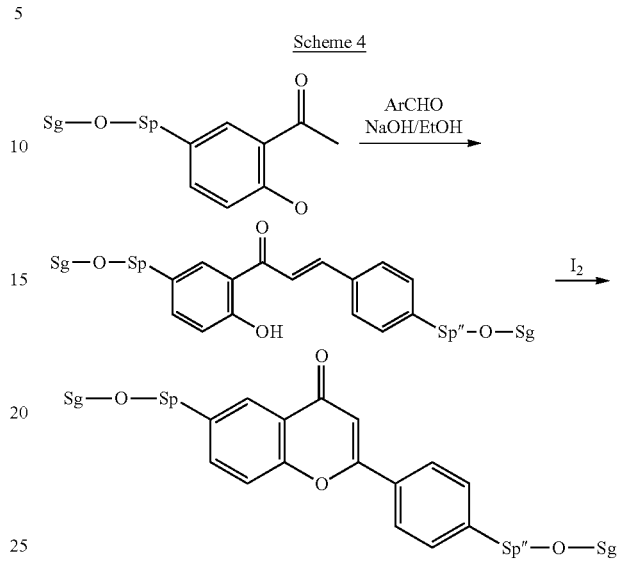

For the production of PSA displays, the polymerisable compounds are polymerised or crosslinked (if a compound contains two or more polymerisable groups) by in-situ polymerisation in the LC medium between the substrates of the LC display with application of a voltage. The polymerisation can be carried out in one step. It is also possible firstly to carry out the polymerisation in a first step with application of a voltage in order to generate a pretilt angle, and subsequently to polymerise or crosslink the compounds which have not reacted in the first step in a second polymerisation step without an applied voltage ("end curing").

Suitable and preferred polymerisation methods are, for example, thermal or photopolymerisation, preferably photopolymerisation, in particular UV photopolymerisation. If necessary, one or more initiators can also be added here. Suitable conditions for the polymerisation, and suitable types and amounts of initiators, are known to the person skilled in the art and are described in the literature. For example, the commercially available photoinitiators Irgacure651®, Irgacure184®, Irgacure907®, Irgacure369® or Darocure1173® (Ciba AG) are suitable for free-radical polymerisation. If an initiator is employed, its proportion is preferably 0.001 to 5% by weight, particularly preferably 0.001 to 1% by weight. However, the polymerisation can also be carried out without addition of an initiator. In a further preferred embodiment, the LC medium does not comprise a polymerisation initiator.

The polymerisable component A) or the LC medium may also comprise one or more stabilisers in order to prevent undesired spontaneous polymerisation of the RMs, for example during storage or transport. Suitable types and amounts of stabilisers are known to the person skilled in the art and are described in the literature. For example, the commercially available stabilisers from the Irganox® series (Ciba AG), such as, for example, Irganox® 1076, are particularly suitable. If stabilisers are employed, their proportion, based on the total amount of the RMs or the polymerisable component A), is preferably 10-10,000 ppm, particularly preferably 50-500 ppm.

The polymerisable compounds according to the invention are also suitable for polymerisation without an initiator, which is accompanied by considerable advantages, such as, for example, lower material costs and in particular less contamination of the LC medium by possible residual amounts of initiator or degradation products thereof.

The LC media according to the invention for use in PSA displays preferably comprise <5% by weight, particularly preferably <1% by weight, very particularly preferably <0.5% by weight, of polymerisable compounds, in particular polymerisable compounds of the formulae indicated above.

Particular preference is given to LC media comprising one, two or three polymerisable compounds of the formula I.

Preference is furthermore given to LC media in which the polymerisable component (component A) consists exclusively of polymerisable compounds of the formula I.

Preference is furthermore given to LC media in which component B) is an LC compound or LC mixture which has a nematic liquid-crystal phase.

Preference is furthermore given to achiral polymerisable compounds of the formula I and to LC media in which the compounds of component A) and/or B) are selected exclusively from the group consisting of achiral compounds.

Preference is furthermore given to LC media in which the polymerisable component or component A) comprises one or more polymerisable compounds of the formula I containing one polymerisable group (monoreactive) and one or more polymerisable compounds of the formula I containing two or more, preferably two, polymerisable groups (di- or multireactive).

Preference is furthermore given to PSA displays and LC media in which the polymerisable component or component A) consists exclusively of polymerisable compounds of the formula I containing two polymerisable groups (direactive).

The proportion of the polymerisable component or component A) in the LC media according to the invention is preferably <5%, particularly preferably <1%, very particularly preferably <0.5%.

The proportion of the liquid-crystalline component or component B) in the LC media according to the invention is preferably >95%, particularly preferably >99%.

The polymerisable compounds of the formula I can be polymerised individually, but it is also possible for mixtures which comprise two or more compounds of the formula I or mixtures comprising one or more compounds of the formula I and one or more further polymerisable compounds (comonomers), which are preferably mesogenic or liquid-crystalline, to be polymerised. Polymerisation of such mixtures gives copolymers. The invention furthermore relates to the polymerisable mixtures mentioned above and below. The polymerisable compounds and comonomers are mesogenic or non-mesogenic, preferably mesogenic or liquid-crystalline.

Suitable and preferred mesogenic comonomers, particularly for use in PSA displays, are selected, for example, from the following formulae:

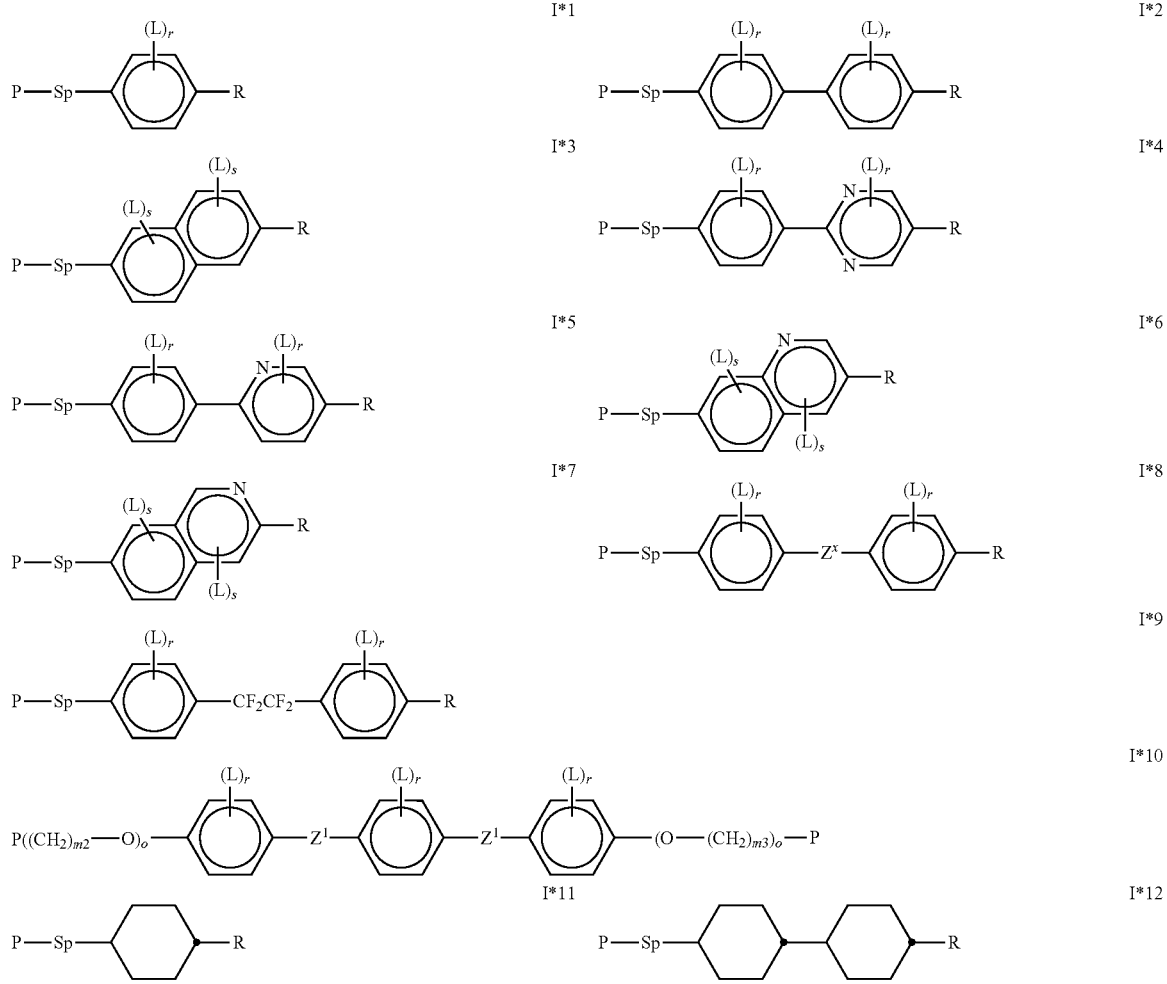

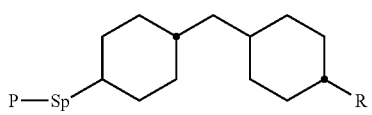

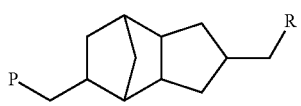

I*13

I*14

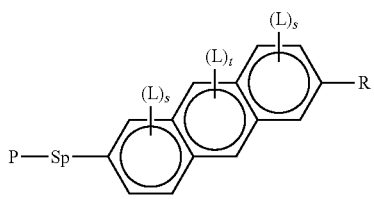

I*15

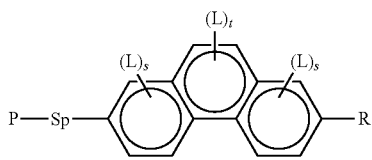

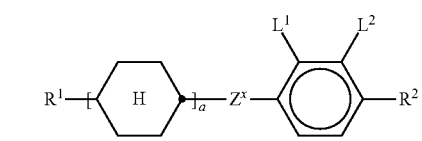

I*16

I*17 in which

R has one of the meanings indicated above for $R^x$ and preferably denotes P, P-Sp- or straight-chain or branched alkyl or alkoxy having 1 to 12 C atoms, P has one of the meanings indicated above and preferably denotes acrylate or methacrylate, Sp has one of the meanings indicated above or denotes a single bond, $Z^2$ and $Z^3$ each, independently of one another, denote —COO— or —OCO—, L has the meaning indicated above in formula I, L' and L" each, independtly of one another, denote H, F, Cl, r denotes 0, 1, 2, 3 or 4, s denotes 0, 1, 2 or 3, t denotes 0, 1 or 2, x denotes 0 or 1, and $R^y$ and $R^z$ each, independently of one another, denote H or $CH_3$.

Besides the polymerisable compounds described above, the LC media for use in the LC displays according to the invention comprise an LC mixture ("host mixture") comprising one or more, preferably two or more, low-molecular-weight (i.e. monomeric or unpolymerised) compounds. The latter are stable or unreactive to a polymerisation reaction under the conditions used for polymerisation of the polymerisable compounds. In principle, a suitable host mixture is any LC mixture which is suitable for use in conventional VA or OCB displays. Suitable LC mixtures are known to the person skilled in the art and are described in the literature, for example mixtures in VA displays in EP 1 378 557 A1 and mixtures for OCB displays in EP 1 306 418 A1 and DE 102 24 046 A1.

Particularly preferred LC displays, LC host mixtures and LC media are mentioned below:

a) LC medium which comprises one or more compounds of the formulae CY and/or PY:

CY

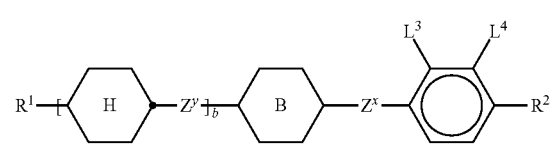

PY in which the individual radicals have the following meanings:

a denotes 1 or 2, b denotes 0 or 1,

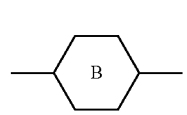

denotes

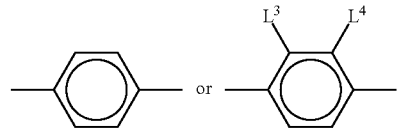

$R^1$ and $R^2$ each, independently of one another, denote alkyl having 1 to 12 C atoms, in which, in addition, one or two non-adjacent $CH_2$ groups may be replaced by —O—, —CH=CH—, —CO—, —OCO— or —COO— in such a way that O atoms are not linked directly to one another, preferably alkyl or alkoxy having 1 to 6 C atoms, $Z^x$ and $Z^y$ each, independently of one another, denote —CH₂CH₂—, —CH=CH—, —CF₂O—, —OCF₂—, —CH₂O—, —OCH₂—, —COO—, —OCO—, —C₂F₄—, —CF=CF—, —CH=CHCH₂O— or a single bond, preferably a single bond, $L^{1-4}$ each, independently of one another, denote F, Cl, OCF₃, CF₃, CH₃, CH₂F, CHF₂.

Preferably, both radicals $L^1$ and $L^2$ denote F or one of the radicals $L^1$ and $L^2$ denotes F and the other denotes Cl, or both radicals $L^3$ and $L^4$ denote F or one of the radicals $L^3$ and $L^4$ denotes F and the other denotes Cl.

The compounds of the formula CY are preferably selected from the group consisting of the following sub-formulae:

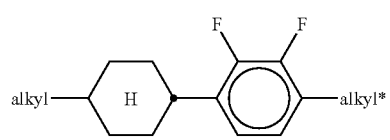

CY1–CY19 (structural formulae shown).

-continued

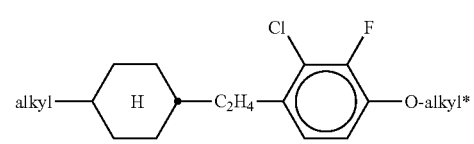
CY20

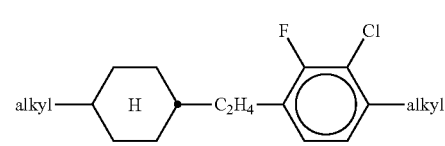
CY21

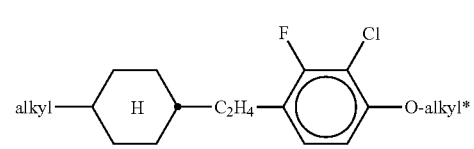
CY22

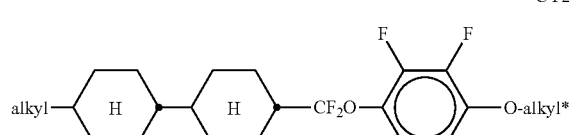
CY23

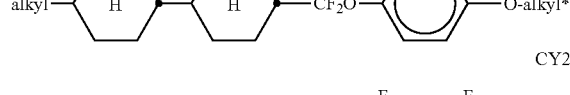
CY24

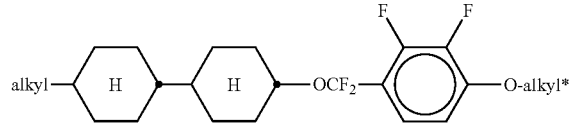
CY25

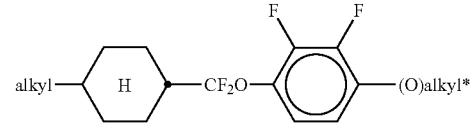
CY25

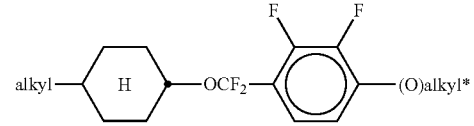
CY26

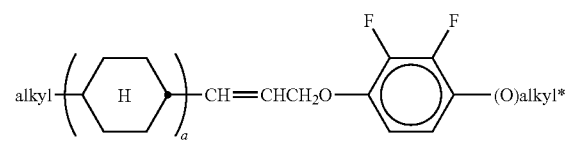
CY27

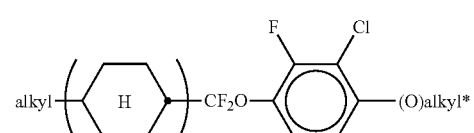
CY28 in which a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

The compounds of the formula PY are preferably selected from the group consisting of the following sub-formulae:

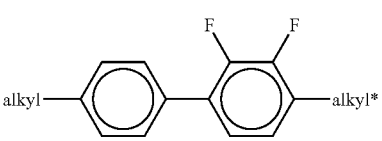
PY1

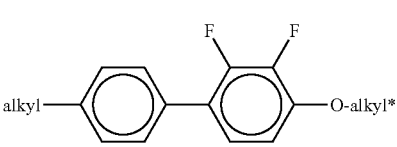
PY2

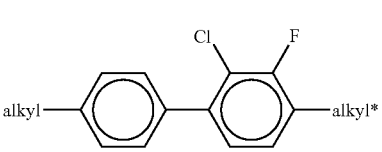
PY3

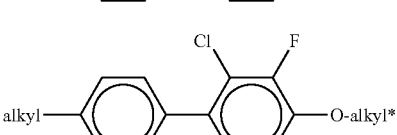
PY4

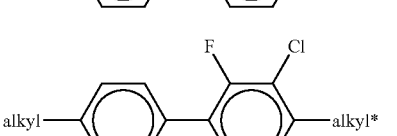
PY5

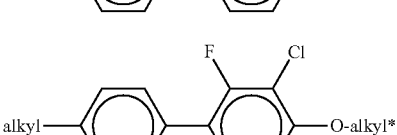
PY6

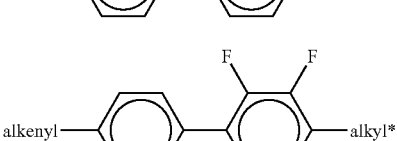
PY7

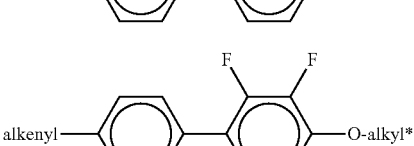
PY8

PY9

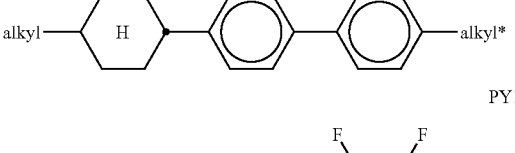
PY10

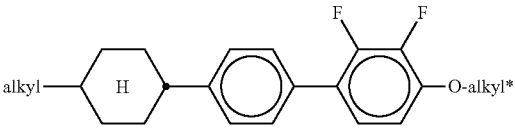

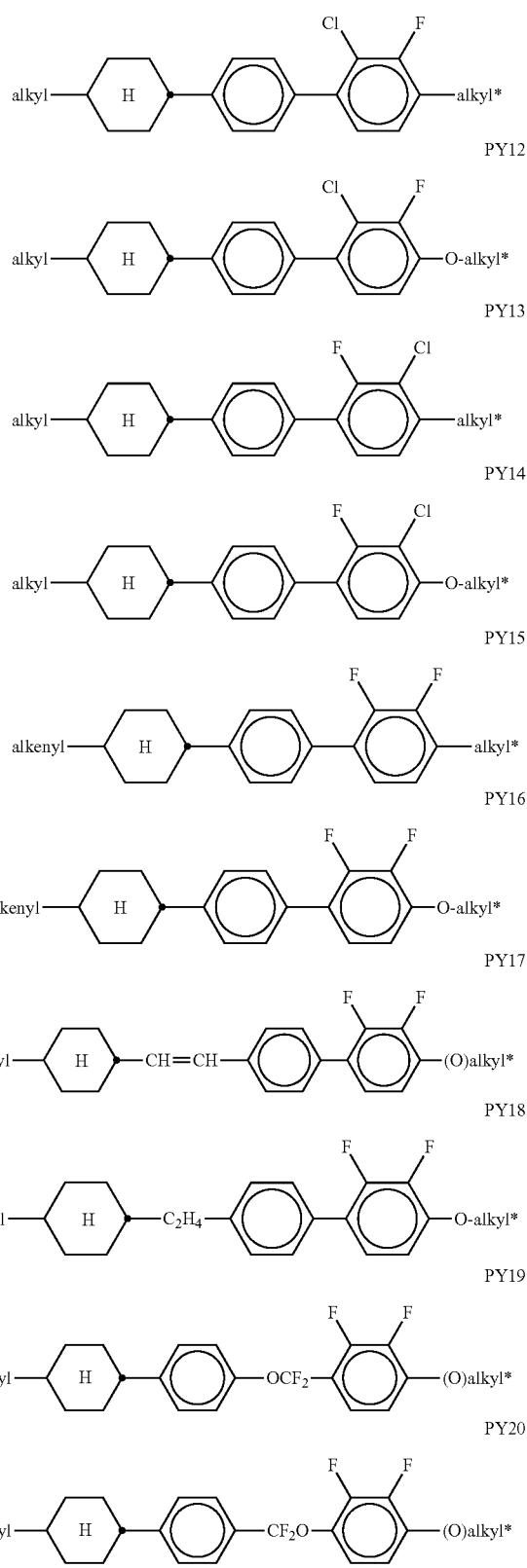

atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

b) LC medium which additionally comprises one or more compounds of the following formula:

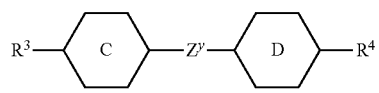

ZK in which the individual radicals have the following meanings:

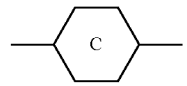

denotes

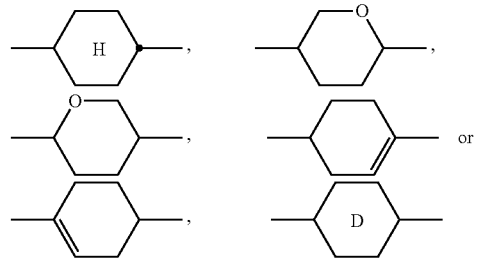

denotes

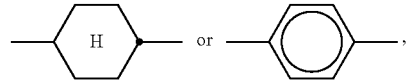

$R^3$ and $R^4$ each, independently of one another, denote alkyl having 1 to 12 C atoms, in which, in addition, one or two non-adjacent $CH_2$ groups may be replaced by $-O-$, $-CH=CH-$, $-CO-$, $-OCO-$ or $-COO-$ in such a way that O atoms are not linked directly to one another, $Z^y$ denotes $-CH_2CH_2-$, $-CH=CH-$, $-CF_2O-$, $-OCF_2-$, $-CH_2O-$, $-OCH_2-$, $-COO-$, $-OCO-$, $-C_2F_4-$, $-CF=CF-$, $-CH=CHCH_2O-$ or a single bond, preferably a single bond.

The compounds of the formula ZK are preferably selected from the group consisting of the following sub-formulae:

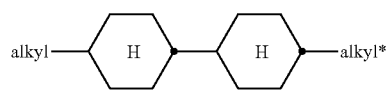

ZK1

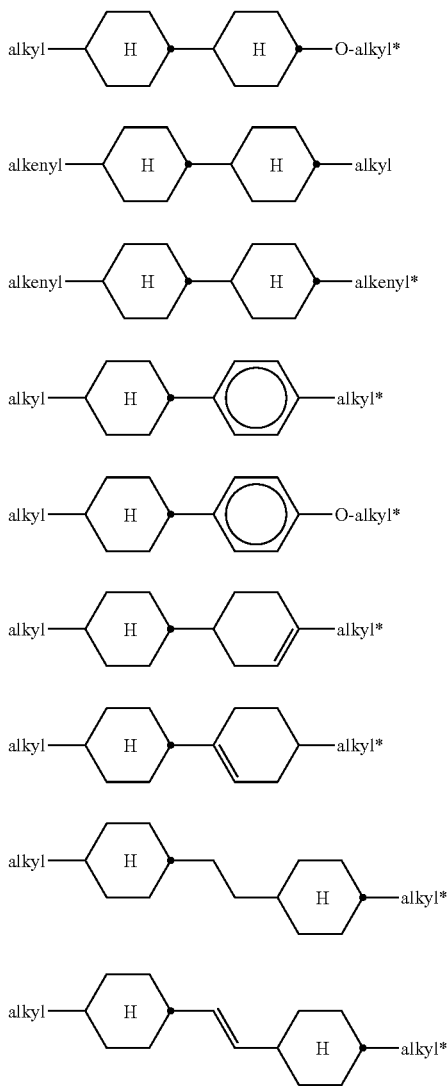

in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

c) LC medium which additionally comprises one or more compounds of the following formula:

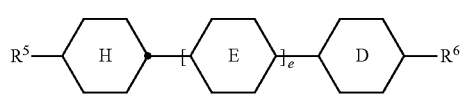

in which the individual radicals on each occurrence, identically or differently, have the following meanings:

$R^5$ and $R^6$ each, independently of one another, have one of the meanings indicated for $R^1$ above,

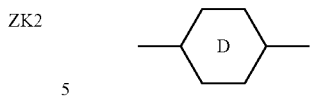

denotes

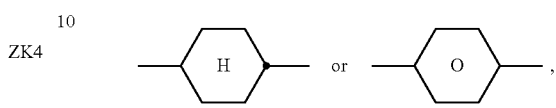

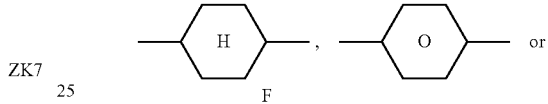

denotes

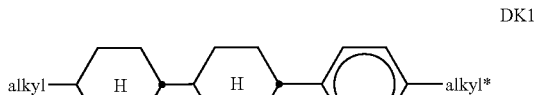

and e denotes 1 or 2.

The compounds of the formula DK are preferably selected from the group consisting of the following sub-formulae:

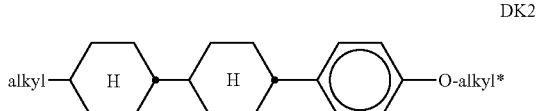

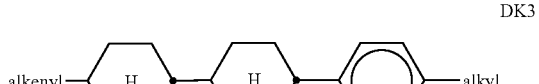

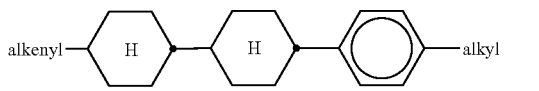

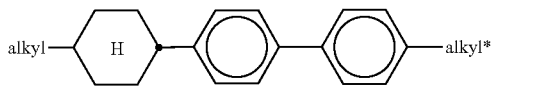

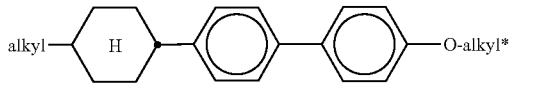

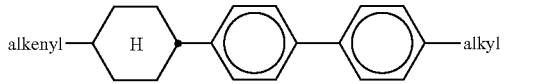

-continued

DK7
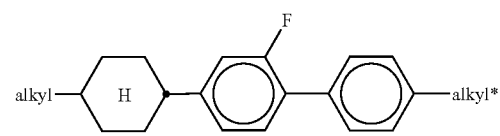

DK8
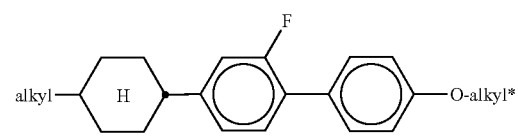

DK9
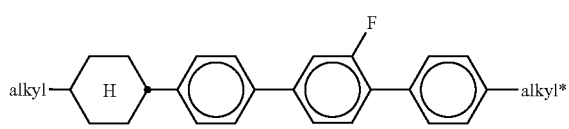

DK10
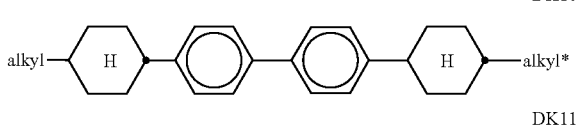

DK11
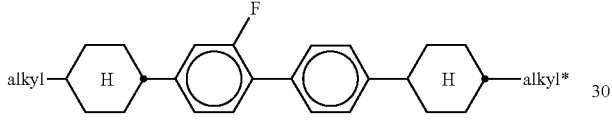

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

d) LC medium which additionally comprises one or more compounds of the following formula:

LY
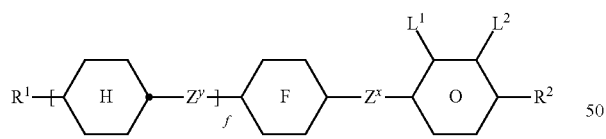

in which the individual radicals have the following meanings:

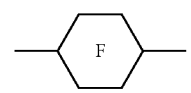

denotes

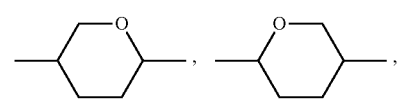

-continued

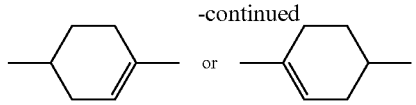

f denotes 0 or 1,

R$^1$ and R$^2$ each, independently of one another, denote alkyl having 1 to 12 C atoms, in which, in addition, one or two non-adjacent CH$_2$ groups may be replaced by —O—, —CH=CH—, —CO—, —OCO— or —COO— in such a way that O atoms are not linked directly to one another, Z$^x$ and Z$^y$ each, independently of one another, denote —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF—, —CH=CHCH$_2$O— or a single bond, preferably a single bond, L$^1$ and L$^2$ each, independently of one another, denote F, Cl, OCF$_3$, CF$_3$, CH$_3$, CH$_2$F, CHF$_2$.

Preferably, both radicals L$^1$ and L$^2$ denote F or one of the radicals L$^1$ and L$^2$ denotes F and the other denotes Cl.

The compounds of the formula LY are preferably selected from the group consisting of the following sub-formulae:

LY1
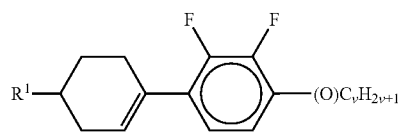

LY2
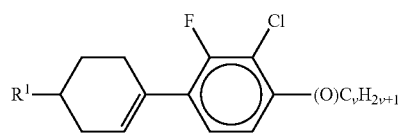

LY3
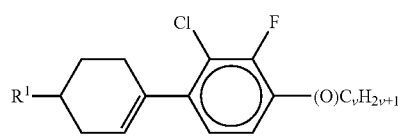

LY4
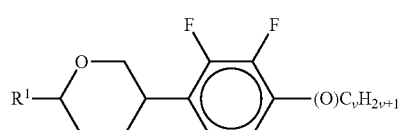

LY5
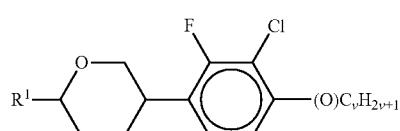

LY6
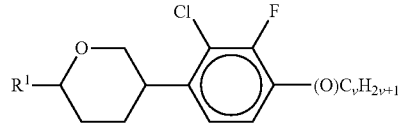

LY7
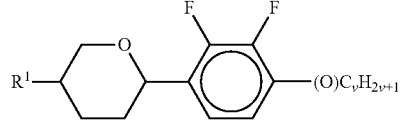

-continued

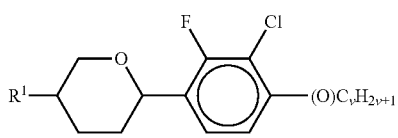
LY8

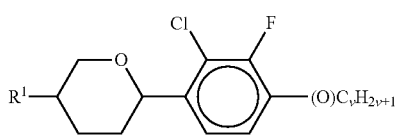
LY9

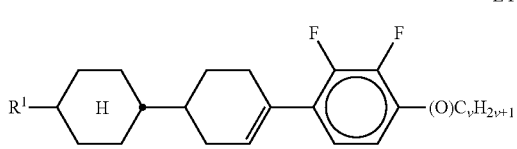
LY10

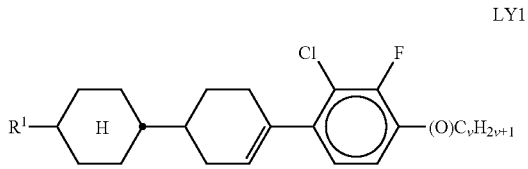
LY11

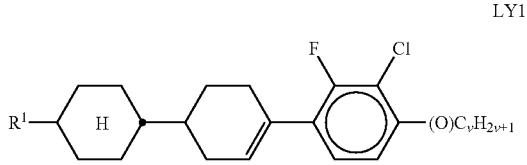
LY12

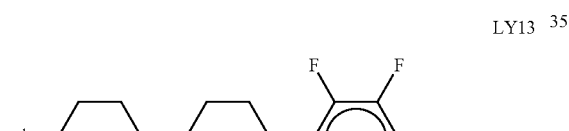
LY13

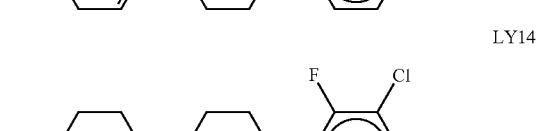
LY14

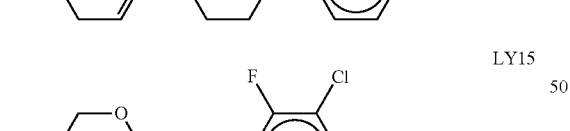
LY15

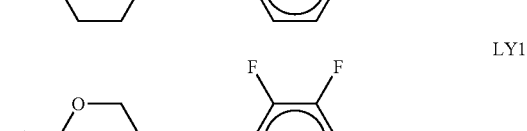
LY16

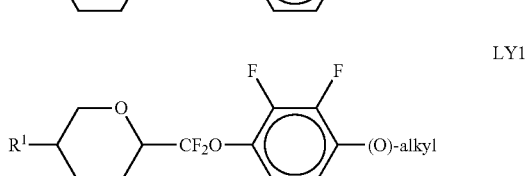
LY17

-continued

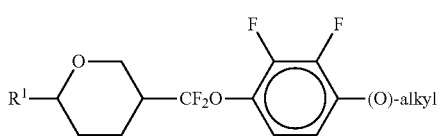
LY18 in which $R^1$ has the meaning indicated above, alkyl denotes a straight-chain alkyl radical having 1-6 C atoms, (O) denotes an oxygen atom or a single bond, and v denotes an integer from 1 to 6. $R^1$ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2$=CH—, $CH_2$=CHCH$_2$CH$_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(OH_2)_2$—.

e) LC medium which additionally comprises one or more compounds selected from the group consisting of the following formulae:

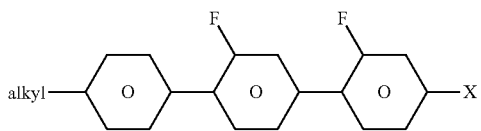
G1

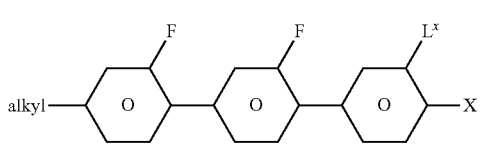
G2

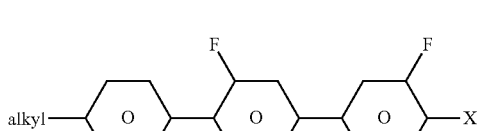
G3

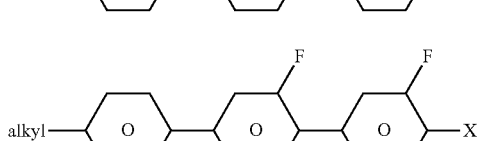
G4 in which alkyl denotes $C_{1-6}$-alkyl, $L^x$ denotes H or F, and X denotes F, Cl, $OCF_3$, $OCHF_2$ or OCH=$CF_2$. Particular preference is given to compounds of the formula G1 in which X denotes F.

f) LC medium which additionally comprises one or more compounds selected from the group consisting of the following formulae:

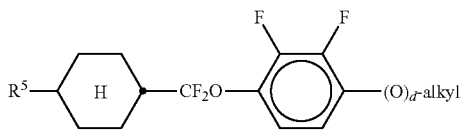
Y1

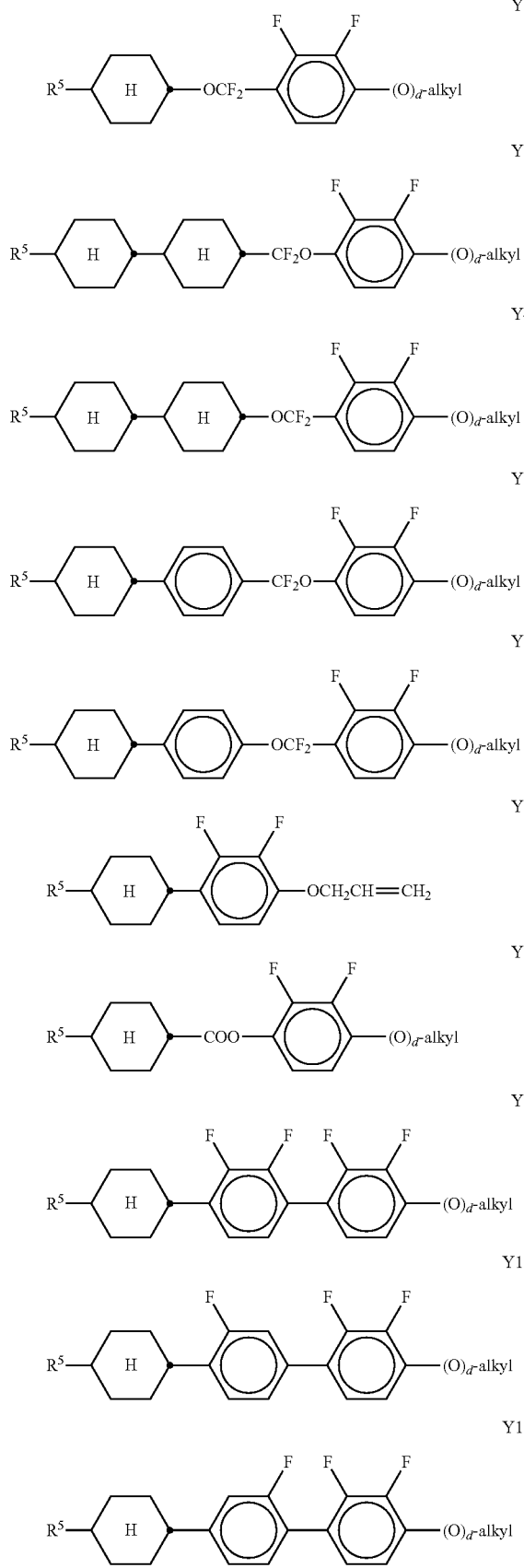

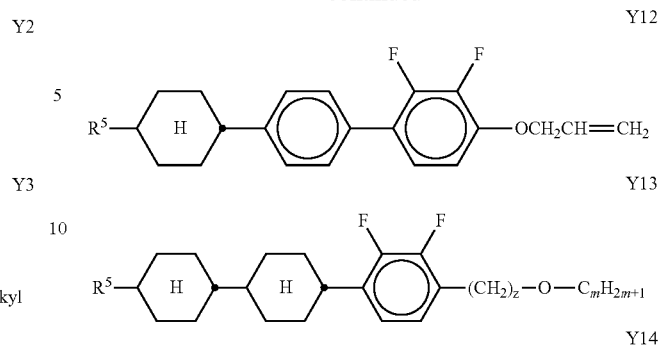

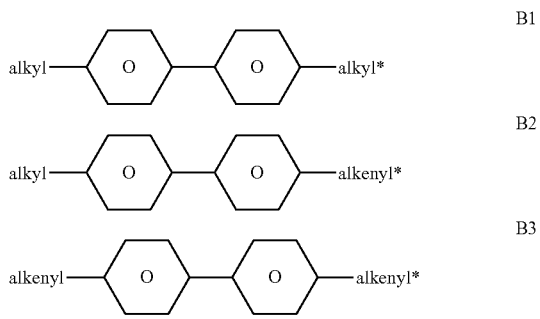

in which $R^5$ has one of the meanings indicated for $R^1$ above, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, d is preferably 1. The LC medium according to the invention preferably comprises one or more compounds of the above-mentioned formulae in amounts of 5% by weight.

g) LC medium which additionally comprises one or more biphenyl compounds selected from the group consisting of the following formulae:

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

The proportion of the biphenyls of the formulae B1 to B3 in the LC mixture is preferably at least 3% by weight, in particular 5% by weight.

The compounds of the formula B2 are particularly preferred.

The compounds of the formulae B1 to B3 are preferably selected from the group consisting of the following sub-formulae:

B1a
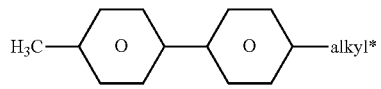

B2a
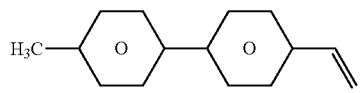

B2b
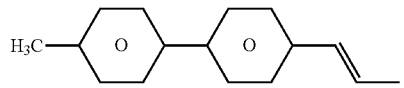

B2c
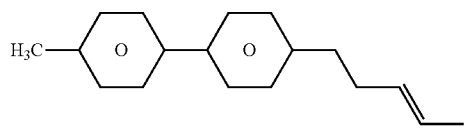

in which alkyl* denotes an alkyl radical having 1-6 C atoms. The medium according to the invention particularly preferably comprises one or more compounds of the formulae B1a and/or B2c.

h) LC medium which additionally comprises one or more terphenyl compounds of the following formula:

T

in which $R^5$ and $R^6$ each, independently of one another, have one of the meanings indicated for $R^1$ above, and

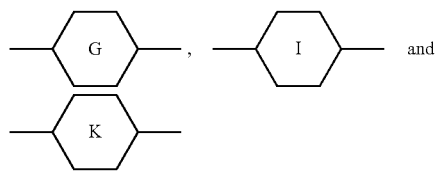

each, independently of one another, denote

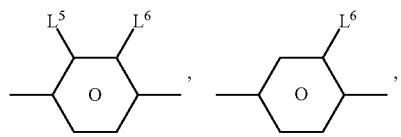

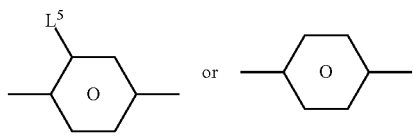

in which $L^5$ denotes F or Cl, preferably F, and $L^6$ denotes F, Cl, $OCF_3$, $CF_3$, $CH_3$, $CH_2F$ or $CHF_2$, preferably F.

The compounds of the formula T are preferably selected from the group consisting of the following sub-formulae:

T1
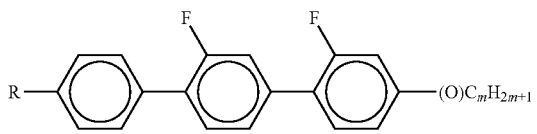

T2
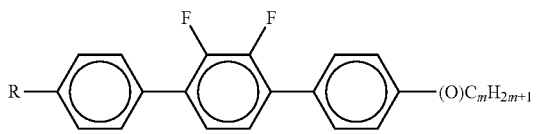

T3
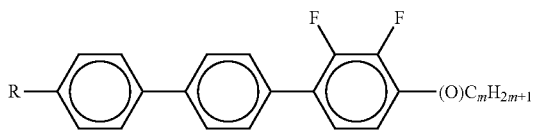

T4
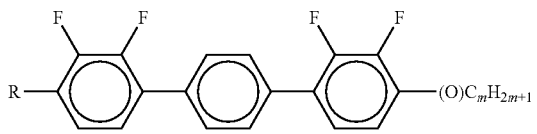

T5
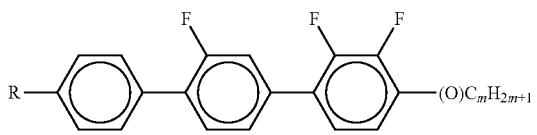

T6
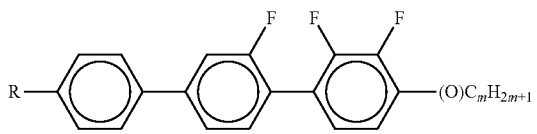

T7
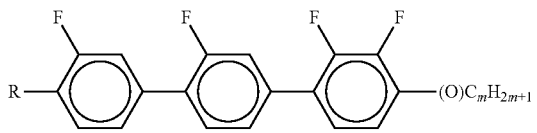

T8
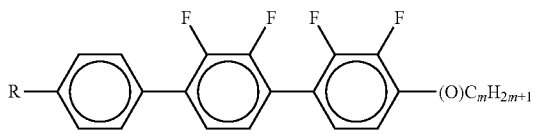

T9
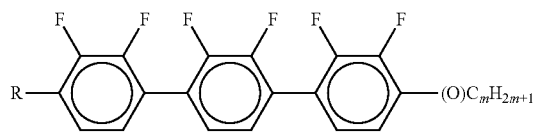

T10
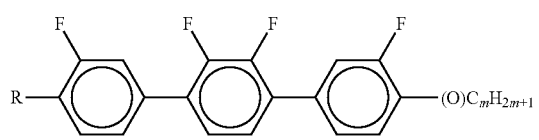

T11
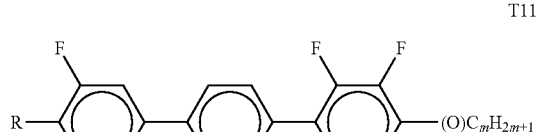

T12
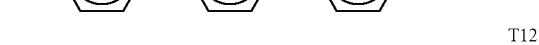

T13
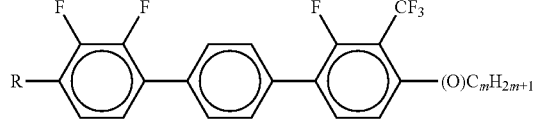

T14
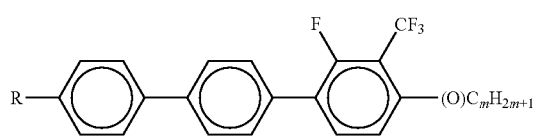

T15
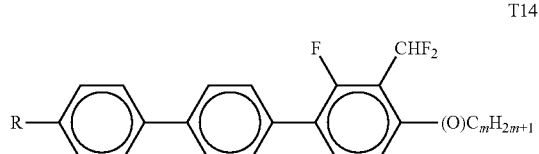

T16
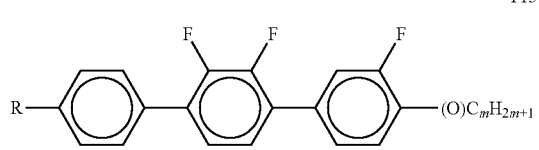

T17
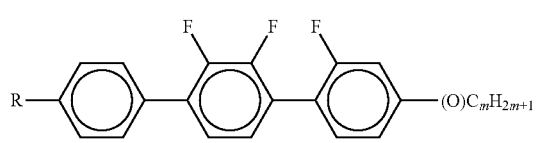

T18
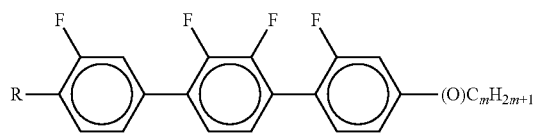

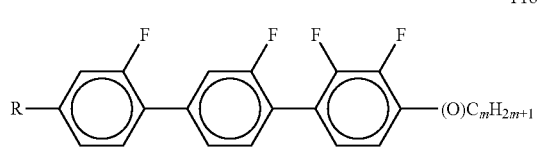

T19
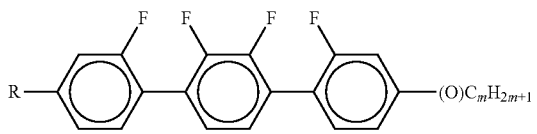

T20
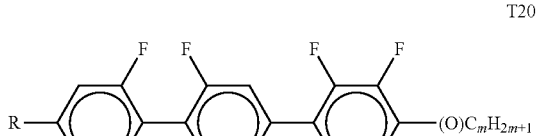

T21
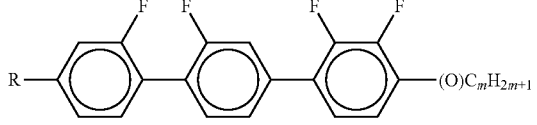

T22
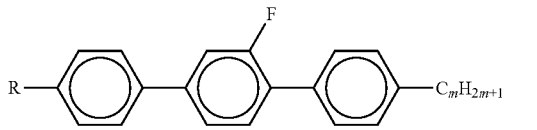

T23
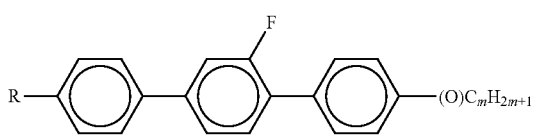

T24
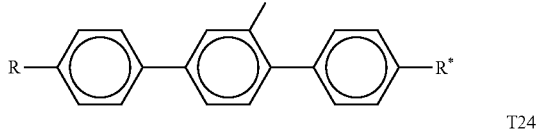

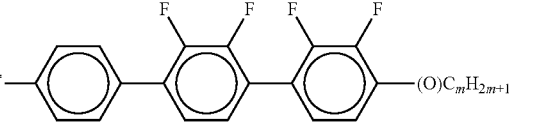

in which R denotes a straight-chain alkyl or alkoxy radical having 1-7 C atoms, R* denotes a straight-chain alkenyl radical having 2-7 C atoms, (O) denotes an oxygen atom or a single bond, and m denotes an integer from 1 to 6. R* preferably denotes $CH_2=CH-$, $CH_2=CH-CH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

R preferably denotes methyl, ethyl, propyl, butyl, pentyl, hexyl, methoxy, ethoxy, propoxy, butoxy or pentoxy.

The LC medium according to the invention preferably comprises the terphenyls of the formula T and preferred sub-formulae thereof in an amount of 2-30% by weight, in particular 5-20% by weight.

Particular preference is given to compounds of the formulae T1, T2, T3 and T21. In these compounds, R preferably denotes alkyl, furthermore alkoxy, each having 1-5 C atoms.

The terphenyls are preferably employed in mixtures according to the invention if the Δn value of the mixture is intended to be ≥0.1. Preferred mixtures comprise 2-20% by weight of one or more terphenyl compounds of the formula T, preferably selected from the group of compounds T1 to T22.

i) LC medium which additionally comprises one or more compounds selected from the group consisting of the following formulae:

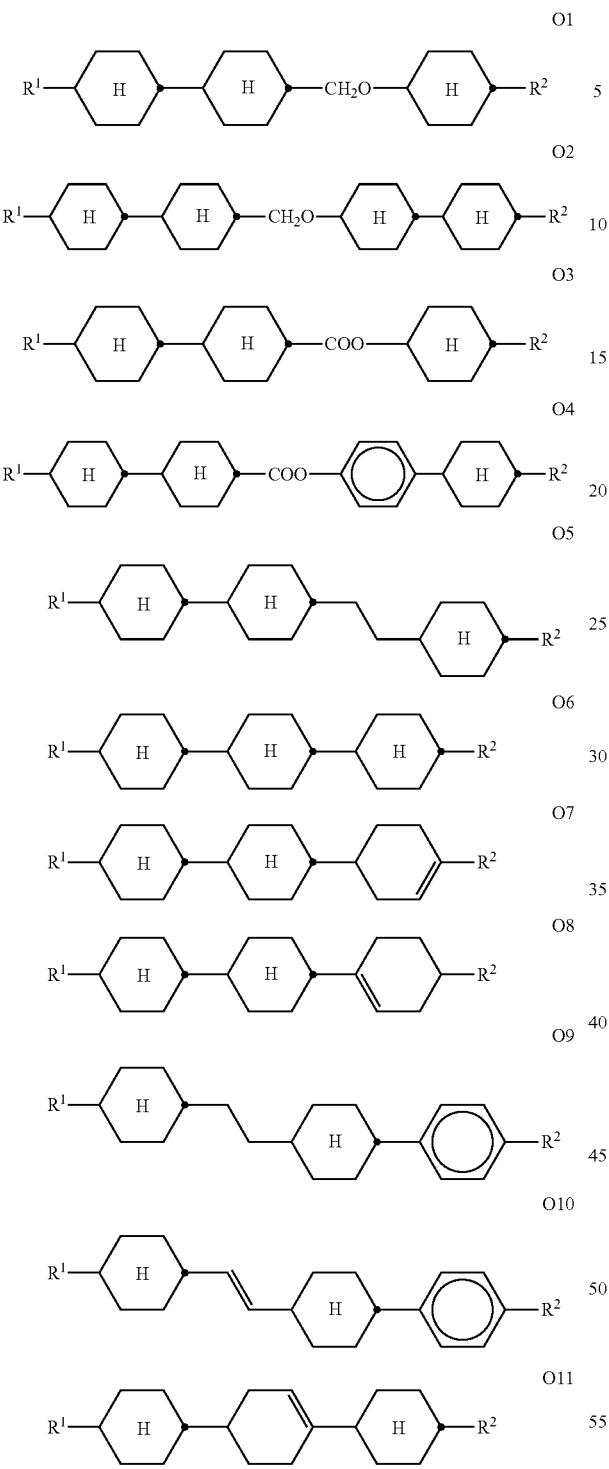

in which $R^1$ and $R^2$ have the meanings indicated above and preferably each, independently of one another, denote straight-chain alkyl having 1 to 6 C atoms or straight-chain alkenyl having 2 to 6 C atoms.

Preferred media comprise one or more compounds selected from the formulae O1, O3 and O4.

k) LC medium which additionally comprises one or more compounds of the following formula:

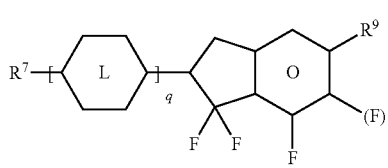

in which

denotes

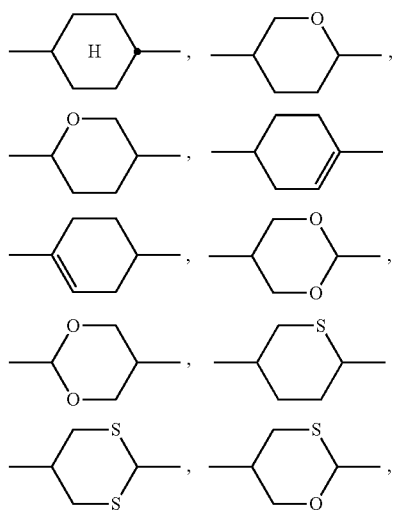

$R^9$ denotes H, $CH_3$, $C_2H_5$ or $n-C_3H_7$, (F) denotes an optional fluorine substituent, and q denotes 1, 2 or 3, and $R^7$ has one of the meanings indicated for $R^1$, preferably in amounts of >3% by weight, in particular ≥5% by weight and very particularly preferably 5-30% by weight.

Particularly preferred compounds of the formula FI are selected from the group consisting of the following sub-formulae:

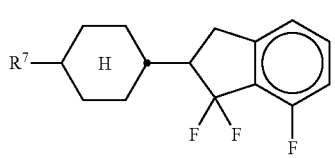

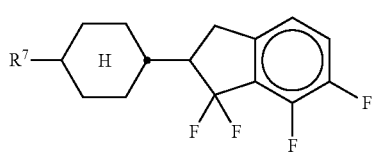

FI3
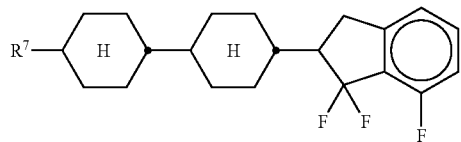

FI4
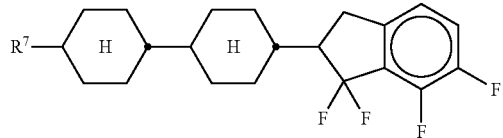

FI5
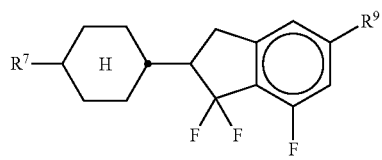

FI6
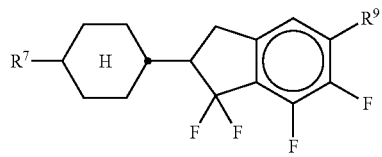

FI7
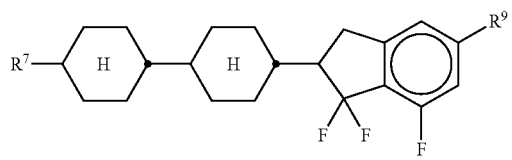

FI8
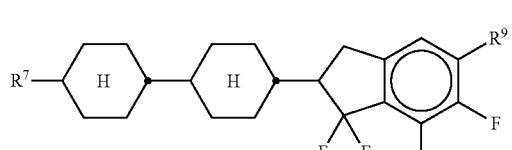
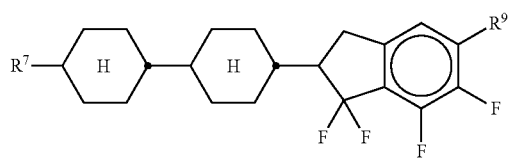

in which $R^7$ preferably denotes straight-chain alkyl, and $R^9$ denotes $CH_3$, $C_2H_5$ or $n\text{-}C_3H_7$. Particular preference is given to the compounds of the formulae FI1, FI2 and FI3.

m) LC medium which additionally comprises one or more compounds selected from the group consisting of the following formulae:

VK1
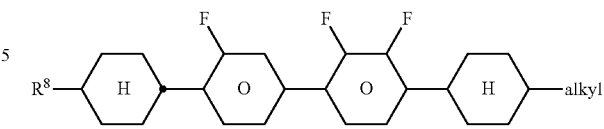

VK2
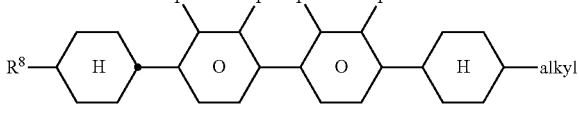

VK3
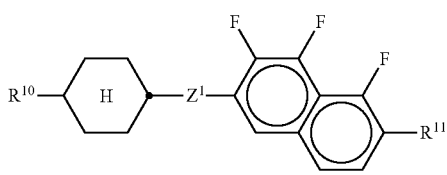

VK4
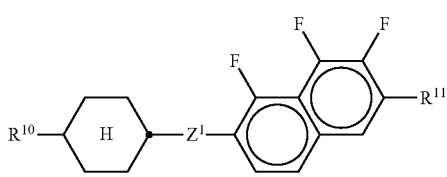

in which $R^8$ has the meaning indicated for $R^1$, and alkyl denotes a straight-chain alkyl radical having 1-6 C atoms.

n) LC medium which additionally comprises one or more compounds which contain a tetrahydronaphthyl or naphthyl unit, such as, for example, the compounds selected from the group consisting of the following formulae:

N1
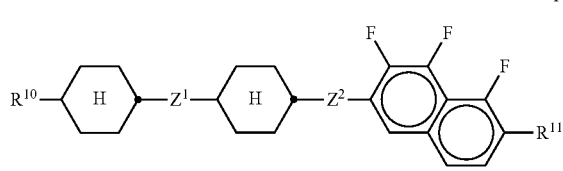

N2

N3
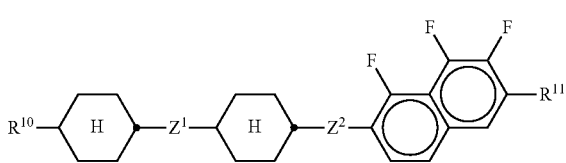

N4
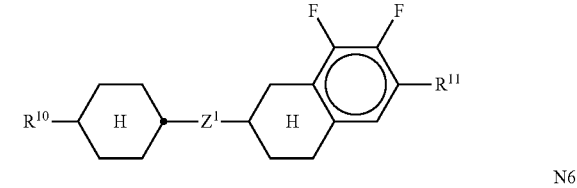

N5

N6
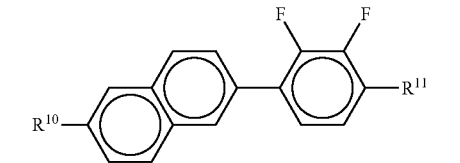

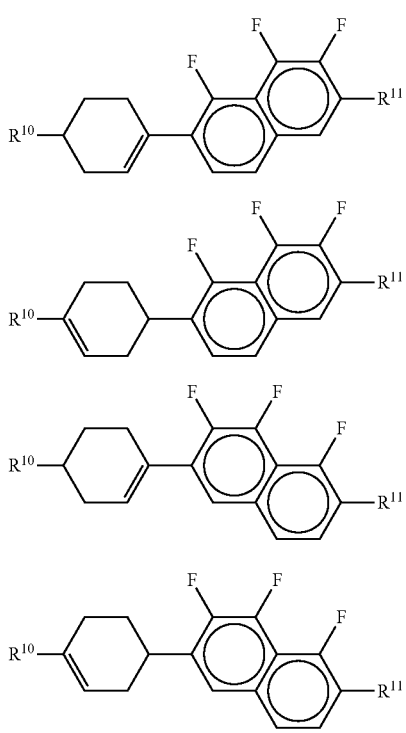

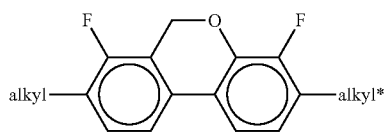

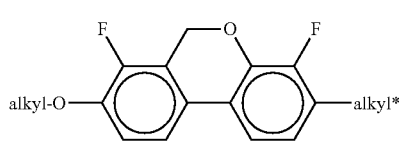

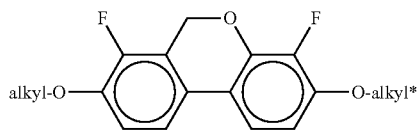

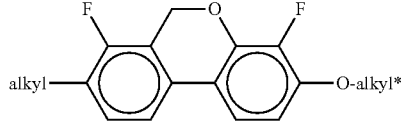

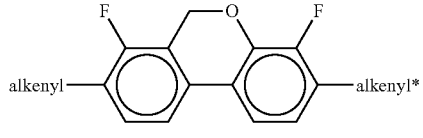

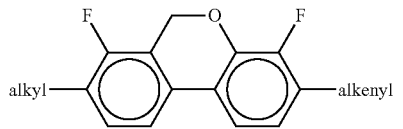

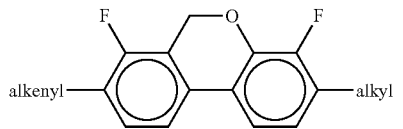

in which $R^{10}$ and $R^{11}$ each, independently of one another, have one of the meanings indicated for $R^1$, preferably denote straight-chain alkyl or alkoxy having 1 to 6 C atoms or straight-chain alkenyl having 2 to 6 C atoms, and $Z^1$ and $Z^2$ each, independently of one another, denote —$C_2H_4$—, —CH=CH—, —$(CH_2)_4$—, —$(CH_2)_3O$—, —$O(CH_2)_3$—, —CH=CH—$CH_2CH_2$—, —$CH_2CH_2$CH=CH—, —$CH_2O$—, —$OCH_2$—, —COO—, —OCO—, —$C_2F_4$—, —CF=CF—, —CF=CH—, —CH=CF—, —$CH_2$— or a single bond.

o) LC medium which additionally comprises one or more difluorodibenzochromans and/or chromans of the following formulae:

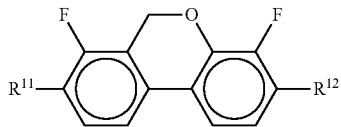

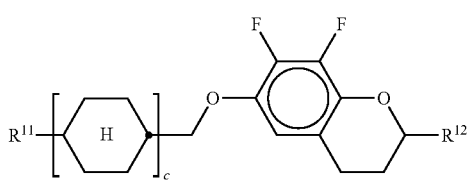

in which $R^{11}$ and $R^{12}$ each, independently of one another, have the meaning indicated above, and c denotes 0 or 1, preferably in amounts of 3 to 20% by weight, in particular in amounts of 3 to 15% by weight.

Particularly preferred compounds of the formulae BC and CR are selected from the group consisting of the following sub-formulae:

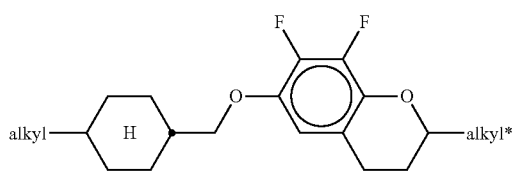

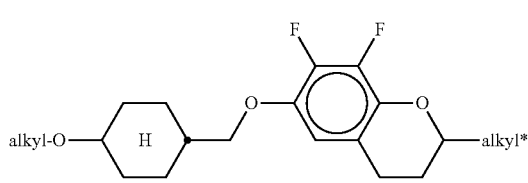

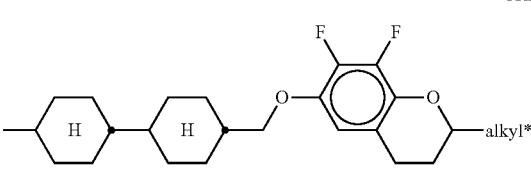

-continued

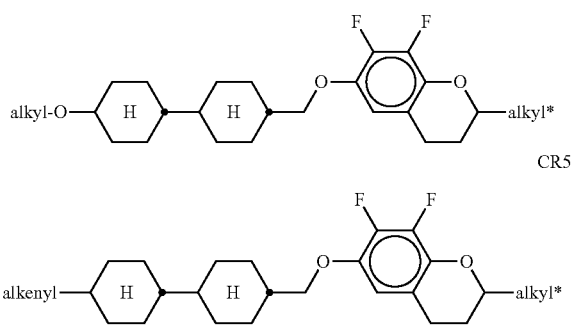

CR4

CR5 in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Very particular preference is given to mixtures comprising one, two or three compounds of the formula BC2.

p) LC medium which additionally comprises one or more fluorinated phenanthrenes and/or dibenzofurans of the following formulae:

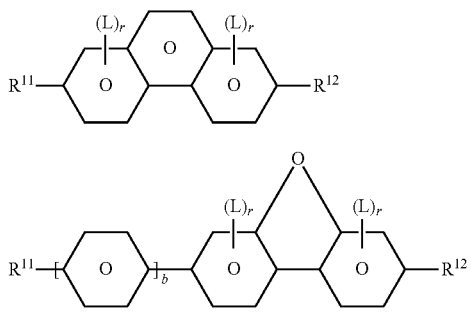

PH

BF in which R$^{11}$ and R$^{12}$ each, independently of one another, have the meanings indicated above, b denotes 0 or 1, L denotes F, and r denotes 1, 2 or 3.

Particularly preferred compounds of the formulae PH and BF are selected from the group consisting of the following sub-formulae:

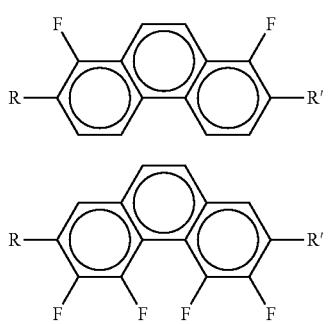

PH1

PH2

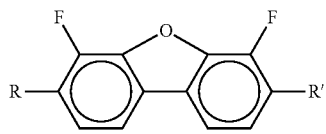

BF1

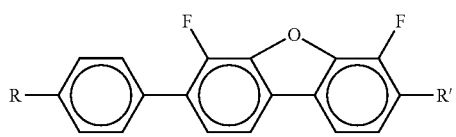

BF2 in which R and R' each, independently of one another, denote a straight-chain alkyl or alkoxy radical having 1-7 C atoms.

q) LC medium, preferably for use in PSA-OCB displays, which comprises one or more compounds selected from the group consisting of the following formulae:

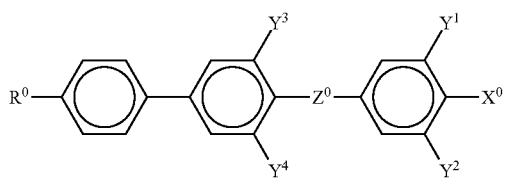

AA

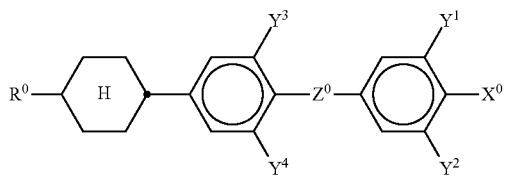

BB

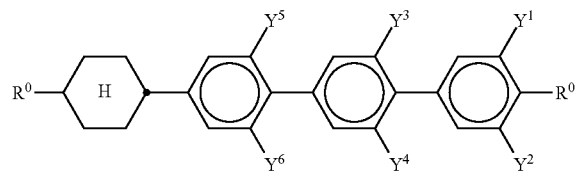

CC in which

R$^0$ denotes on each occurrence, identically or differently, n-alkyl, alkoxy, oxaalkyl, fluoroalkyl or alkenyl, each having up to 9 C atoms, X$^0$ denotes F, Cl or in each case halogenated alkyl, alkenyl, alkenyloxy or alkoxy, each having up to 6 C atoms, Z$^0$ denotes —CF$_2$O— or a single bond, Y$^{1-6}$ each, independently of one another, denote H or F.

X$^0$ is preferably F, Cl, CF$_3$, CHF$_2$, OCF$_3$, OCHF$_2$, OCFHCF$_3$, OCFHCHF$_2$, OCFHCHF$_2$, OCF$_2$CH$_3$, OCF$_2$CHF$_2$, OCF$_2$CHF$_2$, OCF$_2$CF$_2$CHF$_2$, OCF$_2$CF$_2$CHF$_2$, OCFHCF$_2$CF$_3$, OCFHCF$_2$CHF$_2$, OCF$_2$CF$_2$CF$_3$, OCF$_2$CF$_2$CClF$_2$, OCClFCF$_2$CF$_3$ or CH=CF$_2$, particularly preferably F or OCF$_3$.

The compounds of the formula AA are preferably selected from the group consisting of the following formulae:

AA1
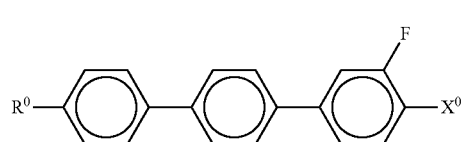

AA2
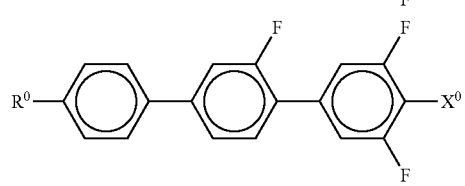

AA3
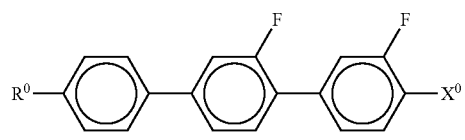

AA4
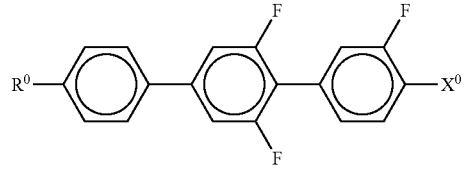

AA5
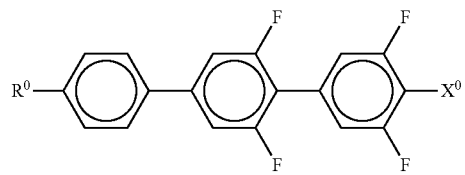

AA6
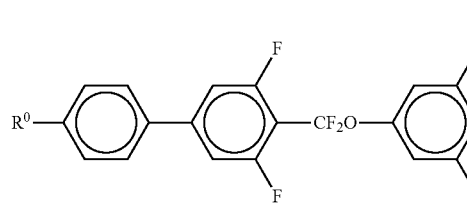

AA7
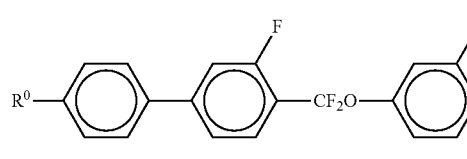

AA8
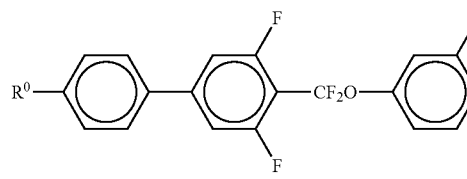

AA9
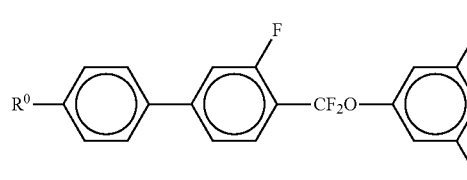

in which $R^0$ and $X^0$ have the meaning indicated above, and $X^0$ preferably denotes F. Particular preference is given to compounds of the formulae AA2 and AA6.

The compounds of the formula BB are preferably selected from the group consisting of the following formulae:

BB1
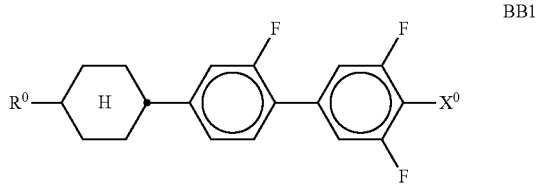

BB2
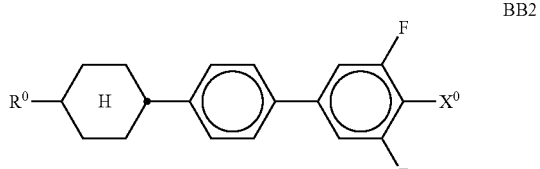

BB3
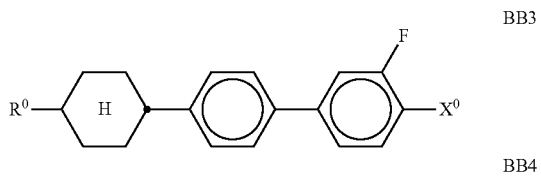

BB4
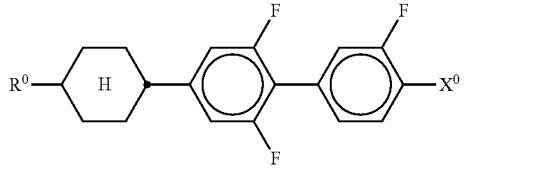

BB5
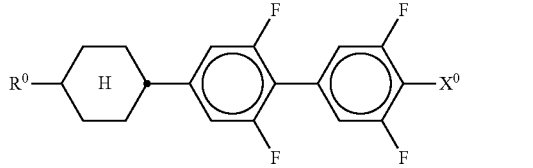

BB6
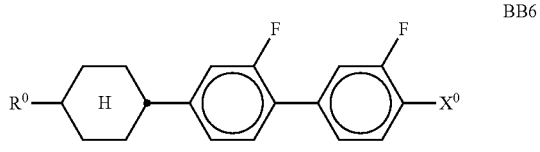

in which $R^0$ and $X^0$ have the meaning indicated above, and $X^0$ preferably denotes F. Particular preference is given to compounds of the formulae BB1, BB2 and BB5.

The compounds of the formula CC are preferably selected from the following formula:

CC1
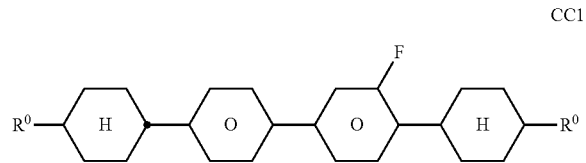

in which $R^0$ on each occurrence, identically or differently, has the meaning indicated above and preferably denotes alkyl having 1 to 6 C atoms.

r) LC medium which, apart from the polymerisable compounds of the formula I or sub-formulae thereof and the comonomers, comprises no compounds which contain a terminal vinyloxy group (—O—CH=CH$_2$).
s) LC medium which comprises 1 to 5, preferably 1, 2 or 3, polymerisable compounds.
t) LC medium in which the proportion of polymerisable compounds in the mixture as a whole is 0.05 to 5%, preferably 0.1 to 1%.
u) LC medium which comprises 1 to 8, preferably 1 to 5, compounds of the formulae CY1, CY2, PY1 and/or PY2. The proportion of these compounds in the mixture as a whole is preferably 5 to 60%, particularly preferably 10 to 35%. The content of these individual compounds is preferably in each case 2 to 20%.
v) LC medium which comprises 1 to 8, preferably 1 to 5, compounds of the formulae CY9, CY10, PY9 and/or PY10. The proportion of these compounds in the mixture as a whole is preferably 5 to 60%, particularly preferably 10 to 35%. The content of these individual compounds is preferably in each case 2 to 20%.
w) LC medium which comprises 1 to 10, preferably 1 to 8, compounds of the formula ZK, in particular compounds of the formulae ZK1, ZK2 and/or ZK6. The proportion of these compounds in the mixture as a whole is preferably 3 to 25%, particularly preferably 5 to 45%. The content of these individual compounds is preferably in each case 2 to 20%.
x) LC medium in which the proportion of compounds of the formulae CY, PY and ZK in the mixture as a whole is greater than 70%, preferably greater than 80%.
y) PSA-VA display in which the pretilt angle is preferably 85°, particularly preferably 80°.

The combination of compounds of the preferred embodiments a)-y) mentioned above with the polymerised compounds described above effects low threshold voltages, low rotational viscosities and very good low-temperature stabilities in the LC media according to the invention at the same time as constantly high clearing points and high HR values and allows a particularly low pretilt angle to be established quickly in PSA displays. In particular, the LC media in PSA displays exhibit significantly shortened response times, in particular also the grey-shade response times, compared with the media from the prior art.

The liquid-crystal mixture preferably has a nematic phase range of at least 80 K, particularly preferably at least 100 K, and a rotational viscosity of not greater than 250 mPa·s, preferably not greater than 200 mPa·s, at 20° C.

LC media according to the invention for use in displays of the VA type have a negative dielectric anisotropy $\Delta\epsilon$, preferably of about −0.5 to −10, in particular about −2.5 to −7.5, at 20° C. and 1 kHz.

In the VA-type displays according to the invention, the molecules in the layer of the LC medium in the switched-off state are aligned perpendicular to the electrode surfaces (homeotropically aligned) or have a tilted homeotropic alignment. On application of an electrical voltage to the electrodes, a realignment of the LC molecules with the longitudinal molecular axes parallel to the electrode surfaces takes place.

In the OCB-type displays according to the invention, the molecules in the layer of the LC medium have a "bend" alignment. On application of an electrical voltage, a realignment of the LC molecules with the longitudinal molecular axes perpendicular to the electrode surfaces takes place.

LC media according to the invention for use in displays of the OCB type have a positive dielectric anisotropy $\Delta\epsilon$, preferably of about +7 to +17 at 20° C. and 1 kHz.

The birefringence $\Delta n$ in LC media according to the invention for use in displays of the VA type is preferably below 0.16, particularly preferably between 0.06 and 0.14, in particular between 0.07 and 0.12.

The birefringence $\Delta n$ in LC media according to the invention for use in displays of the OCB type is preferably between 0.14 and 0.22, in particular between 0.16 and 0.22.

The LC media according to the invention may also comprise further additives known to the person skilled in the art and described in the literature, such as, for example, polymerisation initiators, inhibitors, stabilisers, surface-active substances or chiral dopants. These may be polymerisable or unpolymerisable. Polymerisable additives are accordingly classed in the polymerisable component or component A). Unpolymerisable additives are accordingly classed in the unpolymerisable component or component B).

The LC media may comprise, for example, one or more chiral dopants, preferably those selected from the group consisting of compounds from Table B below.

Furthermore, for example, 0 to 15% by weight of pleochroic dyes may be added to the LC media, furthermore nanoparticles, conductive salts, preferably ethyldimethyldodecylammonium 4-hexoxybenzoate, tetrabutylammonium tetraphenylborate or complex salts of crown ethers (cf., for example, Haller et al., Mol. Cryst. Liq. Cryst. 24, 249-258 (1973)), for improving the conductivity or substances for modifying the dielectric anisotropy, the viscosity and/or the alignment of the nematic phases. Substances of this type are described, for example, in DE-A-22 09 127, DE-A-22 40 864, DE-A-23 21 632, DE-A-23 38 281, DE-A-24 50 088, DE-A-26 37 430 and DE-A-28 53 728.

The individual components of the preferred embodiments a)-y) of the LC media according to the invention are either known or their preparation processes can readily be derived from the prior art by the person skilled in the relevant art, since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerisable compounds as defined above, and optionally with further liquid-crystalline compounds and/or additives. In general, the desired amount of the components used in the smaller amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes.

The construction of the LC displays according to the invention corresponds to the usual geometry for PSA displays, as described in the prior art cited at the outset. Geometries without protrusions are preferred, in particular those in which, in addition, the electrode is unstructured on the colour filter side, and only the electrode on the TFT side has slits. Particularly suitable and preferred electrode structures for PSA-VA displays are described, for example, in US 2006/0066793 A1.

The following examples explain the present invention without limiting it. However, they show the person skilled in the art preferred mixture concepts with compounds preferably to be employed and the respective concentrations thereof and combinations thereof with one another. In addition, the examples illustrate what properties and property combinations are accessible.

The following abbreviations are used:

(n, m, z: in each case, independently of one another, 1, 2, 3, 4, 5 or 6)

TABLE A

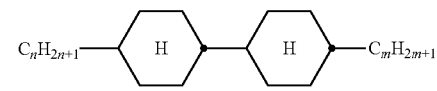

CCH-nm

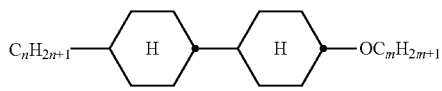

CCH-nOm

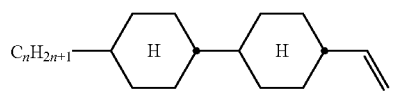

CC-n-V

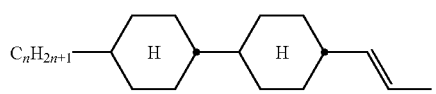

CC-n-V1

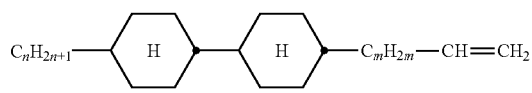

CC-n-mV

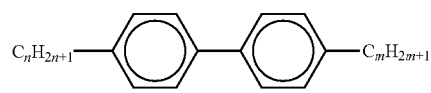

PP-n-m

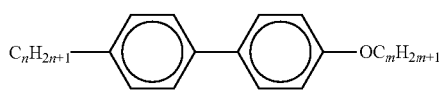

PP-n-Om

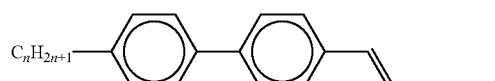

PP-n-Vm

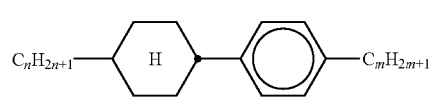

PCH-nm

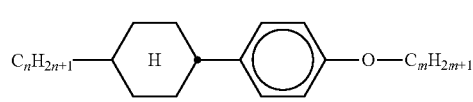

PCH-nOm

TABLE A-continued
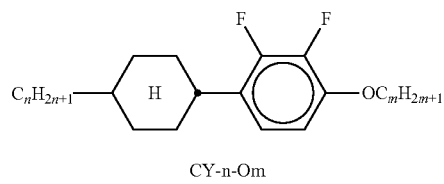
CY-n-Om
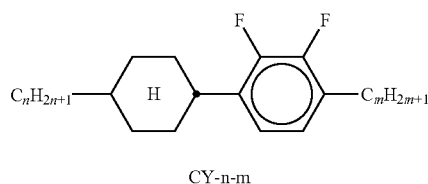
CY-n-m
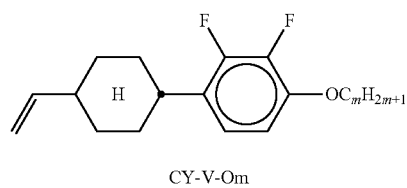
CY-V-Om
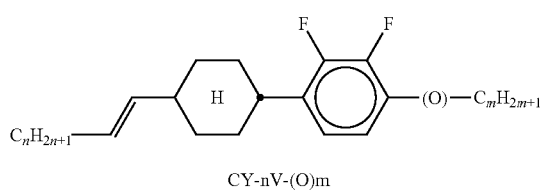
CY-nV-(O)m
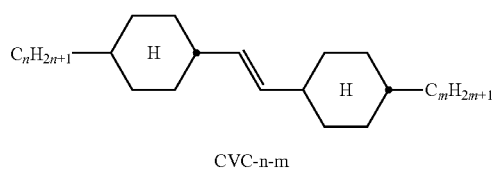
CVC-n-m
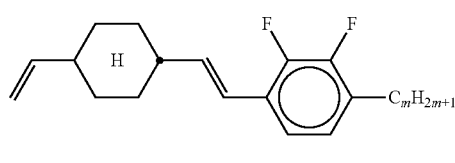
CVY-V-m
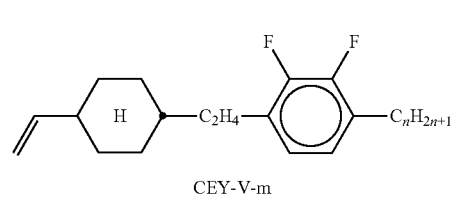
CEY-V-m
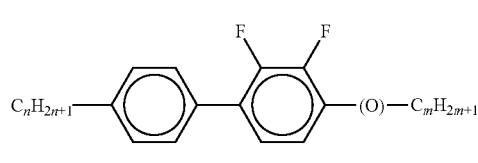
PY-n-(O)m TABLE A-continued
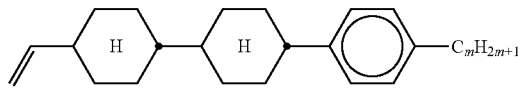
CCP-V-m
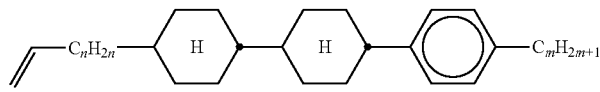
CCP-Vn-m
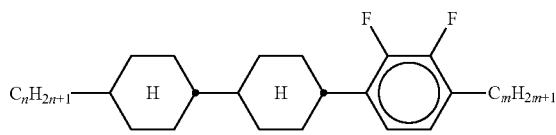
CCY-n-m
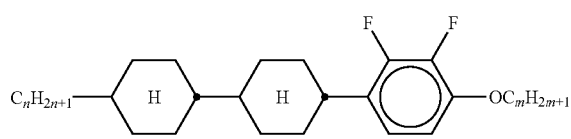
CCY-n-Om
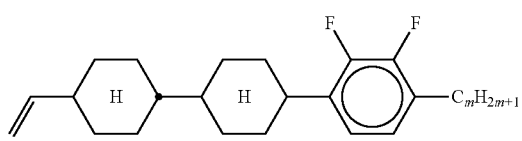
CCY-V-m
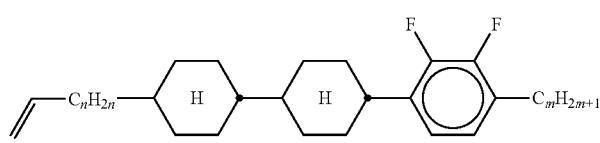
CCY-Vn-m
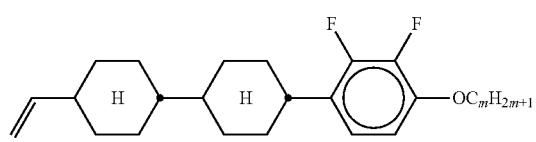
CCY-V-Om
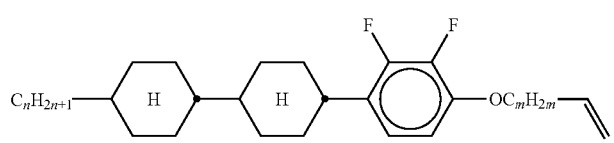
CCY-n-OmV TABLE A-continued
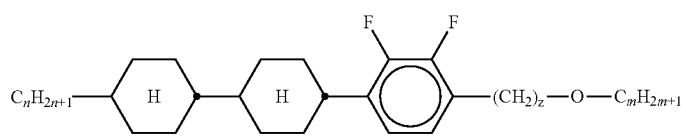
CCY-n-zOm
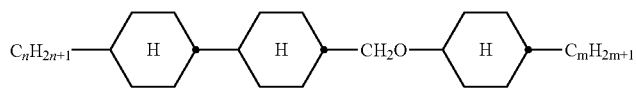
CCOC-n-m
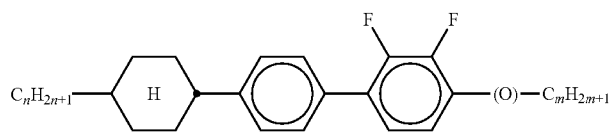
CPY-n-(O)m
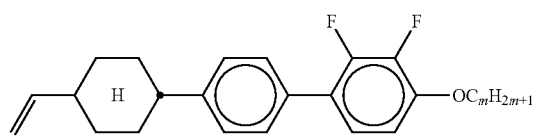
CPY-V-Om
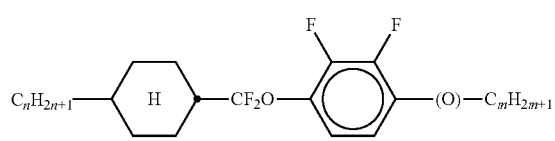
CQY-n-(O)m
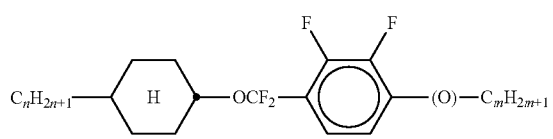
CQIY-n-(O)m
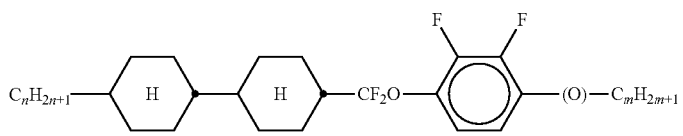
CCQY-n-(O)m
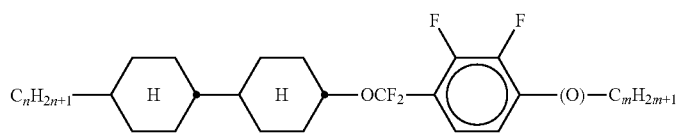
CCQIY-n-(O)m TABLE A-continued
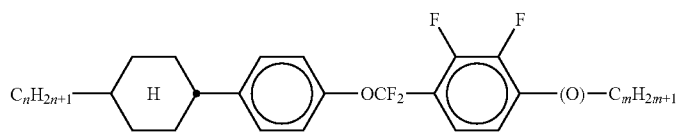
CPQY-n-(O)m
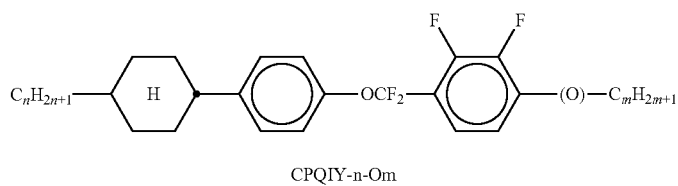
CPQIY-n-Om
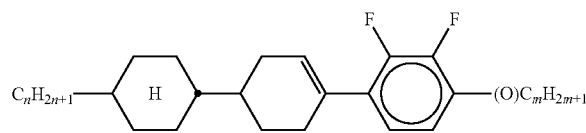
CLY-n-(O)m
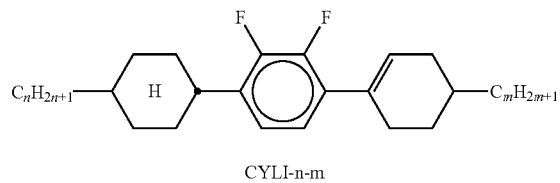
CYLI-n-m
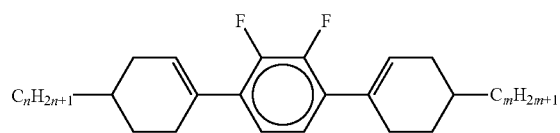
LYLI-n-m
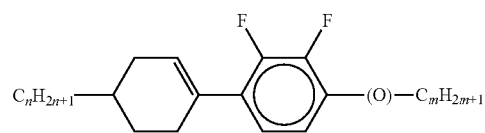
LY-n-(O)m
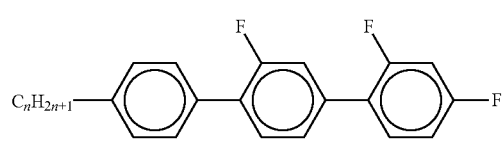
PGIGI-n-F
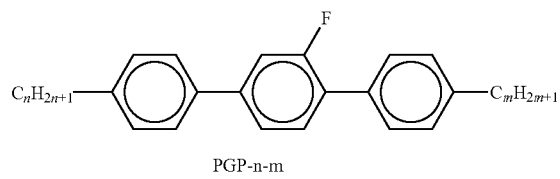
PGP-n-m TABLE A-continued
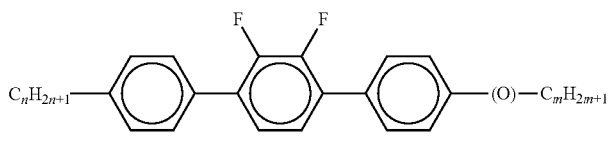
PYP-n-(O)m
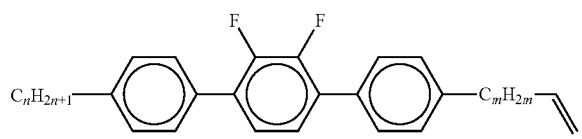
PYP-n-mV
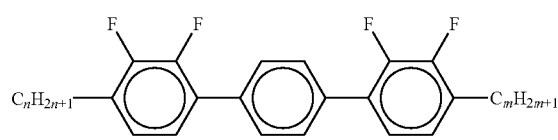
YPY-n-m
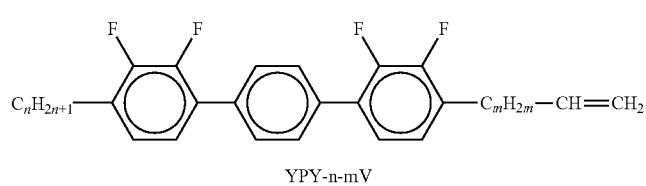
YPY-n-mV
BCH-nm
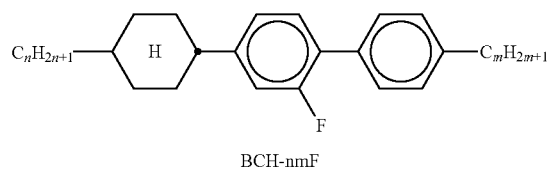
BCH-nmF
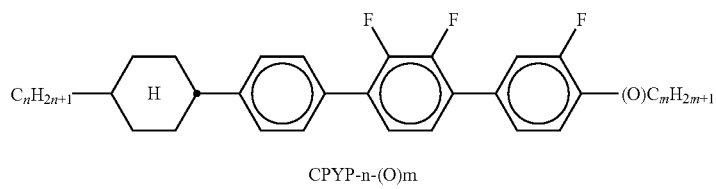
CPYP-n-(O)m
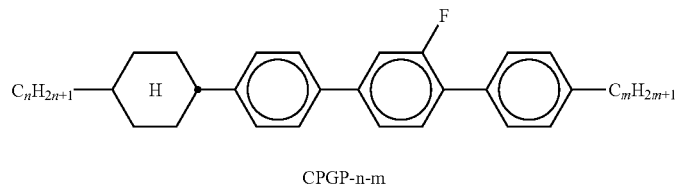
CPGP-n-m TABLE A-continued
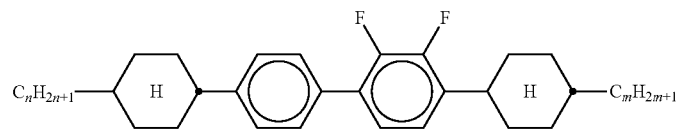
CPYC-n-m
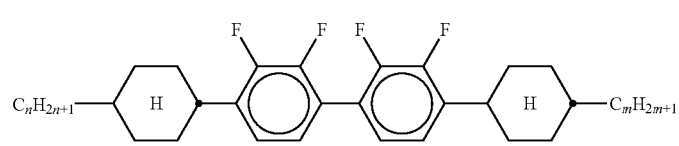
CYYC-n-m
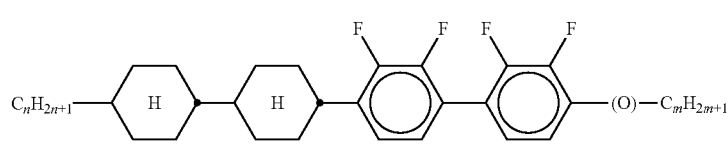
CCYY-n-m
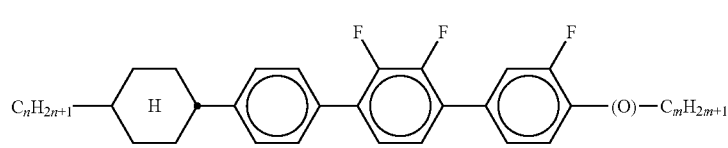
CPYG-n-(O)m
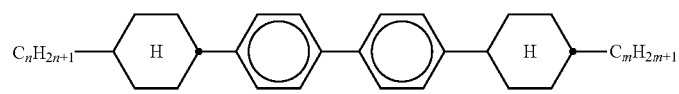
CBC-nm
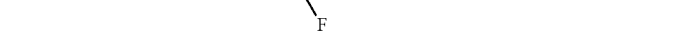
CBC-nmF
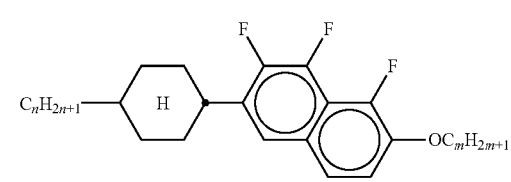
CNap-n-Om
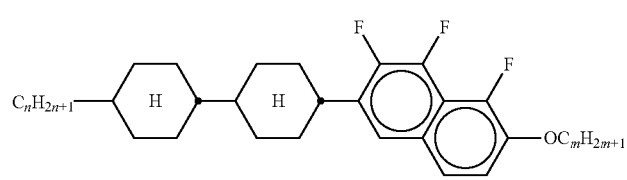
CCNap-n-Om TABLE A-continued

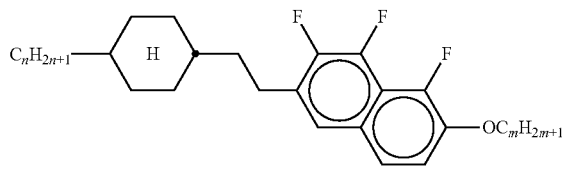

CENap-n-Om

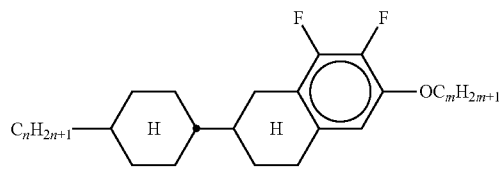

CTNap-n-Om

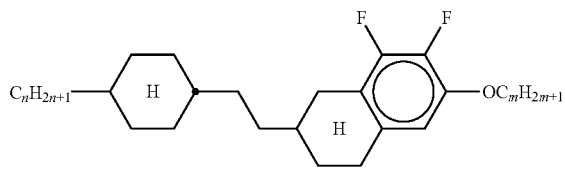

CETNap-n-Om

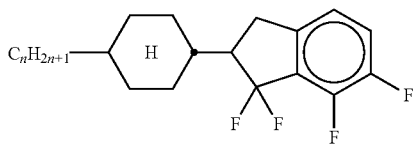

CK-n-F

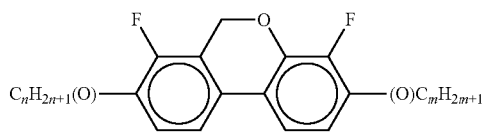

DFDBC-n(O)-(O)m

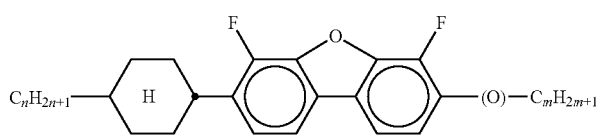

C-DFDBF-n-(O)m

In a preferred embodiment of the present invention, the LC media according to the invention comprise one or more compounds selected from the group consisting of compounds from Table A.

TABLE B

Table B indicates possible chiral dopants which can be added to the LC media according to the invention.

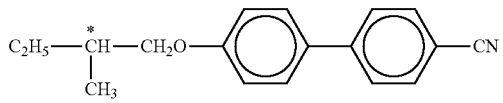

C 15

TABLE B-continued
Table B indicates possible chiral dopants which can be added to the LC media according to the invention.
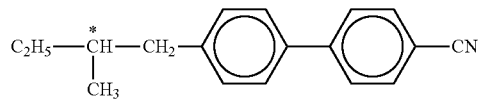
CB 15
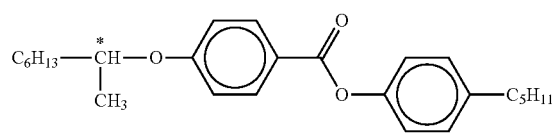
CM 21
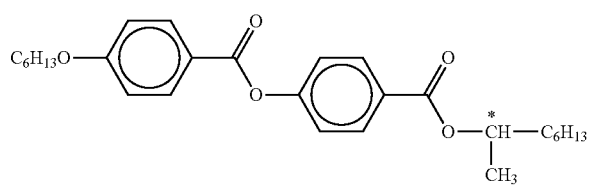
R/S-811
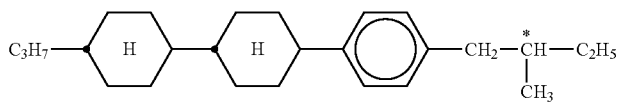
CM 44
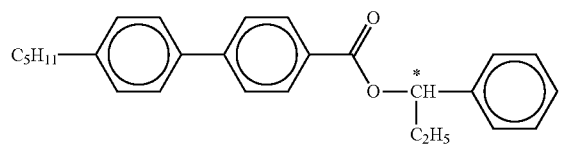
CM 45
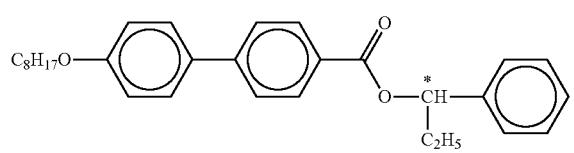
CM 47

TABLE B-continued
Table B indicates possible chiral dopants which can be added to the LC media according to the invention.
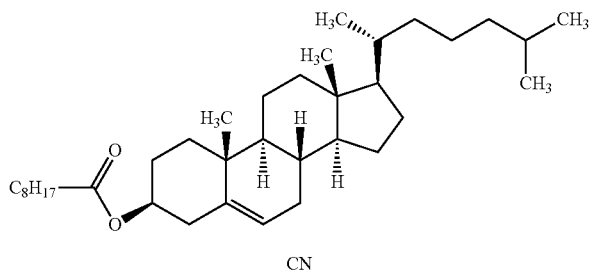
CN
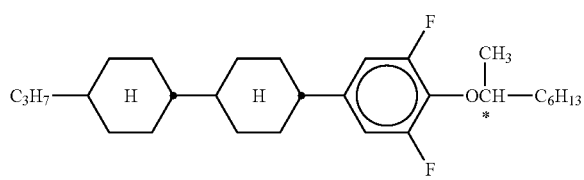
R/S-2011
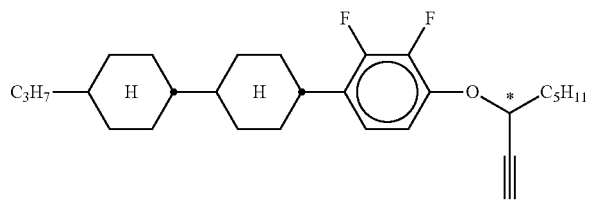
R/S-3011
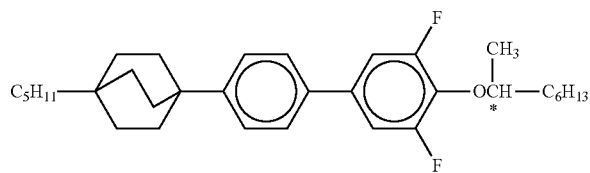
R/S-4011
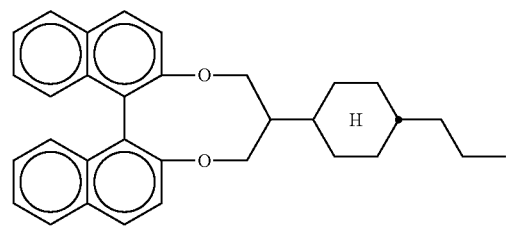
R/S-5011

TABLE B-continued

Table B indicates possible chiral dopants which can be added to the LC media according to the invention.

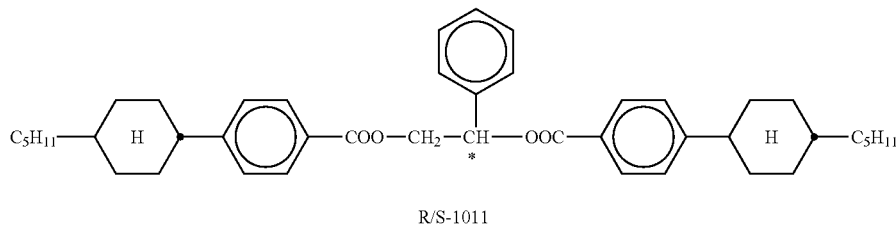

R/S-1011

The LC media preferably comprise 0 to 10% by weight, in particular 0.01 to 5% by weight and particularly preferably 0.1 to 3% by weight, of dopants. The LC media preferably comprise one or more dopants selected from the group consisting of compounds from Table B.

TABLE C

Table C indicates possible stabilisers which can be added to the LC media according to the invention (n here denotes an integer from 1 to 12).

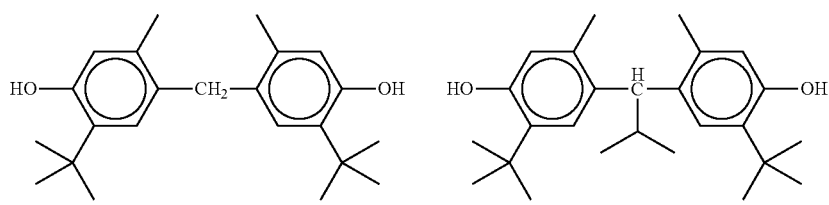

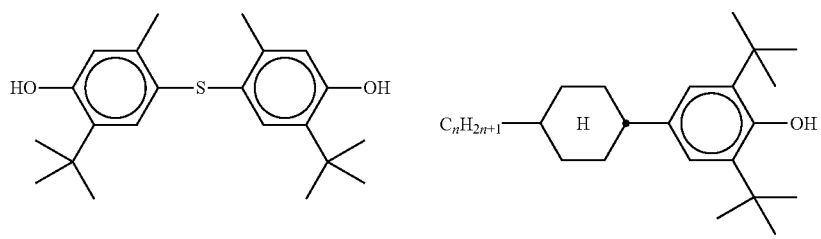

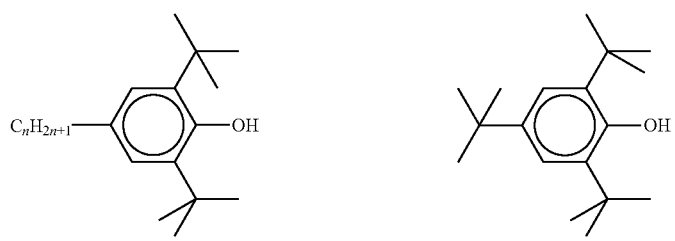

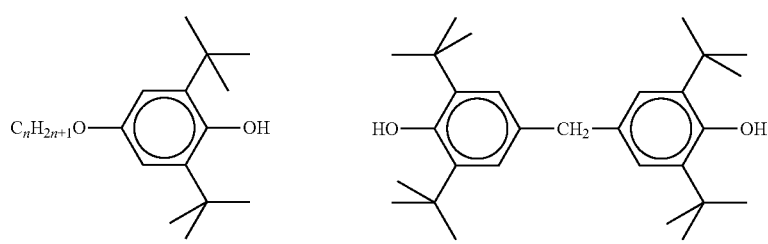

TABLE C-continued
Table C indicates possible stabilisers which can be added to the LC media according to the invention (n here denotes an integer from 1 to 12).
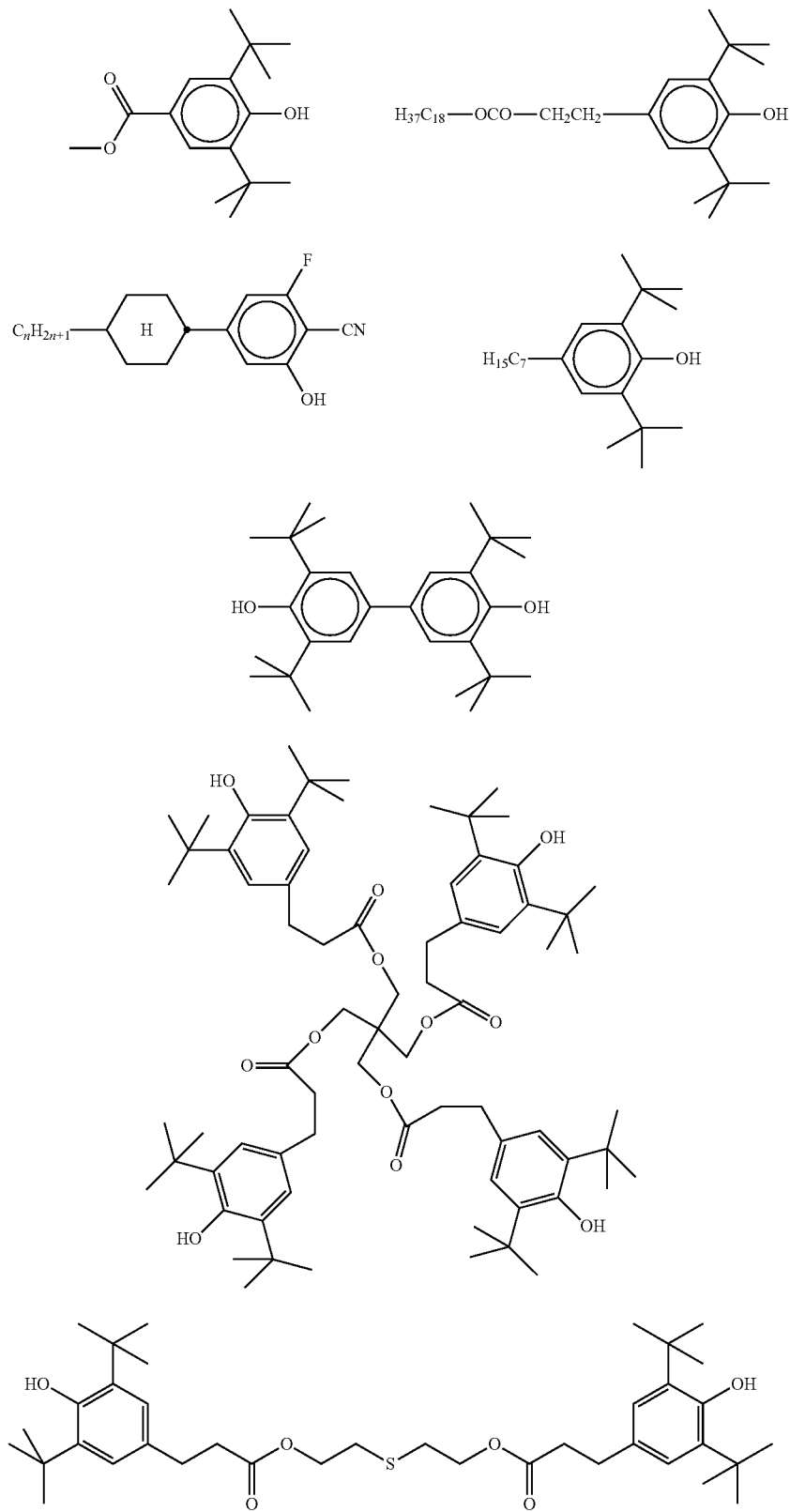

TABLE C-continued
Table C indicates possible stabilisers which can be added to the LC media according to the invention (n here denotes an integer from 1 to 12).
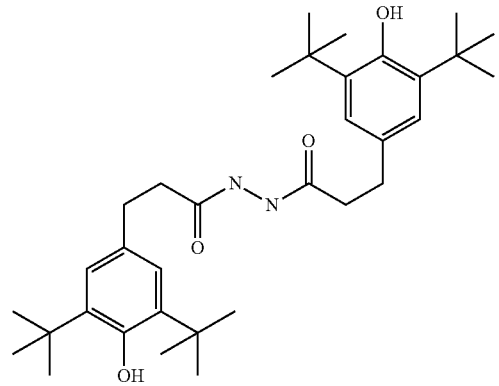 [SMILES: CC(C)(C)c1cc(CCC(=O)NNC(=O)CCc2cc(C(C)(C)C)c(O)c(C(C)(C)C)c2)cc(C(C)(C)C)c1O]
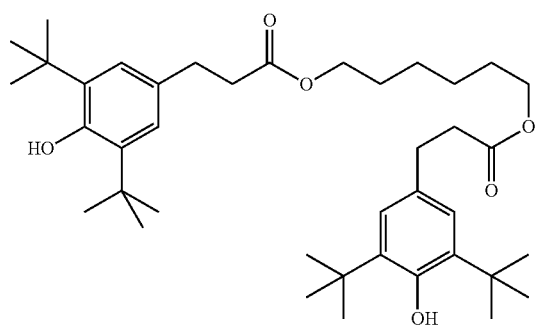 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
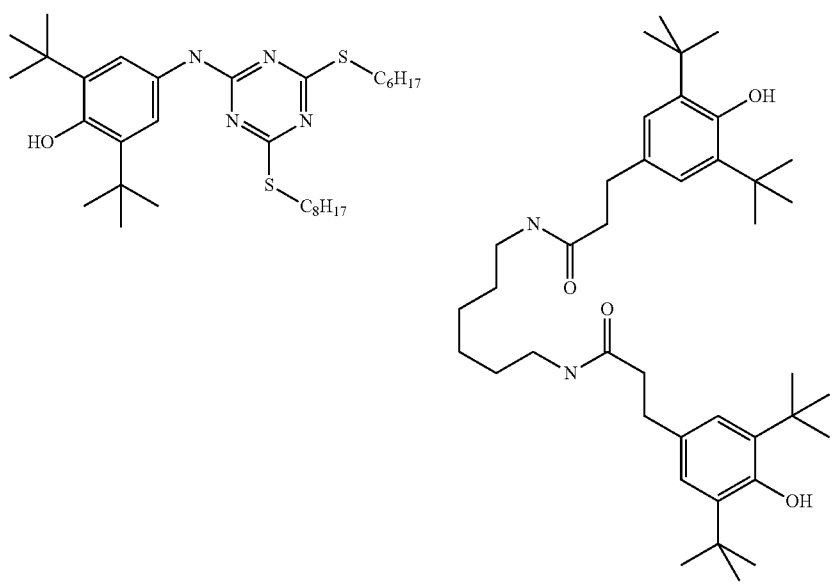

TABLE C-continued
Table C indicates possible stabilisers which can be added to the LC media according to the invention (n here denotes an integer from 1 to 12).
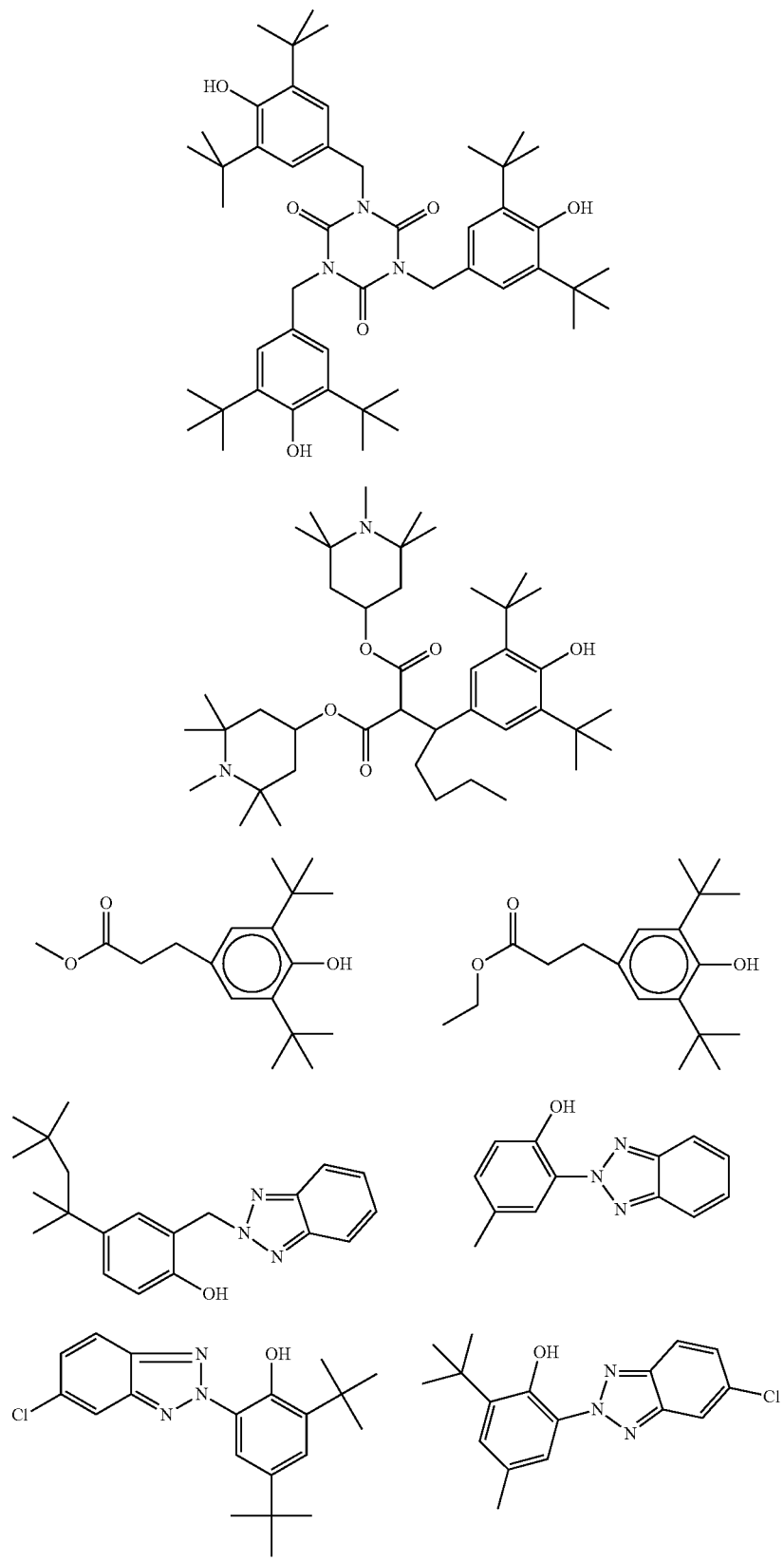

TABLE C-continued
Table C indicates possible stabilisers which can be added to the LC media according to the invention (n here denotes an integer from 1 to 12).
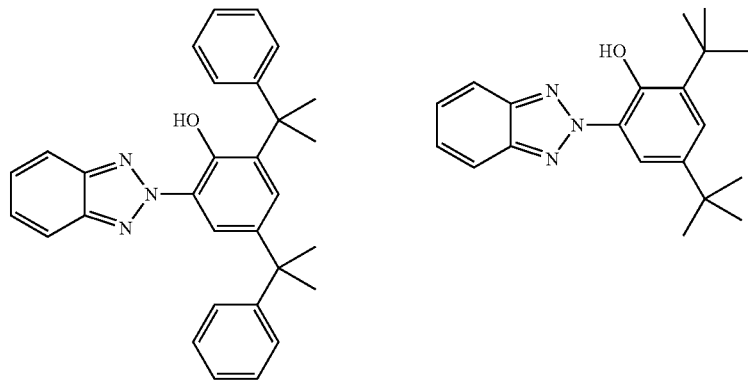
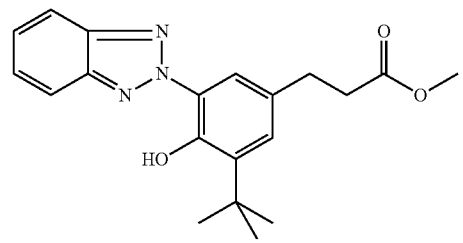 [SMILES: COC(=O)CCc1cc(-n2nc3ccccc3n2)c(O)c(C(C)(C)C)c1]
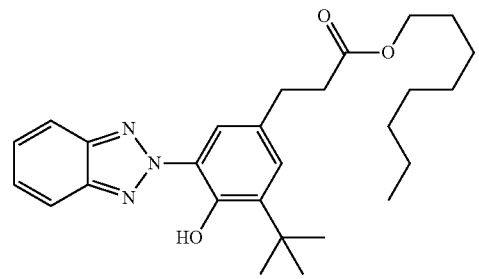 [SMILES: CCCCCCCCOC(=O)CCc1cc(-n2nc3ccccc3n2)c(O)c(C(C)(C)C)c1]
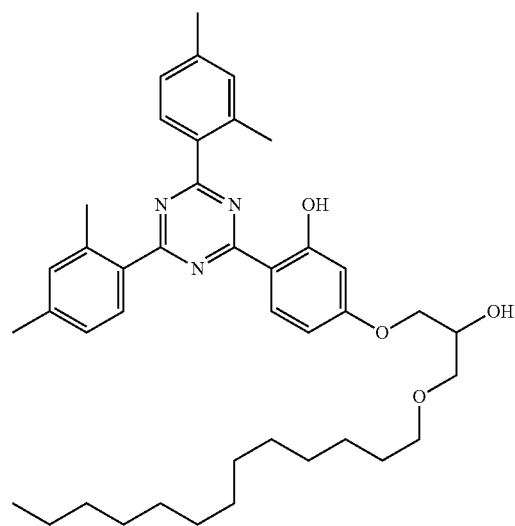 [SMILES: CCCCCCCCCCCCCOCC(O)COc1ccc(-c2nc(-c3ccc(C)cc3C)nc(-c3ccc(C)cc3C)n2)c(O)c1]

TABLE C-continued
Table C indicates possible stabilisers which can be added to the LC media according to the invention (n here denotes an integer from 1 to 12).
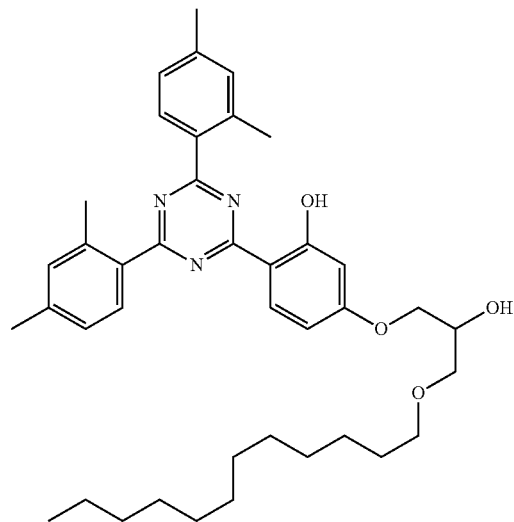 [SMILES: CCCCCCCCCCCCOCC(O)COc1ccc(-c2nc(-c3ccc(C)cc3C)nc(-c3ccc(C)cc3C)n2)c(O)c1]
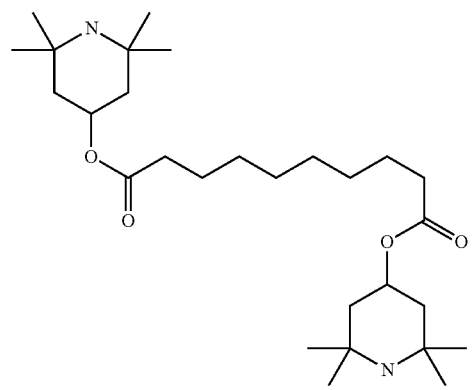
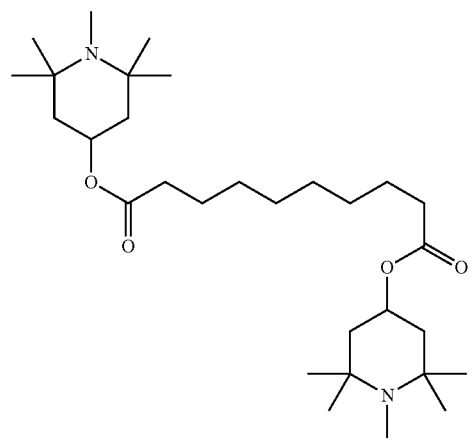

The LC media preferably comprise 0 to 10% by weight, in particular 1 ppm to 5% by weight and particularly preferably 1 ppm to 1% by weight, of stabilisers. The LC media preferably comprise one or more stabilisers selected from the group consisting of compounds from Table C.

In addition, the following abbreviations and symbols are used:
$V_0$ threshold voltage, capacitive [V] at 20° C.,
$n_e$ extraordinary refractive index at 20° C. and 589 nm,
$n_o$ ordinary refractive index at 20° C. and 589 nm,
$\Delta n$ optical anisotropy at 20° C. and 589 nm,
$\epsilon_\perp$ dielectric susceptibility perpendicular to the director at 20° C. and 1 kHz,
$\epsilon_\parallel$ dielectric susceptibility parallel to the director at 20° C. and 1 kHz,
$\Delta\epsilon$ dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN],
LTS low-temperature stability (phase), determined in test cells,
$HR_{20}$ voltage holding ratio at 20° C. [%], and
$HR_{100}$ voltage holding ratio at 100° C. [%].

Unless explicitly noted otherwise, all concentrations in the present application are indicated in per cent by weight and relate to the corresponding mixture as a whole comprising all solid or liquid-crystalline components, without solvent.

Unless explicitly noted otherwise, all temperature values indicated in the present application, such as, for example, the melting point T(C,N), the transition from the smectic (S) to the nematic (N) phase T(S,N) and the clearing point T(N,I), are indicated in degrees Celsius (° C.). m.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and $\Delta n$ is determined at 589 nm and $\Delta\epsilon$ at 1 kHz, unless explicitly indicated otherwise in each case.

The term "threshold voltage" for the present invention relates to the capacitive threshold ($V_0$), also called the Freedericks threshold, unless explicitly indicated otherwise. In the examples, as generally usual, the optical threshold for 10% relative contrast ($V_{10}$) may also be indicated.

The display used for measurement of the capacitive threshold voltage consists of two plane-parallel glass outer plates at a separation of 20 µm, each of which has, on the inside, an electrode layer and an unrubbed polyimide alignment layer on top, which effect a homeotropic edge alignment of the liquid-crystal molecules.

The display or test cell used for measurement of the tilt angles consists of two plane-parallel glass outer plates at a separation of 4 µm, each of which has, on the inside, an electrode layer and a polyimide alignment layer on top, where the two polyimide layers are rubbed antiparallel to one another and effect a homeotropic edge alignment of the liquid-crystal molecules.

The polymerisable compounds are polymerised in the display or test cell by irradiation with UVA light (usually 365 nm) having a defined intensity for a pre-specified time, with a voltage simultaneously being applied to the display (usually 10 V to 30 V alternating current, 1 kHz). In the examples, unless indicated otherwise, a 28 mW/cm² mercury vapour lamp is used, and the intensity is measured using a standard UV meter (Ushio UNI meter) fitted with a 365 nm band-pass filter.

The tilt angle is determined by rotational crystal experiment (Autronic-Melchers TBA-105). A low value (i.e. a large deviation from the 90° angle) corresponds to a large tilt here.

The VHR value is measured as follows: 0.3% of a polymerisable monomeric compound is added to the LC host mixture, and the resultant mixture is introduced into TN-VHR test cells (rubbed at 90°, TN-polyimide alignment layer, layer thickness d≈4 µm). The HR value is determined after 5 min at 100° C. before and after UV exposure for 2 h (sun test) at 1 V, 60 Hz, 64 µs pulse (measuring instrument: Autronic-Melchers VHRM-105).

EXAMPLE 1

Compound 1 (3-(4-methoxyphenyl)-2-oxo-2H-chromen-7-yl 2-methacrylate) is prepared as follows:

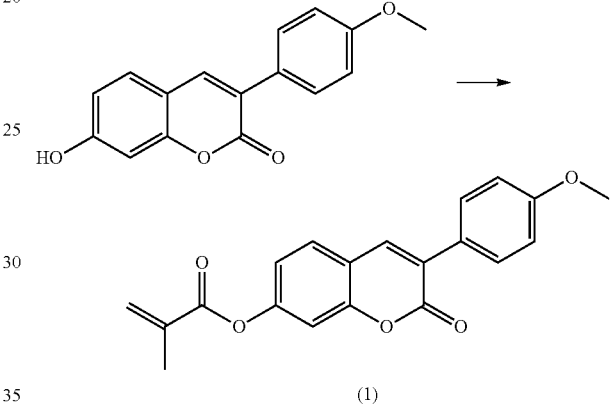

(1)

The starting compound 7-hydroxy-3-(4-methoxyphenyl) chromen-2-one is commercially available.

1.50 g (5.60 mmol) of 7-hydroxy-3-(4-methoxyphenyl) chromen-2-one are suspended in 20 ml of dichloromethane and a little pyridine, 2 ml of triethylamine are added, and a solution of 0.8 g (7.7 mmol) of methacryloyl chloride in 5 ml of dichloromethane is added dropwise with ice-cooling. The batch is stirred overnight at room temp., filtered, the solvent is removed in vacuo, and the residue is filtered through silica gel with toluene/ethyl acetate (6:4). Crystallisation of the crude product from heptane/toluene gives 3-(4-methoxyphenyl)-2-oxo-2H-chromen-7-yl 2-methacrylate as colourless solid of m.p. 163° C.

EXAMPLE 2

Compound 2 (3-[3-(4-methoxyphenyl)-2-oxo-2H-chromen-7-yl]propyl 2-methacrylate) is prepared as follows:

2.1 3-(4-Methoxyphenyl)-2-oxo-2H-chromen-7-yl trifluoromethanesulfonate

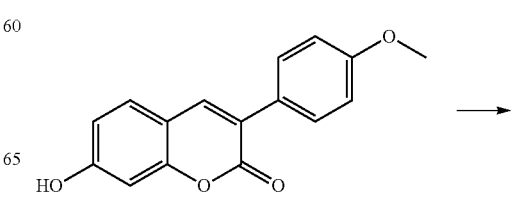

-continued

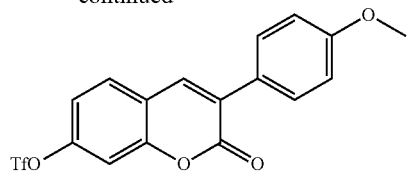

7.0 g (26.1 mmol) of 7-hydroxy-3-(4-methoxyphenyl) chromen-2-one are suspended in 200 ml of dichloromethane, and, after addition of 5 ml (36 mmol) of triethylamine and 100 mg (0.819 mmol) of DMAP, 5.3 ml (32.3 mmol) of trifluoromethanesulfonic anhydride are added dropwise with ice-cooling. After 2 h, the solution is washed with ice-water, and the solvent is removed in vacuo. Chromatography of the crude product on silica gel with toluene/ethyl acetate gives 3-(4-methoxyphenyl)-2-oxo-2H-chromen-7-yltrifluoromethanesulfonate as yellow solid.

$^1$H-NMR (400 MHz, CDCl$_3$):

δ=3.86 (s, 3 H, OCH$_3$), 6.99 (m$_c$, 2 H, Ar—H), 7.23 (dd, J=2.4 Hz, J=8.6 Hz, 1 H, Ar—H), 7.30 (d, J=2.4 Hz, 1 H, Ar—H), 7.62 (d, J=8.6 Hz, 1 H, Ar—H), 7.67 (mc, 2 H, Ar—H), 7.76 (s, 1 H, —C=CH—).

2.2 7-(3-Hydroxyprop-1-ynyl)-3-(4-methoxyphenyl) chromen-2-one

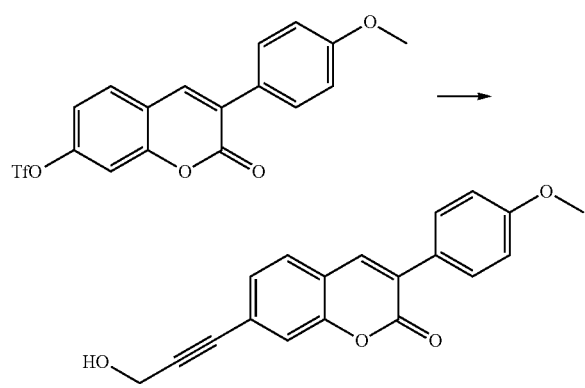

6.90 g (17.2 mmol) of 3-(4-methoxyphenyl)-2-oxo-2H-chromen-7-yl trifluoromethanesulfonate, 1.5 ml (25.4 mmol) of propyn-1-ol, 12.0 g (36.8 mmol) of caesium carbonate, 150 mg (0.578 mmol) of bis(acetonitrile)palladium(II)chloride and 800 mg (1.68 mmol) of 2-dicyclohexylphosphino-2'-4'-6'-triisopropylbiphenyl are stirred in 100 ml of dioxane at 60° C. for 3 h, added to 400 ml of water and acidified using 2 N hydrochloric acid. The aqueous phase is extracted three times with ethyl acetate, and the combined org. phases are washed with water and dried over sodium sulfate. The solvent is removed in vacuo, and the residue is filtered through silica gel with toluene/ethyl acetate (4:1). Crystallisation of the crude product from toluene/ethyl acetate (10:1) gives 7-(3-hydroxyprop-1-ynyl)-3-(4-methoxyphenyl)chromen-2-one as yellow crystals.

$^1$H-NMR (400 MHz, CDCl$_3$):

δ=1.74 ppm (t, br., OH), 3.86 (s, 3 H, OCH$_3$), 4.45 (d, br., J=4.0 Hz, 2 H, CH$_2$OH), 6.98 (m$_c$, 2 H, Ar—H), 7.33 (dd, J=1.5 Hz, J=8.0 Hz, 1 H, Ar—H), 7.40 (s, br., 1 H), 7.46 (d, J=8.0 Hz, 1 H, Ar—H), 7.68 (mc, 2 H, Ar—H), 7.73 (s, 1H, —C=CH—).

2.3 7-(3-Hydroxypropyl)-3-(4-methoxyphenyl) chromen-2-one

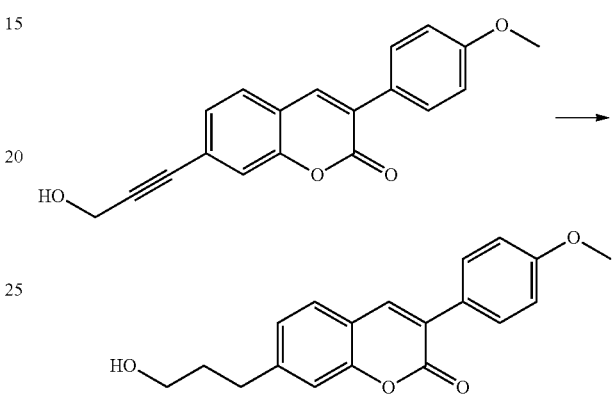

7-(3-Hydroxyprop-1-ynyl)-3-(4-methoxyphenyl) chromen-2-one is hydrogenated to completion in THF on palladium/active carbon catalyst. The catalyst is filtered off, the solvent is removed in vacuo, and the crude product is recrystallised from toluene/heptane (1:1), giving 7-(3-hydroxypropyl)-3-(4-methoxyphenyl)chromen-2-one as colourless solid.

2.4 3-[3-(4-Methoxyphenyl)-2-oxo-2H-chromen-7-yl]propyl 2-methacrylate

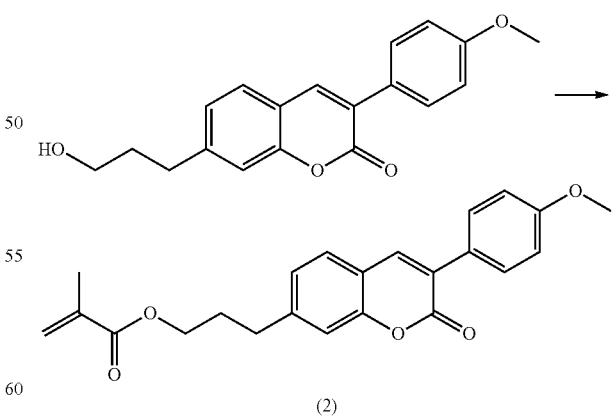

(2)

Analogously to the synthesis described in Example 1, 7-(3-hydroxypropyl)-3-(4-methoxyphenyl)chromen-2-one gives 3-[3-(4-methoxyphenyl)-2-oxo-2H-chromen-7-yl]propyl 2-methacrylate as colourless solid of m.p. 111° C.

EXAMPLE 3

Compound 3 (3-{3-[4-(2-methacryloyloxy)phenyl]-2-oxo-2H-chromen-7-yl}-propyl 2-methacrylate) is prepared as follows:

3.1 3-(4-Hydroxyphenyl)-7-(3-hydroxypropyl)chromen-2-one

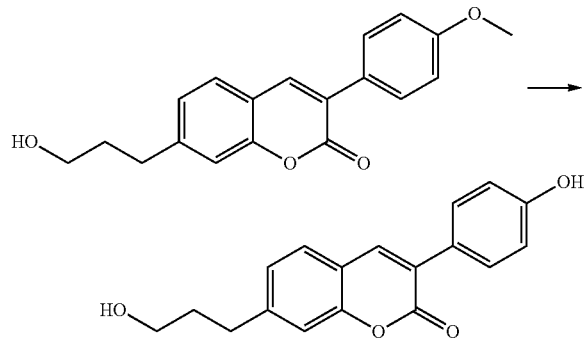

1.00 g (3.22 mmol) of 7-(3-hydroxypropyl)-3-(4-methoxyphenyl)chromen-2-one (see Ex. 3.1) is initially introduced in 30 ml of dichloromethane, and a solution of 0.4 ml (4.2 mmol) of boron tribromide in 10 ml of dichloromethane is added with ice-cooling. The cooling is removed, and the batch is stirred overnight at room temp. The solution is added to ice-water, acidified using 2 N hydrochloric acid and extracted three times with ethyl acetate. The combined org. phases are washed with water and dried over sodium sulfate. The solvent is removed in vacuo, and the residue is chromatographed on silica gel with toluene/ethyl acetate (1:1). After first runnings, 3-(4-hydroxyphenyl)-7-(3-hydroxypropyl)chromen-2-one is obtained as colourless solid in a second fraction (Rf=0.3).

$^1$H-NMR (400 MHz, DMSO-$d_6$):
δ=1.83 ppm (dddd., J=6.5 Hz, J=6.5 Hz, J=7.4 Hz, J=7.4 Hz, 2 H, —CH$_2$CH$_2$CH$_2$OH), 2.78 (dd, J=7.4 Hz, J=7.4 Hz, 2 H, CH$_2$CH$_2$CH$_2$OH), 3.49 (t, J=6.5 Hz, 2 H, CH$_2$CH$_2$CH$_2$OH), 6.90 (m$_c$, 2 H, Ar—H), 7.22 (d, J=8.2 Hz, 1 H, Ar—H), 7.26 (s, 1 H, Ar—H), 7.63 (m$_c$, 3 H, Ar—H), 8.06 (s, br., 1 H, —C=CH—), 9.73 (s, br., 1 H, exchangeable, Ar—OH).

3.2 3-{3-[4-(2-Methacryloyloxy)phenyl]-2-oxo-2H-chromen-7-yl}propyl 2-methacrylate

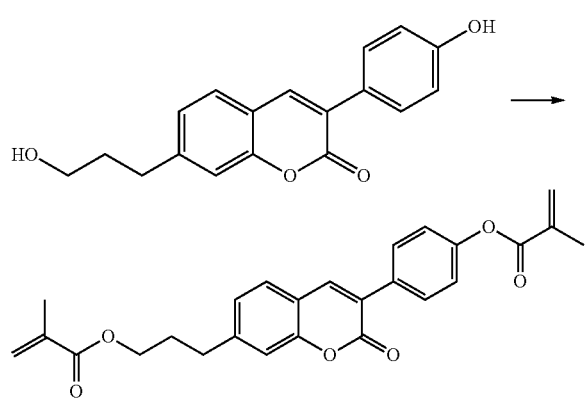

(3)

Analogously to the synthesis described under 2.4, 3-(4-hydroxyphenyl)-7-(3-hydroxypropyl)chromen-2-one gives 3-{3-[4-(2-methacryloyloxy)phenyl]-2-oxo-2H-chromen-7-yl}propyl 2-methacrylate as colourless solid of m.p. 112° C.

EXAMPLE 4

Compound 4 (3-[4-(2-methacryloyloxy)phenyl]-2-oxo-2H-chromen-7-yl methacrylate) is prepared as follows:

4.1 7-Hydroxy-3-(4-hydroxyphenyl)chromen-2-one

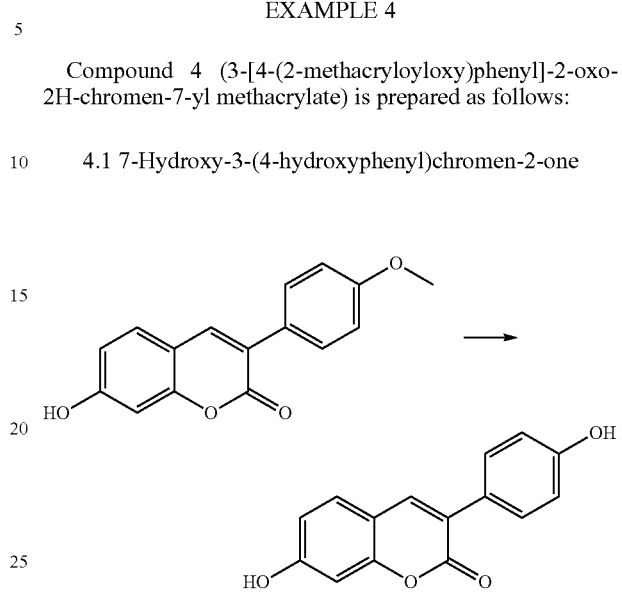

4.00 g (14.9 mmol) of 7-hydroxy-3-(4-methoxyphenyl)chromen-2-one are initially introduced in 190 ml of dichloromethane, and a solution of 2.5 ml (26.3 mmol) of boron tribromide in 10 ml of dichloromethane is added with ice-cooling. The cooling is removed, and the batch is stirred overnight at room temp. The solution is added to ice-water, acidified using 2 N hydrochloric acid and extracted three times with ethyl acetate. The combined org. phases are washed with water and dried over sodium sulfate. The solvent is removed in vacuo, and the residue is recrystallised from toluene/ethyl acetate (2:1), giving 7-hydroxy-3-(4-hydroxyphenyl)chromen-2-one as yellow crystals.

4.2 3-[4-(2-Methacryloyloxy)phenyl]-2-oxo-2H-chromen-7-yl 2-methacrylate

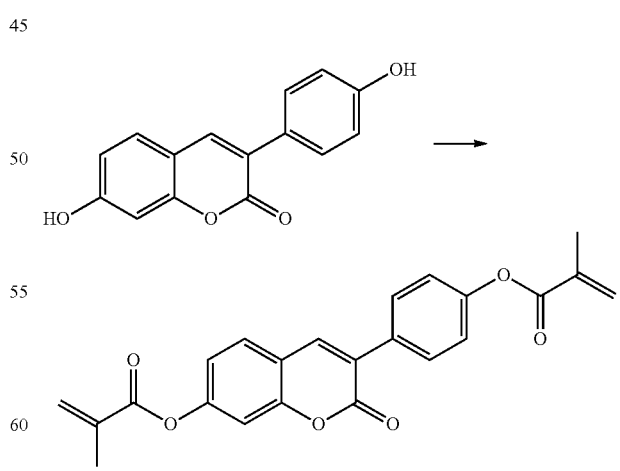

Analogously to Example 1, 7-hydroxy-3-(4-hydroxyphenyl)chromen-2-one gives 3-[4-(2-methacryloyloxy)phenyl]-2-oxo-2H-chromen-7-yl 2-methacrylate as colourless solid of m.p. 174° C.

EXAMPLE 5

Compound 5 (2-[4-(2-methacryloyloxy)phenyl]-4-oxo-4H-chromen-6-yl 2-methacrylate) is prepared as follows:

6-Hydroxy-2-(4-hydroxyphenyl)chromen-4-one and 6-hydroxy-2-(4-methoxyphenyl)chromen-4-one are commercially available.

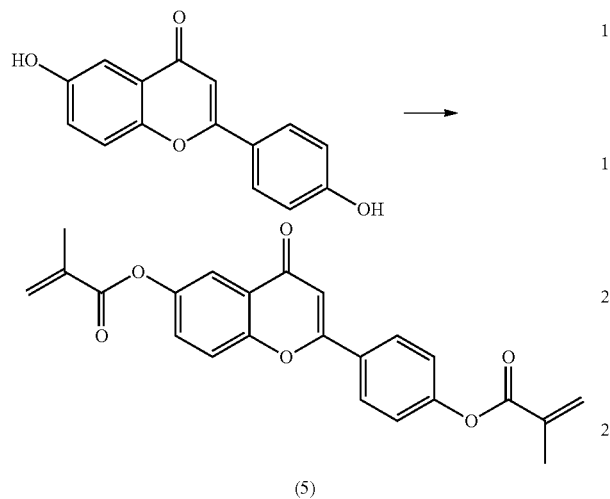

(5)

Analogously to the syntheses described in Examples 1-5, 6-hydroxy-2-(4-hydroxyphenyl)chromen-4-one gives 2-[4-(2-methacryloyloxy)phenyl]-4-oxo-4H-chromen-6-yl 2-methacrylate as colourless solid of m.p. 152° C.

EXAMPLE 6

Compound 6 (2-[4-(2-methacryloyloxy)phenyl]-4-oxo-4H-chromen-6-yl 2-methacrylate) is prepared as follows:

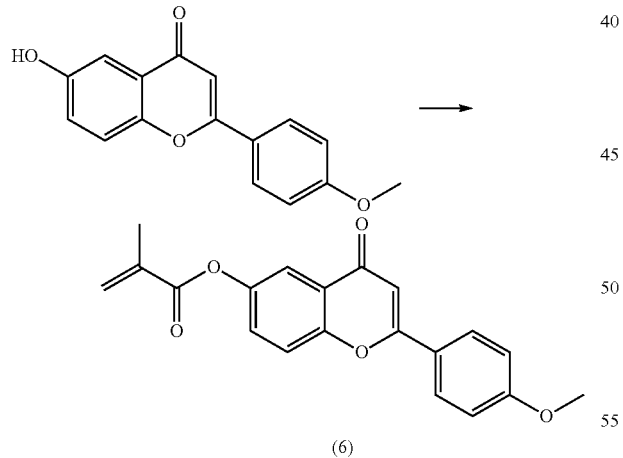

(6)

Analogously to the synthesis described in Example 1, 6-hydroxy-2-(4-hydroxyphenyl)chromen-4-one gives 2-[4-(2-methacryloyloxy)phenyl]-4-oxo-4H-chromen-6-yl 2-methacrylate as colourless solid of m.p. 134° C.

EXAMPLE 7

Compound 7 (4-(2-oxo-2H-chromen-3-yl)phenyl 2-methacrylate) is prepared analogously to compound 1 from Example 1:

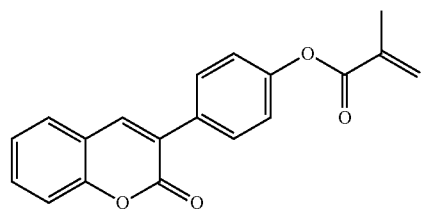

(7)

Colourless crystals of m.p. 158° C. are obtained.

EXAMPLE 8

Compound 8 (2-oxo-3-phenyl-2H-chromen-6-yl 2-methacrylate) is prepared analogously to compound 1 from Example 1:

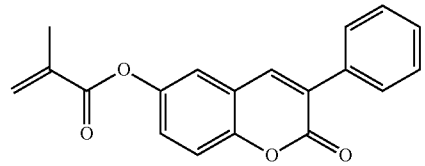

(8)

Colourless crystals of m.p. 169° C. are obtained.

EXAMPLE 9

Compound 9 ((2-oxo-3-phenyl)-2H-chromen-7-yl 2-methacrylate) is prepared analogously to compound 1 from Example 1:

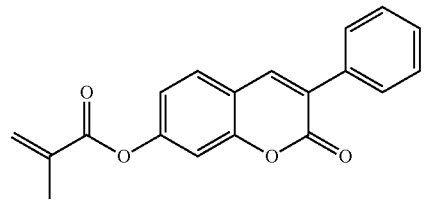

(9)

Colourless crystals of m.p. 169° C. are obtained.

EXAMPLE 10

Compound 10 (3-(4-methoxyphenyl)-2-oxo-2H-chromen-7-yl 2-methacrylate) is prepared as follows:

10.1 3-(4-Butoxyphenyl)-7-hydroxychromen-2-one

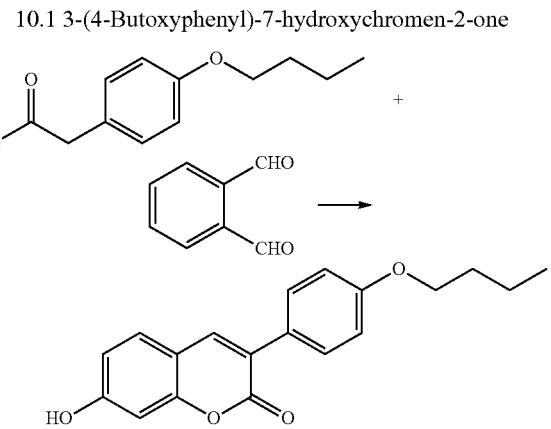

89.5 g (0.43 mol) of 4-butoxyphenylacetic acid (prepared by the method of McElvain, Carney; J. Am. Chem. Soc. 1946 (68), 2592-2599) and 30.0 g (0.22 mol) of 2,4-dihydroxybenzaldehyde are heated at 120° C. for 5 h in 100 ml of acetic anhydride and 120 ml of triethylamine. The still-hot solution is subsequently added to 3 l of ice-water, and the precipitated product is filtered off with suction and suspended in 1 l of water and 1.4 l of ethanol. After dropwise addition of 190 ml of conc. sulfuric acid, the batch is heated under reflux for 4 h and added to 3 l of water, and the precipitated product is filtered off with suction. The crude product is filtered through silica gel with hot toluene/ethyl acetate (1:1), the solvent is evaporated in vacuo, and the residue is recrystallised from toluene, giving 3-(4-butoxyphenyl)-7-hydroxychromen-2-one as colourless crystals.

10.2 3-(4-Methoxyphenyl)-2-oxo-2H-chromen-7-yl 2-methacrylate

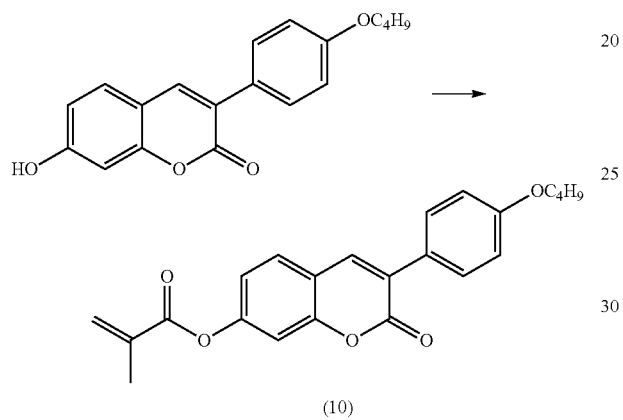

(10)

Analogously to Example 1, 3-(4-butoxyphenyl)-7-hydroxychromen-2-one gives 3-(4-methoxyphenyl)-2-oxo-2H-chromen-7-yl 2-methacrylate as colourless crystals of m.p. 129° C.

EXAMPLES 11-17

The following compounds are prepared analogously to the synthetic processes described in Examples 1 to 10:

(11)

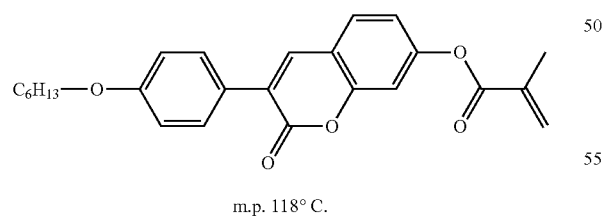

m.p. 118° C.

(12)

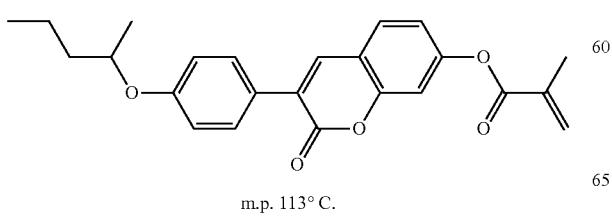

m.p. 113° C.

(13)

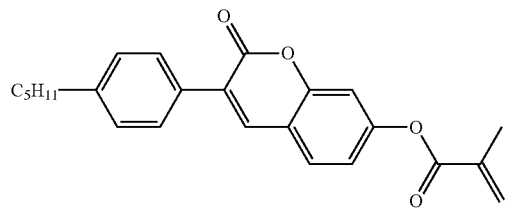

m.p. 114° C.

(14)

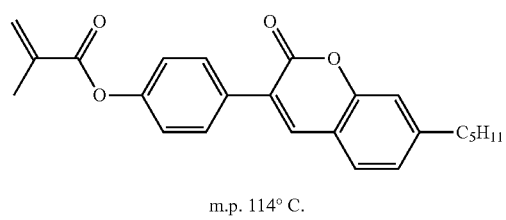

m.p. 114° C.

(15)

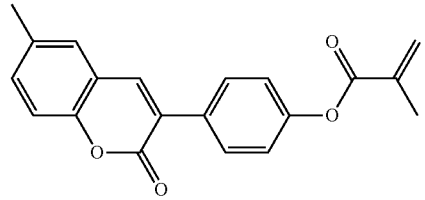

m.p. 187° C.

(16)

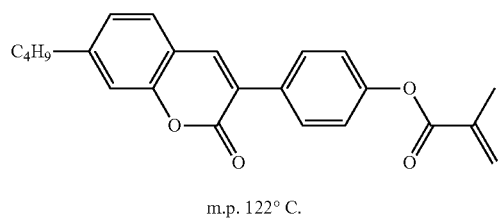

m.p. 122° C.

(17)

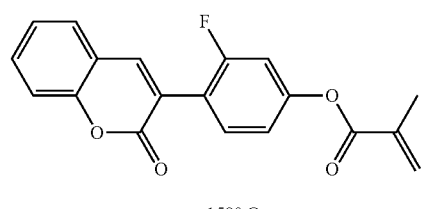

m.p. 158° C.

MIXTURE EXAMPLES

Example A1

The nematic LC host mixture N1 is formulated as follows:

| | | | |
|---|---|---|---|
| CY-3-O4 | 14.00% | Cl.p. | +71.0 |
| CY-5-O4 | 13.00% | $\Delta n$ | 0.0825 |
| CCY-3-O2 | 8.00% | $\Delta \epsilon$ | −3.5 |
| CCY-5-O2 | 8.00% | $\epsilon_{\parallel}$ | 3.5 |
| CCY-2-1 | 9.00% | $K_3/K_1$ | 1.00 |
| CCY-3-1 | 9.00% | $\gamma_1$ | 141 |
| CPY-2-O2 | 8.00% | $V_0$ | 2.06 |

-continued

| | |
|---|---|
| CCH-501 | 9.00% |
| CCH-35 | 14.00% |
| PCH-53 | 8.00% |

0.3% of RM (1) according to the invention from Example 1 is added to LC mixture N1. The resultant mixture P1 is introduced into VA e/o test cells as described above. For comparative purposes, VA e/o test cells containing comparative mixtures V1 and V2 are produced as described above, but using the RMs of the formula A or B known from the prior art instead of the RMs according to the invention:

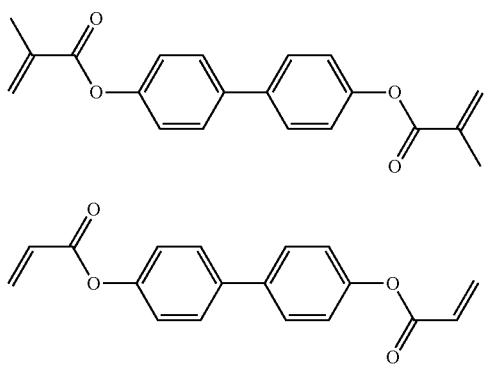

Two test cells are produced for each RM/host mixture combination. The cells are irradiated with UV light (365 nm) having an intensity of 50 mW/cm$^2$ for various times with application of a voltage of 24 V (alternating current), causing polymerisation of the RM. The pretilt angle is determined as indicated above for each test cell. The pretilt angles achieved for each of the different exposure times are shown in Tables 1 and 2, in which the pretilt angles for the two test cells in each test series and the average pretilt angle calculated therefrom are indicated:

TABLE 1

| | Tilt [°] for V1 (0.3% of RM A in N1) | | | Tilt [°] for P1 (0.3% of RM 1 in N1) | | |
|---|---|---|---|---|---|---|
| Exp. time [s] | Cell 1 | Cell 2 | Average | Cell 1 | Cell 2 | Average |
| 0 | 89.6 | 88.8 | 89.2 | 89.1 | 88.8 | 89.0 |
| 30 | 88.8 | 89.4 | 89.1 | 75.2 | 74.4 | 74.8 |
| 60 | 88.8 | 87.9 | 88.4 | 73.1 | 75.2 | 74.2 |
| 120 | 83.6 | 84.2 | 83.9 | 73.8 | 74.0 | 73.9 |
| 240 | 77.6 | 75.4 | 76.5 | 73.9 | 76.6 | 75.3 |

TABLE 2

| | Tilt [°] for P1 (0.3% of RM 1 in N1) | | |
|---|---|---|---|
| Exp. time [s] | Cell 1 | Cell 2 | Average |
| 0 | 88.6 | 89.8 | 89.2 |
| 10 | 85.2 | 83.0 | 84.1 |
| 20 | 77.1 | 79.3 | 78.2 |
| 30 | 75.6 | 77.6 | 76.6 |

As can be seen from Tables 1 and 2, significantly faster establishment of the pretilt angle can be achieved using LC medium P1 according to the invention comprising RM (1) than using LC medium V1 comprising RM A from the prior art. For LC medium V1, for example, the pretilt angle after an exposure time of 4 min is 76.5°. A similar pretilt angle (74.8° or 76.6°) can be achieved after only 30 seconds, under identical conditions, using LC medium P1 according to the invention.

Example A2

In each case, 0.3% of RM (1) or (4) according to the invention from Example 1 or 4 respectively is added to LC host mixture N1, giving mixtures P1 and P4 according to the invention. In a second series of experiments, 0.006% (based on the entire mixture) of the photoinitiator Irgacure651® (PI) is additionally added to each LC medium before the polymerisation. The mixtures are each introduced into VA e/o test cells as described above. For comparative purposes, corresponding VA e/o test cells containing comparative mixtures V1 and V2 from Ex. A1 are produced, in each case with or without photoinitiator. For polymerisation of the RM, the cells are irradiated with UV light (365 nm) having an intensity of 28 mW/cm$^2$ with application of a voltage of 10 V (alternating current), where the exposure time for the samples without photoinitiator is 20 min and that for the samples with photoinitiator is 2 min. The pretilt angles achieved are shown in Table 3.

TABLE 3

| | Tilt [°] for 0.3% of RM in N1 | |
|---|---|---|
| Mixture | No init., 20 min | With init., 2 min |
| P1 | 83.3 | 80.8 |
| P4 | 85.7 | 85.4 |
| V1 | 81.8 | 84.8 |
| V2 | 86.2 | 87.0 |

As can be seen from Table 3, the LC media according to the invention exhibit good to very good pretilt angles, both with and without initiator, which are comparable with the LC medium from the prior art.

Example A3

Nematic host mixture N1, LC medium P1 according to the invention, and comparative mixture V1 from Example A1 are each introduced into TN-VHR test cells as described above. The VHR value before and after UV exposure is determined as described above. The results are shown in Table 4.

TABLE 4

| Mixture | RM | VHR [%] before UV | VHR [%] after UV |
|---|---|---|---|
| N1 | — | 93.2 | 85.7 |
| P1 | 1 | 93.7 | 87.3 |
| V1 | A | 93.1 | 91.7 |

As can be seen from Table 4, LC medium P1 according to the invention exhibits comparable VHR values compared with LC medium V1 from the prior art and higher VHR values compared with host mixture N1.

Example A4

Nematic LC host mixture N2 is formulated as follows:

| | | | |
|---|---|---|---|
| CY-3-O2 | 16.00% | Cl.p. | +71.0 |
| CY-5-O2 | 14.00% | Δn | 0.0822 |
| CCY-3-O2 | 12.00% | Δε | −3.8 |
| CCY-5-O2 | 11.00% | ε$_\parallel$ | 3.6 |
| CCY-2-1 | 9.00% | $K_3/K_1$ | 1.16 |

-continued

| | | | |
|---|---|---|---|
| CCY-3-1 | 8.00% | $\gamma_1$ | 133 |
| CCH-34 | 8.00% | $V_0$ | 2.10 |
| CCH-35 | 9.00% | | |
| PCH-53 | 7.00% | | |
| PCH-301 | 6.00% | | |

0.2% or 0.3% of RM (1) according to the invention from Example 1 is added to LC mixtures N1 from Example A1 and N2 respectively. The resultant mixtures are introduced into VA e/o test cells as described above. The cells are irradiated with UV light (365 nm) having an intensity of 25 mW/cm² for a period of 4 min with application of various voltages (alternating current), causing polymerisation of the RM. The pretilt angle is determined as indicated above for each test cell. The pretilt angles achieved for each of the different voltages are shown in Table 5.

TABLE 5

| Mixture | Voltage (RMS) [V] | Tilt [°] |
|---|---|---|
| N1 + 0.3% of RM1 | 3.5 | 87.3 |
| | 7 | 84.8 |
| | 14 | 80.7 |
| | 24 | 76.1 |
| N2 + 0.3% of RM1 | 3.5 | 87.9 |
| | 7 | 85.8 |
| | 14 | 82.4 |
| | 24 | 78.3 |
| N1 + 0.2% of RM1 | 3.5 | 88.5 |
| | 7 | 86.8 |
| | 14 | 84.9 |
| | 24 | 82.7 |
| N2 + 0.2% of RM1 | 3.5 | 89.0 |
| | 7 | 87.1 |
| | 14 | 85.6 |
| | 24 | 83.5 |

As can be seen from Table 5, the pretilt angle achieved can be controlled by changing the voltage.

Example A5

RM (1) according to the invention from Example 1 is added in various concentrations to LC host mixture N1. The resultant mixtures are introduced into VA e/o test cells as described above. The cells are irradiated with UV light (365 nm) having an intensity of 50 mW/cm² for various times with application of a voltage of 24 V (alternating current), causing polymerisation of the RM. The pretilt angle is determined as indicated above for each test cell. The pretilt angles achieved for each of the different exposure times are shown in Table 6.

TABLE 6

| Conc. of RM1 in N1 | Exposure time [s] | Tilt [°] |
|---|---|---|
| 0.1% | 0 | 88.5 |
| | 30 | 87.9 |
| | 60 | 88.6 |
| | 120 | 87.3 |
| | 240 | 88.4 |
| 0.2% | 0 | 88.5 |
| | 30 | 85.1 |
| | 60 | 84.0 |
| | 120 | 83.7 |
| | 240 | 84.0 |
| 0.3% | 0 | 88.4 |
| | 30 | 78.0 |
| | 60 | 77.5 |
| | 120 | 77.0 |
| | 240 | 78.2 |

As can be seen from Table 6, the pretilt angle achieved can be controlled by changing the concentration of the RM.

Example A6

In each case, 0.3% of RM (1) according to the invention from Example 1 and RM A known from the prior art (see Example 12) are added to LC mixture N1. The resultant mixtures are introduced into VA e/o test cells as described above. The cells are irradiated with UV light (365 nm) having an intensity of 50 mW/cm² for various times with application of a voltage of 24 V (alternating current), causing polymerisation of the RM.

In order to determine the polymerisation rate, the residual content of unpolymerised RM in the test cell is measured using the HPLC method. To this end, the mixture is polymerised in test cells under the conditions indicated. The mixture is then rinsed out of the test cells using MEK (methyl ethyl ketone) and measured. The results are shown in Table 7.

TABLE 7

| Mixture | Exposure time [s] | RM residual content [%] |
|---|---|---|
| RM A in N1 | 0 | 0.3 |
| | 120 | 0.28 |
| | 240 | 0.24 |
| RM 1 in N1 | 0 | 0.3 |
| | 120 | 0.01 |
| | 240 | 0.004 |

As can be seen from Table 7, significantly less unpolymerised residual RM is already present in the cell after a short time in the case of RM 1 than in the case of RM A known from the prior art, which allows the conclusion of a significantly higher polymerisation rate of RM 1 in the cell.

Example A7

In each case, 0.3% of RMs (1)-(17) according to the invention from Examples 1-17 is added to LC mixture N1. The resultant mixtures are introduced into VA e/o test cells as described above. The cells are irradiated with UV light (365 nm) having an intensity of 50 mW/cm² for various times with application of a voltage of 24 V (alternating current), causing polymerisation of the RM. The pretilt angle is determined as indicated above for each test cell. The pretilt angles achieved for each of the different exposure times are shown in Table 8.

TABLE 8

| | RM | | | | | |
|---|---|---|---|---|---|---|
| | 1 | 2 | 3 | 4 | 5 | 6 |
| Exp. time/s | Tilt angle/° | | | | | |
| 0 | 89.0 | 88.7 | 88.8 | 89.5 | 89.4 | 89.3 |
| 30 | 74.8 | 90.0 | 78.8 | 86.2 | 86.9 | 88.9 |
| 60 | 74.2 | 89.6 | 75.4 | 85.5 | 83.8 | 88.8 |
| 120 | 73.9 | 88.1 | 75.0 | 84.4 | 78.2 | 88.8 |
| 240 | 75.3 | 85.2 | 73.8 | 84.8 | 71.8 | 88.6 |
| 360 | — | 82.5 | 72.0 | 84.9 | — | 88.8 |

| | RM | | | | | |
|---|---|---|---|---|---|---|
| | 7 | 8 | 9 | 10 | 11 | 12 |
| Exp. time/s | Tilt angle/° | | | | | |
| 0 | 88.7 | 88.8 | 88.6 | 89.4 | 89.5 | 88.8 |
| 30 | 87.4 | 85.5 | 85.6 | 85.4 | 85.5 | 85.9 |
| 60 | 84.4 | 84.0 | 83.0 | 82.8 | 85.0 | 84.1 |
| 120 | 81.9 | 83.0 | 81.3 | 82.4 | 84.6 | 83.9 |
| 240 | 81.0 | 80.0 | 80.6 | 82.4 | 85.1 | 84.2 |
| 360 | 79.0 | 81.2 | 79.2 | 81.5 | 85.4 | 84.9 |

TABLE 8-continued

| | RM | | | | |
|---|---|---|---|---|---|
| | 13 | 14 | 15 | 16 | 17 |
| Exp. time/s | Tilt angle/° | | | | |
| 0 | 89.9 | 89.0 | 89.5 | 89.6 | 89.4 |
| 30 | 87.9 | 88.6 | 86.5 | 88.7 | 89.2 |
| 60 | 86.6 | 88.8 | 83.6 | 88.2 | 89.0 |
| 120 | 85.6 | 87.2 | 81.5 | 87.9 | 87.2 |
| 240 | 85.5 | 85.4 | 79.3 | 86.2 | 85.9 |
| 360 | 85.7 | 85.0 | 78.3 | 85.5 | 85.4 |

In order to determine the polymerisation rate, the residual content of unpolymerised RM in the test cell is measured using the HPLC method. To this end, the mixture is polymerised in test cells under the conditions indicated. The mixture is then rinsed out of the test cells using MEK (methyl ethyl ketone) and measured. The results are shown in Table 9.

TABLE 9

| | RM | | | | | |
|---|---|---|---|---|---|---|
| | 1 | 2 | 3 | 5 | 6 | 7 |
| Exp. time/s | RM concentration/% | | | | | |
| 0 | 0.300 | 0.300 | 0.300 | 0.300 | 0.300 | 0.300 |
| 120 | 0.002 | 0.024 | 0.012 | 0.094 | 0.042 | 0.041 |
| 240 | 0.001 | 0.000 | 0.000 | 0.038 | 0.000 | 0.013 |
| 360 | 0.001 | 0.000 | 0.000 | 0.019 | 0.000 | 0.000 |

| | RM | | | | |
|---|---|---|---|---|---|
| | 8 | 9 | 10 | 11 | 12 |
| Exp. time/s | RM concentration/% | | | | |
| 0 | 0.300 | 0.300 | 0.300 | 0.300 | 0.300 |
| 120 | 0.000 | 0.024 | 0.011 | 0.000 | 0.000 |
| 240 | 0.000 | 0.000 | 0.007 | 0.000 | 0.000 |
| 360 | 0.000 | 0.000 | 0.007 | 0.000 | 0.000 |

| | RM | | | | |
|---|---|---|---|---|---|
| | 13 | 14 | 15 | 16 | 17 |
| Exp. time/s | RM concentration/% | | | | |
| 0 | 0.300 | 0.300 | 0.300 | 0.300 | 0.300 |
| 120 | 0.000 | 0.013 | 0.058 | 0.000 | 0.137 |
| 240 | 0.000 | 0.000 | 0.000 | 0.000 | 0.063 |
| 360 | 0.000 | 0.000 | 0.000 | 0.000 | 0.043 |

As can be seen from Table 9, only a little unpolymerised residual RM is still present in the cell after only a short time, which allows the conclusion of a high polymerisation rate of the RM in the cell.

The invention claimed is:

1. A PS (polymer stabilized) or PSA (polymer sustained alignment) liquid-crystal (LC) display, containing a liquid-crystal (LC) medium comprising a compound of formula I

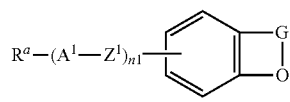

wherein
G denotes —CM=CR$^c$—CO— or —CO—CM=CR$^c$—,
M denotes —(Z$^2$-A$^2$)$_{n2}$-R$^b$,
A$^1$ and A$^2$ each, independently of one another, denote an aromatic, heteroaromatic, alicyclic or heterocyclic group, which optionally contains fused rings, and which is optionally mono- or polysubstituted by L, Z$^1$ denotes on each occurrence, identically or differently, —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n3}$—, —CF$_2$CH$_2$—, —CH$_2$CF$_2$—, —(CF$_2$)$_{n3}$—, —CH=CH—, —CF=CF—, —CH=CF—, —CF=CH—, —C≡C—, —CH=CH—COO—, —OCO—CH=CH—, —CH$_2$—CH$_2$—COO—, —OCO—CH$_2$—CH$_2$—, or a single bond, Z$^2$ denotes on each occurrence, identically or differently, —O—, —CO—O—, —OCO—, —OCH$_2$—, —CH$_2$O—, —CF$_2$O—, —OCF$_2$—, —CH$_2$CH$_2$—, —CH=CH—, —CF=CF—, —CH=CF—, —CF=CH—, —C≡C—, or a single bond, R$^a$, R$^b$ and R$^c$ denote, each independently, P, P-Sp-, H, OH, F, Cl, Br, I, —CN, —NO$_2$, —NCO, —NCS, —OCN, —SCN, SF$_5$ or a straight-chain or branched alkyl having 1 to 25 C atoms, in which one or more non-adjacent CH$_2$ groups are optionally replaced, independently of one another, by —C(R$^{oo}$)=C(R$^{ooo}$)—, —C≡C—, —N(R$^{oo}$)—, —O—, —S—, —CO—, —CO—O—, —O—CO—, or —O—CO—O— in such a way that O and/or S atoms are not linked directly to one another, and in which one or more H atoms are optionally replaced by F, Cl, Br, I, CN or P-Sp-, where at least one of the radicals R$^a$ and R$^b$ denotes or contains a group P or P-Sp-, P denotes on each occurrence, identically or differently, a polymerizable group, Sp denotes on each occurrence, identically or differently, a spacer group or a single bond, R$^{oo}$ and R$^{ooo}$ each, independently of one another, denote H or alkyl having 1 to 12 C atoms, L denotes on each occurrence, identically or differently, P-Sp-, H, OH, CH$_2$OH, halogen, SF$_5$, NO$_2$, a carbon group or hydrocarbon group, n1 and n2 each, independently of one another, denote 0, 1, 2 or 3, and n3 denotes 1, 2, 3 or 4.

2. A liquid-crystal (LC) display according to claim 1, wherein R$^a$ and R$^b$ denote identical or different radicals P or P-Sp-.

3. A liquid-crystal (LC) display according to claim 1, wherein the compound of formula I is a compound of one of the following formulae

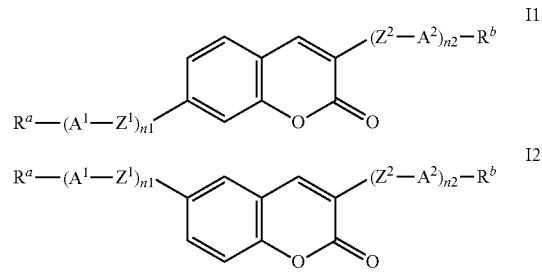

103
-continued

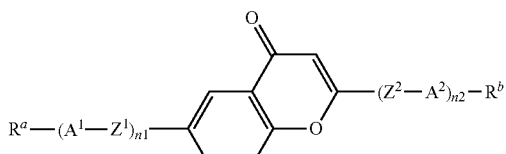
I3

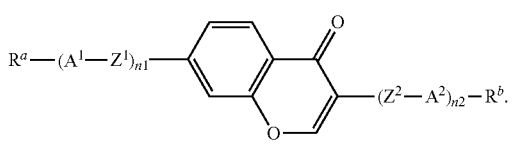
I4

4. A liquid-crystal (LC) display according to claim 1, wherein the compound of formula I is one of the following compounds

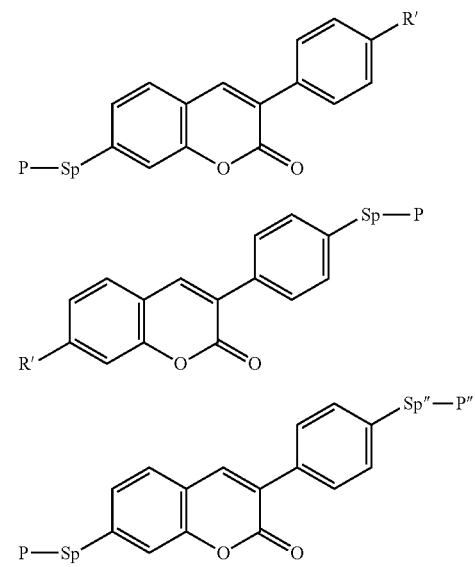
I1a

I1b

I1c

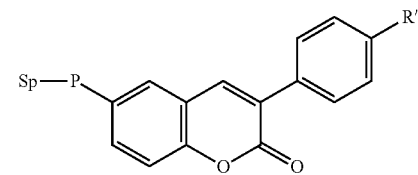
I2a

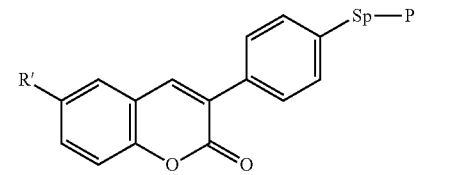
I2b

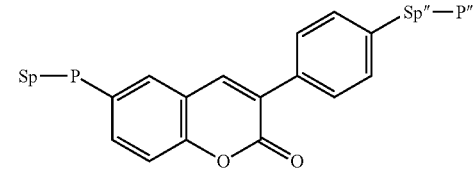
I2c

104
-continued

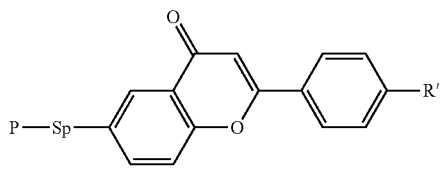
I3a

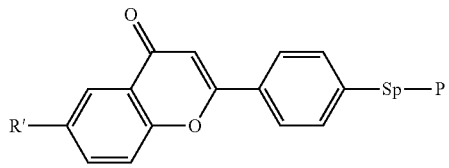
I3b

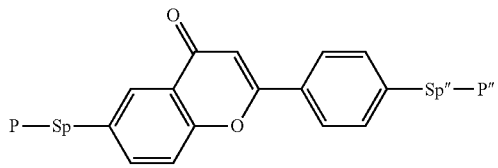
I3c

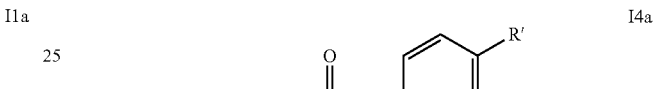
I4a

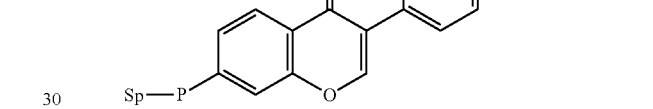
I4b

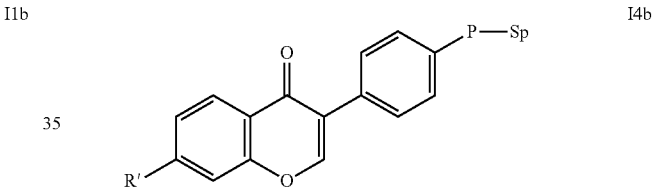
I4c

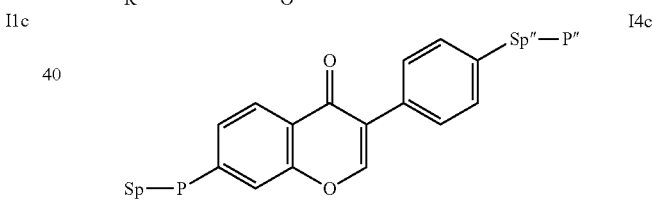

in which,
P" denotes on each occurrence, identically or differently, a polymerizable group,
Sp" denotes on each occurrence, identically or differently, a spacer group or a single bond, and
R' has one of the meanings indicated for the compound of formula I, where R' is other than H and does not denote or contain a group P-Sp-.

5. A liquid-crystal (LC) display according to claim 1, comprising an LC cell comprising two substrates and two electrodes, where at least one substrate is transparent to light and at least one substrate has one or two electrodes, and a layer of an LC medium comprising a polymerized component and a low-molecular-weight component located between the substrates, where the polymerized component is obtainable by polymerization of one or more polymerizable compounds between the substrates of the LC cell in the LC medium, where at least one of the polymerizable compounds is a compound of formula I.

6. A liquid-crystal (LC) display according to claim 1, wherein the LC medium further comprises one or more compounds of formulae CY and/or PY:

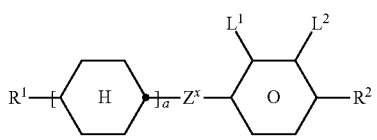

CY

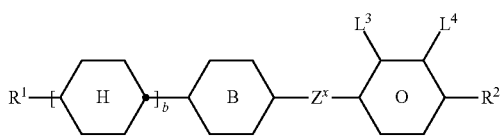

PY in which
a denotes 1 or 2,
b denotes 0 or 1,

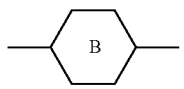

denotes

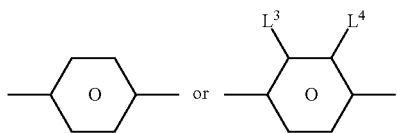

$R^1$ and $R^2$ each, independently of one another, denote alkyl having 1 to 12 C atoms, in which one or two non-adjacent CH$_2$ groups are optionally replaced by —O—, —CH=CH—, —CO—, —OCO— or —COO— in such a way that O atoms are not linked directly to one another, $Z^x$ denotes —CH=CH—, —CH$_2$O—, —OCH$_2$—, —CF$_2$O—, —OCF$_2$—, —O—, —CH$_2$—, —CH$_2$CH$_2$— or a single bond, and $L^{1-4}$ each, independently of one another, denote F, Cl, OCF$_3$, CF$_3$, CH$_3$, CH$_2$F, or CHF$_2$.

7. A liquid-crystal (LC) display according to claim 1, wherein the LC medium comprises one or more compounds of the following formula ZK:

ZK

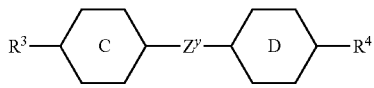

in which

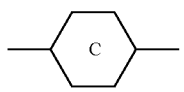

denotes

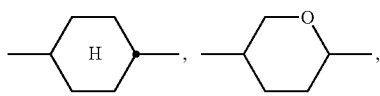

-continued

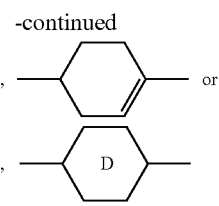

denotes

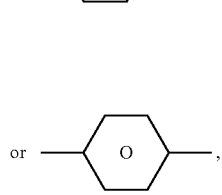

$R^3$ and $R^4$ each, independently of one another, denote alkyl having 1 to 12 C atoms, in which one or two non-adjacent CH$_2$ groups are optionally replaced by —O—, —CH=CH—, —CO—, —OCO— or —COO— in such a way that O atoms are not linked directly to one another, and $Z^y$ denotes —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF— or a single bond.

8. A liquid-crystal (LC) display according to claim 1, which is a PSA-VA, PSA-OCB, PS-IPS, PS-FFS or PS-TN display.

9. A liquid-crystal (LC) display according to claim 1, comprising
a polymerizable component A) comprising one or more polymerizable compounds, and
a liquid-crystalline component B) comprising one or more low-molecular-weight compounds,
wherein component A) comprises one or more polymerizable compounds of formula I.

10. A liquid-crystal (LC) display according to claim 9, in which component B) comprises one or more compounds of formulae CY or PY

CY

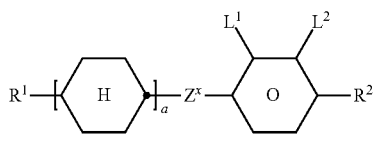

PY

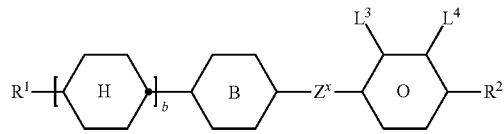

in which
a denotes 1 or 2,
b denotes 0 or 1,

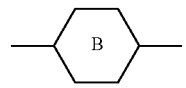

denotes

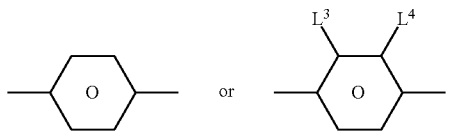

R¹ and R² each, independently of one another, denote alkyl haying 1 to 12 C atoms in which one or two non-adjacent CH₂ groups are optionally replaced —O—, —CH=CH—, —CO—, —OCO— or —COO— such a way that O atoms are not linked directly to one another, $Z^x$ denotes —CH=CH—, —CH₂O—, —OCH₂—, —CF₂O—, —OCF₂—, —O—, —CH₂—, —CH₂CH₂— or a single bond, and $L^{1-4}$ each, independently of one another, denote F, Cl, OCF₃, CF₃, CH₃, CH₂F, or CHF₂.

11. A compound of formula I

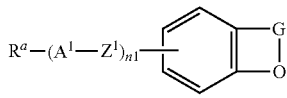   I wherein

G denotes —CM=CF$^c$—CO— or —CO—CM=CF$^c$—,

M denotes —(Z²-A²)$_{n2}$-R$^b$,

A¹ and A² each, independently of one another, denote an aromatic, heteroaromatic, alicyclic or heterocyclic group, which optionally contain fused rings, and which is mono- or polysubstituted by L, Z¹ denotes on each occurrence, identically or differently, —O—, —S—, —CO—, —CO—O—, —OCO—, —O—CO—O—, —OCH₂—, —CH₂O—, —SCH₂—, —CH₂S—, —CF₂O—, —OCF₂—, —CF₂S—, —SCF₂—, —(CH₂)$_{n3}$—, —CF₂CH₂—, —CH₂CF₂—, —(CF₂)$_{n3}$—, —CH=CH—, —CF=CF—, —CH=CF—, —CF=CH—, —C≡C—, —CH=CH—COO—, —OCO—CH=CH—, —CH₂—CH₂—COO—, —OCO—CH₂—CH₂—, or a single bond, Z² denotes on each occurrence, identically or differently, —O—, —CO—O—, —OCO—, —OCH₂—, —CH₂O—, —CF₂O—, —OCF₂—, —CH₂CH₂—, —CH=CH—, —CF=CF—, —CH=CF—, —CF=CH—, —C≡C—, or a single bond, R$^a$, R$^{b\ and\ Rc}$ denote, each independently P, P-Sp-, H, OH, F, Cl, Br, I, —CN, —NO₂, —NCO, —NCS, —OCN, —SCN, SF₅ or a straight-chain or branched alkyl having 1 to 25 C atoms, in which one or more non-adjacent CH₂ groups are optionally replaced, independently of one another, by —C(R$^{00}$)=C(R$^{000}$)—, —C≡C—, —N(R$^{00}$)—, —O—, —S—, —CO—, —CO—O—, —O—CO—, or —O—CO—O— in such a way that O and/or S atoms are not linked directly to one another, and in which one or more H atoms are optionally replaced by F, Cl, Br, I, CN or P-Sp-, where at least one of the radicals R$^a$ and R$^b$ denotes or contains a group P or P-Sp-, P denotes on each occurrence, identically or differently, a polymerizable group selected from the group consisting of CH₂=CW¹—COO—, CH₂=CH—O—, (CH₂=CH)₂CH—OCO—, (CH₂=CH)₂CH—O—

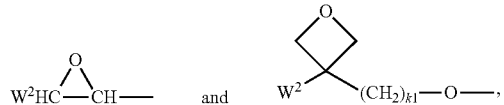

W¹ denotes H, F, Cl, CN, CF₃, phenyl or alkyl having 1 to 5 C atoms

W² denotes H or alkyl having 1 to 5 C atoms,

K₁ 0 or 1,

Sp denotes on each occurrence, identically or differently, a spacer group or a single bond, R$^{00}$ and R$^{000}$ each, independently of one another, denote H or alkyl having 1 to 12 C atoms, L denotes on each occurrence, identically or differently, P-Sp-, H, OH, CH₂OH, halogen, SF₅, NO₂, a carbon group or hydrocarbon group, n1 and n2 each, independently of one another, denote 0, 1, 2 or 3, and n3 denotes 1, 2, 3 or 4, with the proviso that
  a) the two radicals R$^a$ and R$^b$ each, independently of one another, denote P-Sp-,
  and/or
  b) n1 and n2 are other than 0,
  and/or
  c) n2 is other than 0 and —(Z²-A²)$_{n2}$- does not denote —CO—C₆H₄—.

12. A compound of formula I*

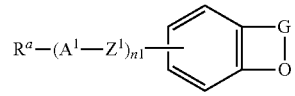   I* wherein

G denotes —CM=CR$^c$—CO— or —CO—CM=CR$^c$—,

M denotes —(Z²-A²)$_{n2}$-R$^b$,

A¹ and A² each, independently of one another, denote an aromatic, heteroaromatic, alicyclic or heterocyclic group, which optionally contains fused rings, and which is optionally mono- or polysubstituted by L, Z¹ denotes on each occurrence, identically or differently, —O—, —S—, —CO—, —CO—O—, —OCO—, —O—CO—O—, —OCH₂—, —CH₂O—, —SCH₂—, —CH₂S—, —CF₂O—, —OCF₂—, —CF₂S—, —SCF₂—, —(CH₂)$_{n3}$—, —CF₂CH₂—, —CH₂CF₂—, —(CF₂)$_{n3}$—, —CH=CH—, —CF=CF—, —CH=CF—, —CF=CH—, —C≡C—, —CH=CH—COO—, —OCO—CH=CH—, —CH₂—CH₂—COO—, —OCO—CH₂—CH₂—, or a single bond, Z² denotes on each occurrence, identically or differently, —O—, —CO—O—, —OCO—, —OCH₂—, —CH₂O—, —CF₂O—, —OCF₂—, —CH₂CH₂—, —CH=CH—, —CF=CF—, —CH=CF—, —CF=CH—, —C≡C—, or a single bond R$^a$ and R$^b$ denote -Sp-O—Sg, Sg denotes an H atom or a protecting group, R$^c$ denotes P, P-Sp-, H, OH, F, Cl, Br, I, —CN, —NO₂, —NCO, —NCS, —OCN, —SCN, SF₅ or a straight-chain or branched alkyl having 1 to 25 C atoms, in which one or more non-adjacent $CH_2$ groups are optionally replaced, independently of one another, by $-C(R^{00})=C(R^{000})-$, $-C\equiv C-$, $-N(R^{00})-$, $-O-$, $-S-$, $-CO-$, $-CO-O-$, $-O-CO-$, or $-O-CO-O-$ in such a way that O and/or S atoms are not linked directly to one another, and in which one or more H atoms are optionally replaced by F, Cl, Br, I, CN or P-Sp-, P denotes on each occurrence, identically or differently, a polymerizable $CH_2=CW^1-COO-$, $CH_2=CH-O-$, $(CH_2=CH)_2CH-OCO-$, $(CH_2=CH)_2CH-O-$,

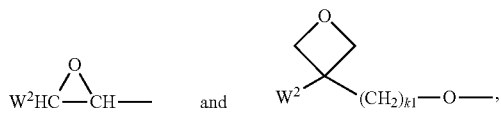

$W^1$ denotes H, F, Cl, CN, $CF_3$, phenyl or alkyl having 1 to 5 C atoms $W^2$ denotes H or alkyl having 1 to 5 C atoms, $k_1$ 0 or 1, Sp denotes on each occurrence, identically or differently, a spacer group or a single bond, $R^{00}$ and $R^{000}$ each, independently of one another, denote H or alkyl having 1 to 12 C atoms, L denotes on each occurrence, identically or differently, P-Sp-, H, OH, $CH_2OH$, halogen, $SF_5$, $NO_2$, a carbon group or hydrocarbon group, n1 and n2 each, independently of one another, denote 0, 1, 2 or 3, and n3 denotes 1, 2, 3 or 4.

13. A compound according to claim 12, which is one of the following compounds

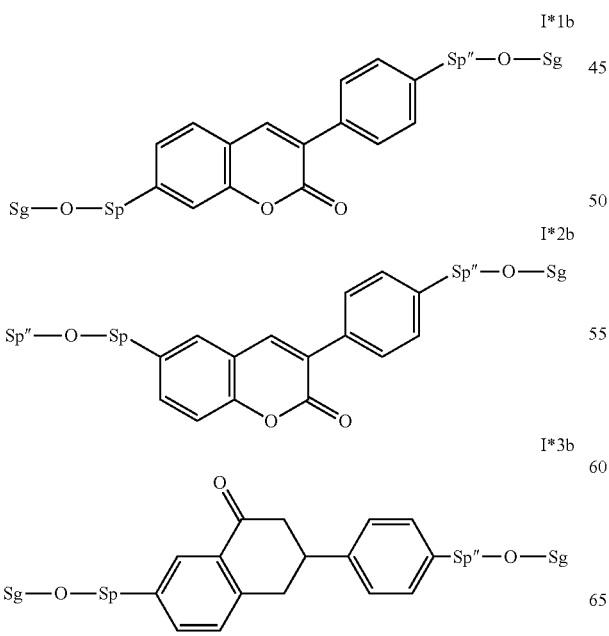

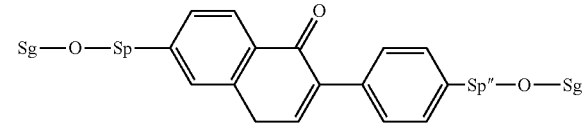

in which Sp" has one of the meanings indicated for Sp for the compound of formula I*, and Sp and Sg are as defined for the compound of formula I*.

14. A process for the preparation of a compound of formula I

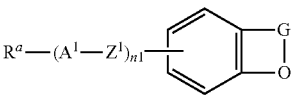

wherein

G denotes $-CM=CR^c-CO-$ or $-CO-CM=CR^c-$,

M denotes $-(Z^2-A^2)_{n2}-R^b$, $A^1$ and $A^2$ each, independently of one another, denote an aromatic, heteroaromatic, alicyclic or heterocyclic group, which optionally contains fused rings, and which is optionally mono- or polysubstituted by L, $Z^1$ denotes on each occurrence, identically or differently, $-O-$, $-S-$, $-CO-$, $-CO-O-$, $-OCO-$, $-O-CO-O-$, $-OCH_2-$, $-CH_2O-$, $-SCH_2-$, $-CH_2S-$, $-CF_2O-$, $-OCF_2-$, $-CF_2S-$, $-SCF_2-$, $-(CH_2)_{n3}-$, $-CF_2CH_2-$, $-CH_2CF_2-$, $-(CF_2)_{n3}-$, $-CH=CH-$, $-CF=CF-$, $-CH=CF-$, $-CF=CH-$, $-C\equiv C-$, $-CH=CH-COO-$, $-OCO-CH=CH-$, $-CH_2-CH_2-COO-$, $-OCO-CH_2-CH_2-$, or a single bond, $Z^2$ denotes on each occurrence, identically or differently, $-O-$, $-CO-O-$, $-OCO-$, $-OCH_2-$, $-CH_2O-$, $-CF_2O-$, $-OCF_2-$, $-CH_2CH_2-$, $-CH=CH-$, $-CF=CF-$, $-CH=CF-$, $-CF=CH-$, $-C\equiv C-$, or a single bond, $R^a$, $R^b$ and $R^c$ denote, each independently P, P-Sp-, H, OH, F, Cl, Br, I, $-CN$, $-NO_2$, $-NCO$, $-NCS$, $-OCN$, $-SCN$, $SF_5$ or a straight-chain or branched alkyl having 1 to 25 C atoms, in which one or more non-adjacent $CH_2$ groups are optionally replaced, independently of one another, by $-C(R^{00})=C(R^{000})-$, $-C\equiv C-$, $-N(R^{00})-$, $-O-$, $-S-$, $-CO-$, $-CO-O-$, $-O-CO-$, or $-O-CO-O-$ in such a way that O and/or S atoms are not linked directly to one another, and in which one or more H atoms are optionally replaced by F, Cl, Br, I, CN or P-Sp-, where at least one of the radicals $R^a$ and $R^b$ denotes or contains a group P or P-Sp-, P denotes on each occurrence, identically or differently, a polymerizable group selected from the group consisting of CH$_2$=CW$^1$—COO—, CH$_2$=CH—O—, (CH$_2$=CH)$_2$CH—OCO—, (CH$_2$=CH)$_2$CH—O—,

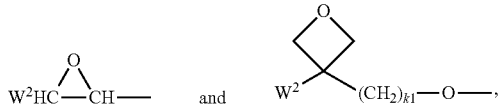 and

W$^1$ denotes H, F, Cl, CN, CF$_3$, phenyl or alkyl having 1 to 5 C atoms

W$^2$ denotes H or alkyl having 1 to 5 C atoms,

K$_1$ 0 or 1,

Sp denotes on each occurrence, identically or differently, a spacer group or a single bond, R$^{00}$ and R$^{000}$ each, independently of one another, denote H or alkyl having 1 to 12 C atoms, L denotes on each occurrence, identically or differently, P-Sp-, H, OH, CH$_2$OH, halogen, SF$_5$, NO$_2$, a carbon group or hydrocarbon group, n1 and n2 each, independently of one another, denote 0, 1, 2 or 3, and n3 denotes 1, 2, 3 or 4, with the proviso that
a) the two radicals R$^a$ and R$^b$ each, independently of one another, denote P-Sp-,
and/or
b) n1 and n2 are other than 0,
and/or
c) n2 is other than 0 and —(Z$^2$-A$^2$)$_{n2}$- does not denote —CO—C$_6$H$_4$—.

said process comprising subjecting a compound according to claim 12 to esterification or etherification by a corresponding acid, acid derivative, or halogenated compound containing a group P, in the presence of a dehydrating reagent.

15. A process for the production of an LC display of the PS or PSA type according to claim 1, comprising introducing an LC medium comprising a compound of formula I into an LC cell having two substrates and two electrodes, where at least one substrate is transparent to light and at least one substrate has one or two electrodes, and polymerizing the polymerizable compounds.

16. A liquid-crystal (LC) display according to claim 9, in which component B) comprises one or more compounds of formula ZK

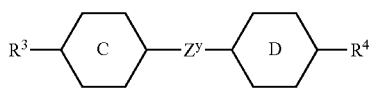 ZK in which

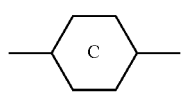

denotes

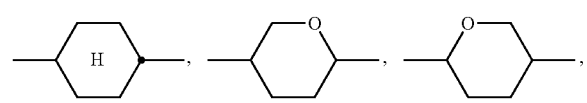,

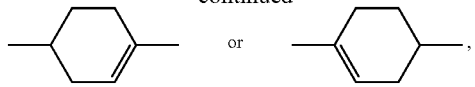

denotes

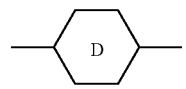 or 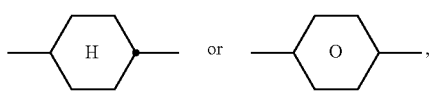,

R$^3$ and R$^4$ each, independently of one another, denote alkyl having 1 to 12 C atoms in which one or two non-adjacent CH$_2$ groups are optionally replaced by —O—, —CH=CH—, —CO—, —OCO— or —COO— in such a way that O atoms are not linked directly to one another, and Z$^y$ denotes —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF— or a single bond.

17. A process according to claim 14, wherein the corresponding acid, acid derivative, or halogenated compound containing a group P, is methacryloyl chloride or methacrylic anhydride.

18. A process according to claim 14, wherein the corresponding acid, acid derivative, or halogenated compound containing a group P, is acryloyl chloride.

19. A process according to claim 14, wherein the corresponding acid, acid derivative, or halogenated compound containing a group P, is acrylic anhydride.

20. A compound according to claim 11, wherein a group P is a vinyloxy, acrylate, methacrylate, fluoroacrylate, chloroacrylate, oxetane or epoxide group.

21. A compound according to claim 11, wherein A$^1$ and A$^2$ do not contain fused rings.

22. A compound according to claim 11, wherein

A$^1$ and A$^2$ each, independently of one another, denote 1,4-phenylene, naphthalene-1,4-diyl or naphthalene-2,6-diyl, in which one or more CH groups are optionally replaced by N, cyclohexane-1,4-diyl, in which one or more non-adjacent CH$_2$ groups are optionally replaced by O and/or S, 1,4-cyclohexenylene, bicyclo[1.1.1]pentane-1,3-diyl, bicyclo-[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, which is unsubstituted or mono- or polysubstituted by L.

23. A liquid-crystal (LC) medium comprising a compound of claim 11 and one or more compounds suitable for a LC medium.

24. A liquid-crystal (LC) medium according to claim 23, wherein R$^a$ and R$^b$ denote identical or different radicals P or P-Sp-.

25. A liquid-crystal (LC) medium according to claim 23, wherein the compound of formula I is one of the following compounds

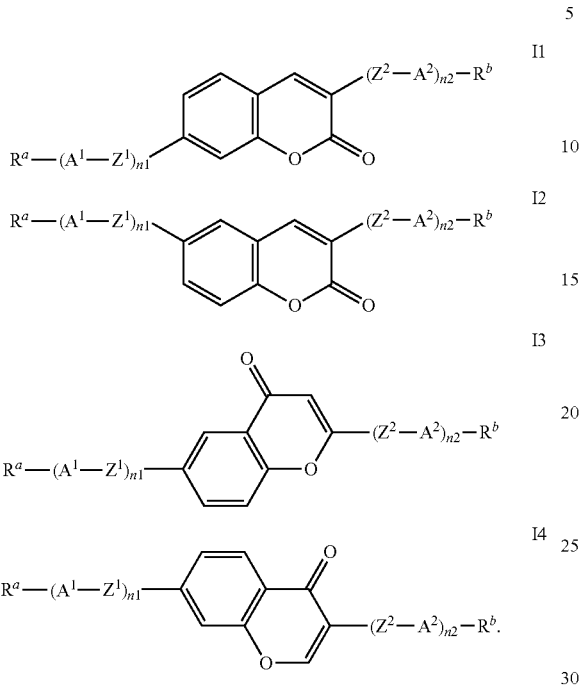

26. A liquid-crystal (LC) medium according to claim 23, wherein the compound of formula I is one of the following compounds

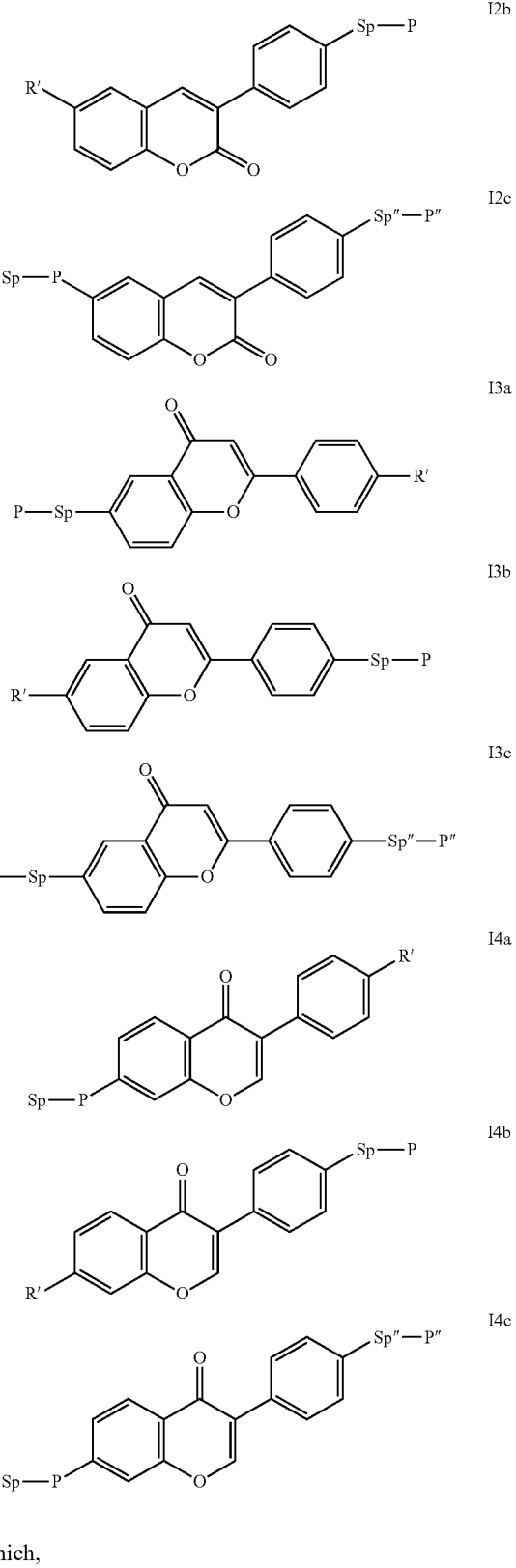

in which,

P″ has one of the meanings indicated for P for the compound of formula I,

Sp″ has one of the meanings indicated for Sp for the compound of formula I, and

R' has one of the meanings indicated for the compound of formula I, where R' is other than H and does not denote or contain a group P-Sp-.

27. A liquid-crystal (LC) medium according to claim 23, which comprises one or more compounds of formulae CY and/or PY:

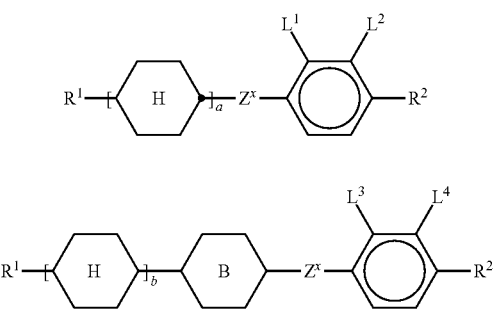

in which
a denotes 1 or 2,
b denotes 0 or 1,

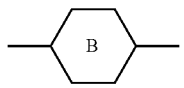

denotes

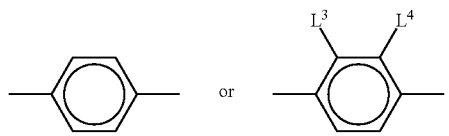

$R^1$ and $R^2$ each, independently of one another, denote alkyl having 1 to 12 C atoms, in which one or two non-adjacent $CH_2$ groups are optionally replaced by —O—, —CH=CH—, —CO—, —OCO— or —COO— in such a way that O atoms are not linked directly to one another, $Z^x$ denotes —CH=CH—, —$CH_2O$—, —$OCH_2$—, —$CF_2O$—, —$OCF_2$—, —O—, —$CH_2$—, —$CH_2CH_2$— or a single bond, and $L^{1-4}$ each, independently of one another, denote F, Cl, $OCF_3$, $CF_3$, $CH_3$, $CH_2F$, or $CHF_2$.

28. A liquid-crystal (LC) medium according to claim 23, which comprises one or more compounds of the following formula ZK:

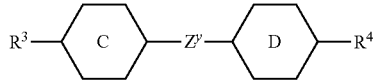

in which

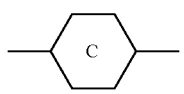

denotes

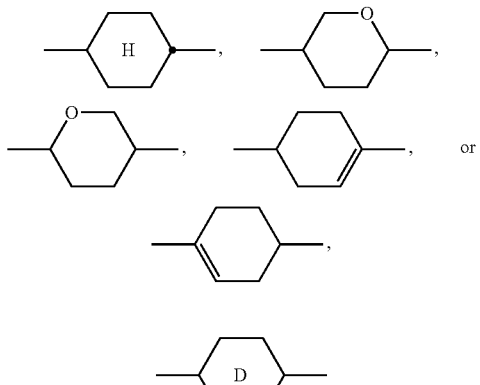

denotes

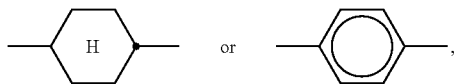

$R^3$ and $R^4$ each, independently of one another, denote alkyl having 1 to 12 C atoms, in which one or two non-adjacent $CH_2$ groups are optionally replaced by —O—, —CH=CH—, —CO—, —OCO— or —COO— in such a way that O atoms are not linked directly to one another, and $Z^y$ denotes —$CH_2CH_2$—, —CH=CH—, —$CF_2O$—, —$OCF_2$—, —$CH_2O$—, —$OCH_2$—, —COO—, —OCO—, —$C_2F_4$—, —CF=CF— or a single bond.

29. A liquid-crystal (LC) medium according to claim 23, wherein the one or more compounds suitable for a LC medium are mesogenic, liquid-crystalline and/or polymerizable.

30. A liquid-crystal (LC) medium according to claim 23, comprising
a polymerizable component A) comprising one or more polymerizable compounds, and
a liquid-crystalline component B) comprising one or more low-molecular-weight compounds,
wherein component A) comprises one or more polymerizable compounds of formula I.

31. A compound according to claim 11, which is a compound of formula I1

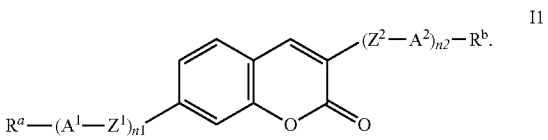

32. A compound according to claim 11, which is a compound of formula I2

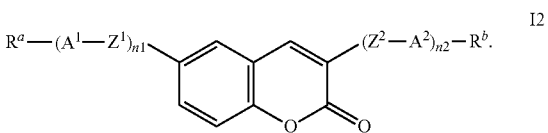

33. A compound according to claim 11, which is a compound of formula I3
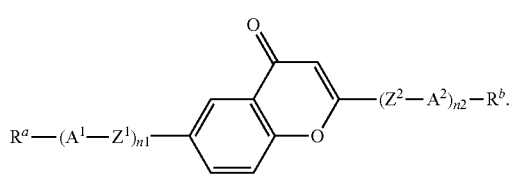
34. A compound according to claim 11, which is a compound of formula I4
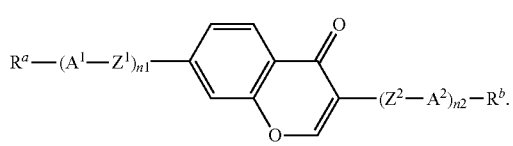
35. A compound according to claim 11, which is
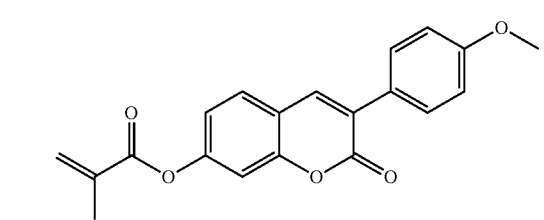
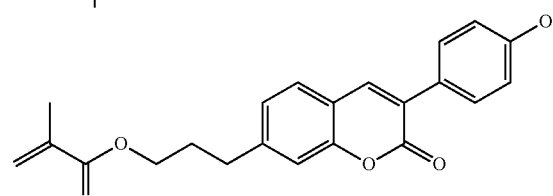
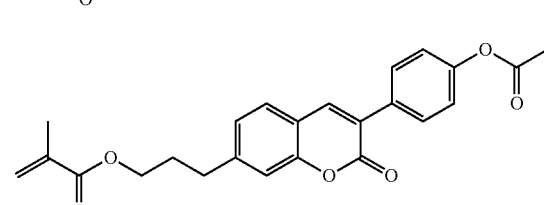
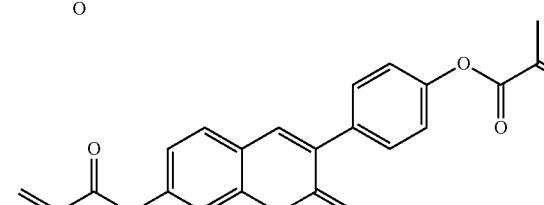
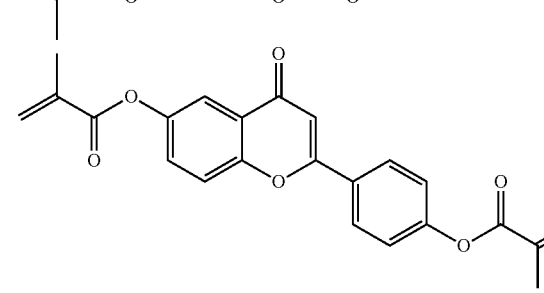
-continued
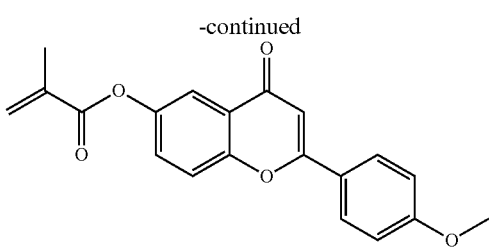
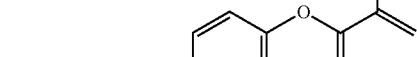
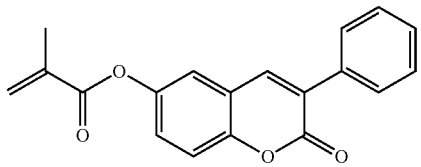
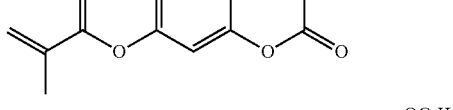
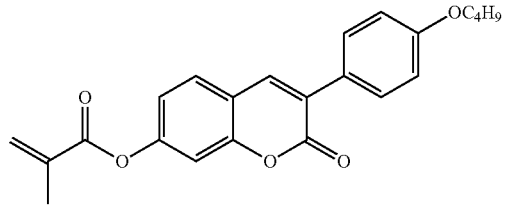
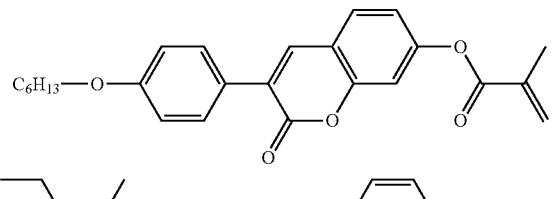
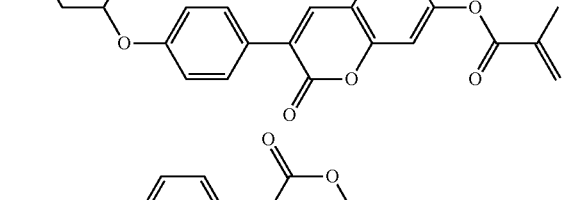
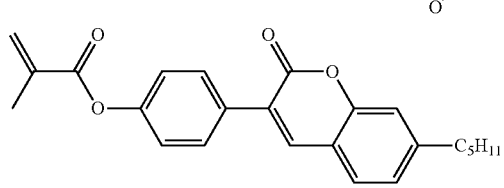

-continued
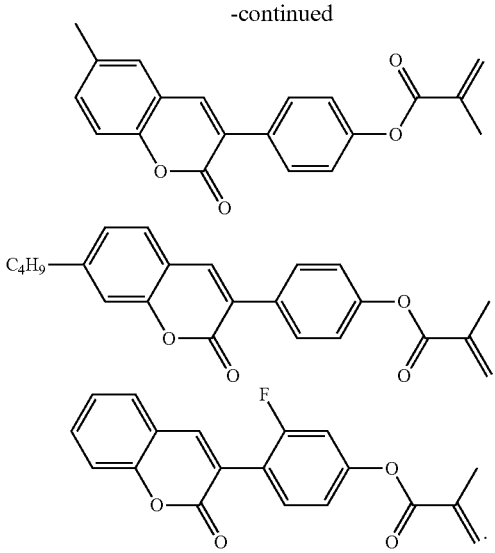
or
* * * * *

UNITED STATES PATENT AND TRADEMARK OFFICE
CERTIFICATE OF CORRECTION

PATENT NO. : 8,592,007 B2
APPLICATION NO. : 13/126596
DATED : November 26, 2013
INVENTOR(S) : Goetz et al.

It is certified that error appears in the above-identified patent and that said Letters Patent is hereby corrected as shown below:

In the Claims

Column 107, line 13 reads "-CH=CH-, -CO-, -OCO- or -COO- such a" should read -- -CH=CH-, -CO-, -OCO- or -COO- in such a --

Column 107, line 35 reads "group, which optionally contain fused rings, and which" should read -- group, which optionally contains fused rings, and which --

Column 107, line 36 reads "is mono- or polysubstituted by L," should read -- is optionally mono- or polysubstituted by L, --

Column 107, line 53 reads "$R^a$, $R^{b\,and\,Rc}$ denote, each independently P, P-Sp-, H, OH, F," should read -- $R^a$, $R^b$ and $R^c$ denote, each independently P, P-Sp-, H, OH, F, --

Column 109, lines 60-65 read

" 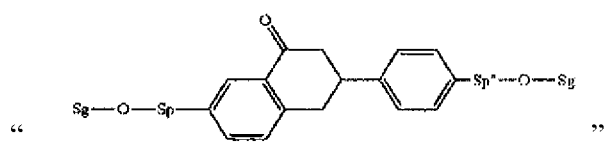 "

should read

-- 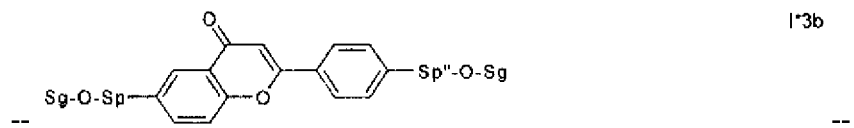 --

Signed and Sealed this
Thirteenth Day of May, 2014

Michelle K. Lee
*Deputy Director of the United States Patent and Trademark Office*

CERTIFICATE OF CORRECTION (continued)
U.S. Pat. No. 8,592,007 B2

Column 110, lines 1-9 read

"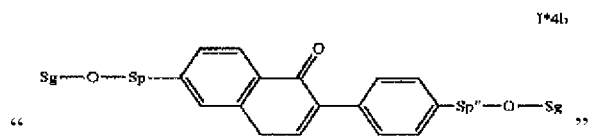"

should read

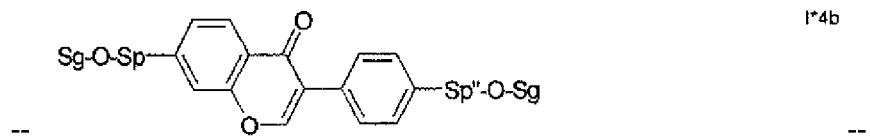

--  --

Column 118, lines 55-59 read

"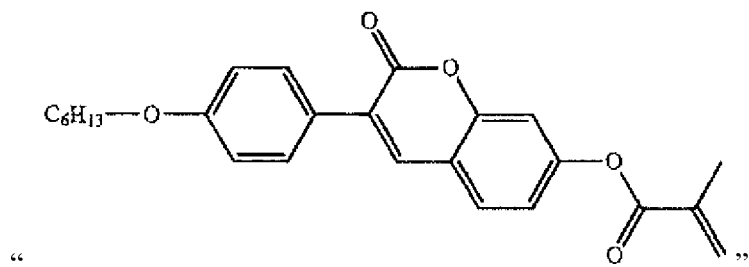"

should read

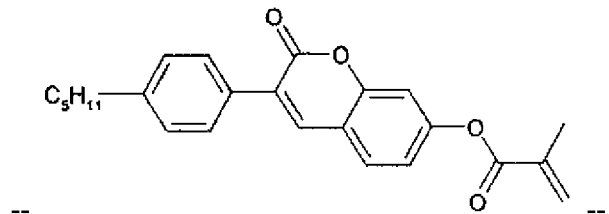

--  --